(12) United States Patent
Vaganay et al.

(10) Patent No.: US 12,066,403 B2
(45) Date of Patent: Aug. 20, 2024

(54) SYSTEMS, METHODS AND APPARATUS FOR IN-SERVICE TANK INSPECTIONS

(71) Applicant: Square Robot, Inc., Boston, MA (US)

(72) Inventors: Jerome Vaganay, Norwell, MA (US); Eric Levitt, Lincolnville, ME (US); William O'Halloran, Boston, MA (US)

(73) Assignee: Square Robot, Inc., Marlborough, MA (US)

( * ) Notice: Subject to any disclaimer, the term of this patent is extended or adjusted under 35 U.S.C. 154(b) by 145 days.

(21) Appl. No.: 17/778,649

(22) PCT Filed: Nov. 19, 2020

(86) PCT No.: PCT/US2020/061175
§ 371 (c)(1),
(2) Date: May 20, 2022

(87) PCT Pub. No.: WO2021/102079
PCT Pub. Date: May 27, 2021

(65) Prior Publication Data
US 2023/0003687 A1    Jan. 5, 2023

Related U.S. Application Data

(60) Provisional application No. 62/938,146, filed on Nov. 20, 2019.

(51) Int. Cl.
*G01N 27/90* (2021.01)
*F17C 13/12* (2006.01)
(Continued)

(52) U.S. Cl.
CPC ........... *G01N 27/902* (2013.01); *F17C 13/12* (2013.01); *G01B 7/10* (2013.01); *G01N 27/9006* (2013.01);
(Continued)

(58) Field of Classification Search
None
See application file for complete search history.

(56) References Cited

U.S. PATENT DOCUMENTS

| 5,942,687 A | 8/1999 | Simmonds et al. |
| 6,104,970 A | 8/2000 | Schmidt et al. |
| (Continued) | | |

FOREIGN PATENT DOCUMENTS

| EP | 3 182 113 | 6/2017 |
| WO | WO-98/34104 | 8/1998 |
| WO | WO-2019/035856 A1 | 2/2019 |

OTHER PUBLICATIONS

International Search Report and Written Opinion on International Patent Application No. PCT/US2020/061175 dated Feb. 10, 2021 (16 pages).
(Continued)

*Primary Examiner* — Jas A Sanghera
(74) *Attorney, Agent, or Firm* — Foley & Lardner LLP

(57) ABSTRACT

Systems, methods, and apparatuses for inspecting a tank containing a flammable fluid are provided. A vehicle configured to inspect the tank can include a propeller, a battery, a control unit, an inspection device, and a ranging device. The battery provides power to the propeller, the control unit, the inspection device, and the ranging device. The control unit generates a map of the tank and determines a first position of the vehicle on the map. The propeller moves the vehicle through the flammable fluid in the tank. The inspection device includes a pulsed eddy current array to obtain inspection data indicating a quality of a tank wall. The control unit causes the propeller to move the vehicle from the first position to a second position within the tank. The control unit obtains first inspection data indicating the quality of the tank wall, and stores the first inspection data.

18 Claims, 24 Drawing Sheets

(51) Int. Cl.
*G01B 7/06* (2006.01)
*G01N 27/9013* (2021.01)

(52) U.S. Cl.
CPC .... *G01N 27/9073* (2013.01); *F17C 2260/015* (2013.01); *F17C 2260/036* (2013.01)

(56) References Cited

U.S. PATENT DOCUMENTS

| | | | |
|---|---|---|---|
| 8,122,780 B1 | 2/2012 | Zollinger et al. | |
| 2002/0190724 A1* | 12/2002 | Plotnikov | G01N 27/904 |
| | | | 324/529 |
| 2004/0036859 A1 | 2/2004 | Silverman et al. | |
| 2007/0126422 A1* | 6/2007 | Crouch | G01N 27/904 |
| | | | 324/240 |
| 2009/0242200 A1* | 10/2009 | Badoux | E21B 47/085 |
| | | | 166/255.2 |
| 2010/0180672 A1 | 7/2010 | Zollinger | |
| 2010/0235018 A1* | 9/2010 | Christ | G01N 21/952 |
| | | | 348/81 |
| 2015/0362462 A1* | 12/2015 | Groninger | G01B 7/105 |
| | | | 324/202 |
| 2019/0325668 A1* | 10/2019 | Cole | G05D 1/0692 |

OTHER PUBLICATIONS

International Preliminary Report on Patentability on PCT appln. PCT/US2020/061175 dated Jun. 2, 2022.
Foreign Search Report on EP DTD Nov. 17, 2023.

\* cited by examiner

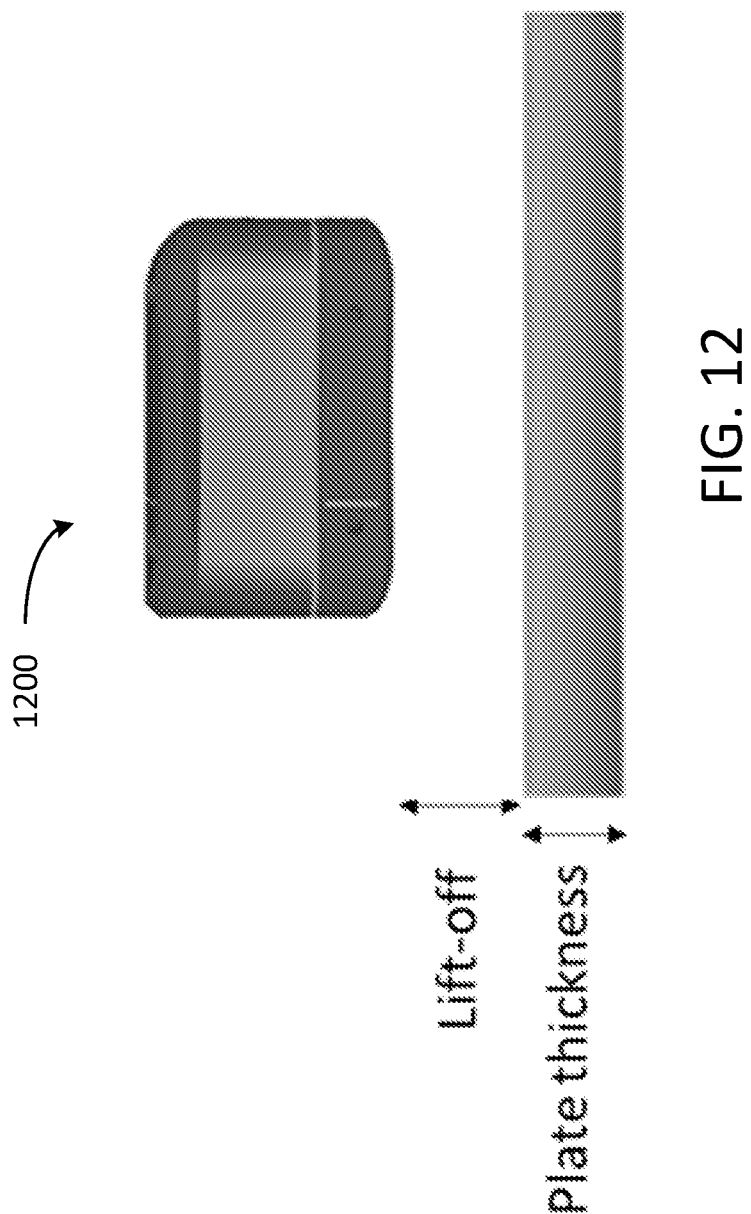

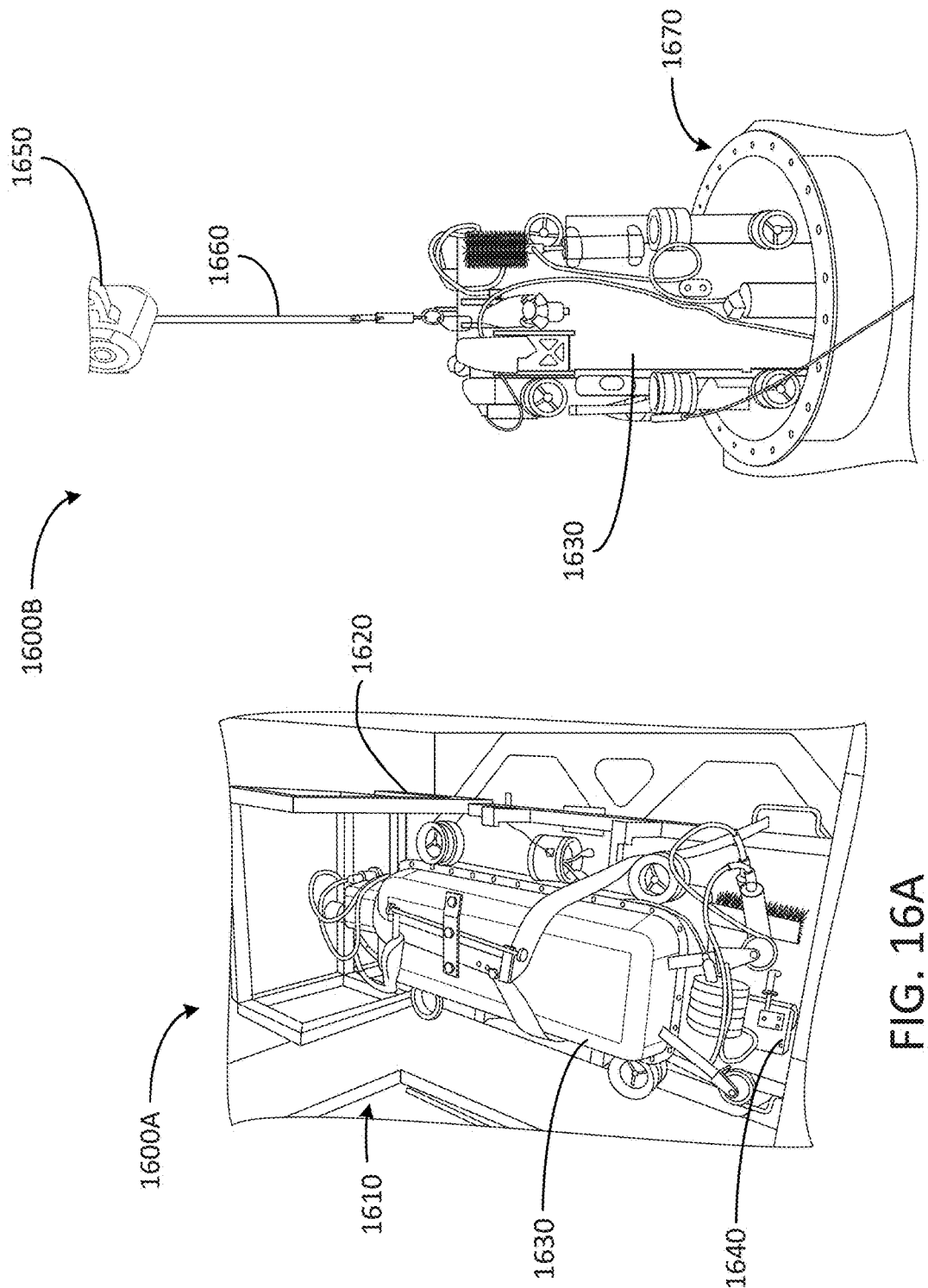

SYSTEMS, METHODS AND APPARATUS FOR IN-SERVICE TANK INSPECTIONS

CROSS-REFERENCE TO RELATED APPLICATIONS

This application claims the benefit of priority under 35 U.S.C. § 371 as a national stage entry of International Patent Application No. PCT/US20/61175, filed Nov. 19, 2020, and designating the United States, which claims the benefit of priority under 35 U.S.C. § 119 to U.S. Provisional Patent Application No. 62/938,146, filed Nov. 20, 2019, each of which is hereby incorporated herein by reference in its entirety.

BACKGROUND

Tanks can store fluids or liquids, including flammable fluids such as oil or gas. The fluid can corrode portions of the tank that come into contact with the fluid. External surfaces of the tank can corrode due to water or other fluids under the floor of the tank, or water that leaked into the tank through, for example, a roof seal and sank below the hydrocarbon fluid due to its higher density. Corrosive elements in the hydrocarbon fluid can also contribute to corrosion. This corrosion can eventually cause the tank to leak. However, it can be challenging to determine the integrity of the tank to prevent leaks.

SUMMARY

This disclosure is directed to systems, methods and apparatus of inspecting a tank containing a flammable fluid. Due to the technical challenges of inspecting a tank containing a flammable fluid, tanks inspections may be performed on empty tanks that are out-of-service. However, out-of-service inspection entails many hazardous steps. For example, the tank is first emptied of its liquid content. A large opening is then cut in the side of the tank to allow people and tools to enter. The residual sediments on the floor are collected, removed from the tank and safely disposed of. The atmosphere inside the tank is degassed and rendered safe. Human operators then enter the confined space under harsh and hazardous conditions to perform tedious plate-by-plate floor inspection. Once the inspection is complete, plates are welded to close the opening on the side of the tank, and the tank refilled with flammable fluid. These additional steps taken to inspect a tank can be time consuming, resource intensive, or hazardous.

Systems, methods and apparatus of this technical solution provide an autonomous vehicle that can inspect a tank containing a flammable fluid. The autonomous vehicle of this technical solution can perform an in-service tank inspection. An in-service tank inspection can refer to inspecting the tank while the flammable fluid is still contained in the tank. In some cases, an in-service tank inspection can refer to a closed tank inspection, such as inspecting a tank containing a flammable fluid while the lid of the tank is closed or sealed. To perform an in-service tank inspection, the autonomous vehicle of this technical solution can be tetherless and include a propeller, battery, and control unit that can automatically perform a tank inspection process. By automatically performing an in-service tank inspection with the tank lid closed, the autonomous vehicle can save time, reduce resource utilization and increase safety by inspecting the tank without having to empty the tank, which can allow for more frequent tank inspections. The system can more accurately predict the quality, integrity or state of the tank by performing more frequent tank inspection, or collecting inspection data at different intervals.

At least one aspect is directed to a vehicle to inspect a tank containing a flammable fluid. The vehicle can include a propeller, a battery, a control unit, an inspection device, and a ranging device. The battery can provide power to the propeller, the control unit, the inspection device, and the ranging device. The control unit can generate a map of the tank based on data received from the ranging device. The ranging device can include an acoustic sensor or electromagnetic radiation sensor capable of providing a measurement of the distance between the robot and the environment (e.g., tank shell and obstacles such as pipes or roof support columns). The control unit can determine a first position of the vehicle on the map of the tank. The propeller, which can be electrically connected to the battery, can move the vehicle through the flammable fluid in the tank. The inspection device, which can be electrically connected to the battery, can determine a quality metric of a portion of the tank. The control unit can be electrically connected to the battery, the ranging device, the propeller and the inspection device. The control unit can cause the propeller to move the vehicle from the first position to a second position within the tank. The control unit can determine, via the inspection device, the quality metric for the portion of the tank at the second position within the tank. The control unit can store, in a data structure in memory of the vehicle, the quality metric corresponding to the second position within the tank.

The control unit of the vehicle can execute a diagnostic program prior to causing the propeller to move the vehicle. The control unit of the vehicle can be configured to determine, based on results of a diagnostic program, to initiate a tank inspection process, and provide, based on the tank inspection process, a command to cause the propeller to move the vehicle from the first position to the second position within the tank. The control unit of the vehicle can be configured to disable, based on a diagnostic program, the propeller to prevent the propeller from moving the vehicle from the second position. The control unit of the vehicle can be further configured to execute a diagnostic program prior to causing the propeller to move the vehicle, and set a speed of the propeller based on a result of the diagnostic program.

The control unit of the vehicle can further be configured to cause the propeller to move the vehicle to a plurality of portions of the tank, generate a map of the tank based on traversing a plurality of portions of the tank, and detect an exit condition based on the generated map. The control unit of the vehicle can be further configured to adjust a speed of the propeller based on a current location of the vehicle on the map and detect the exit condition based on an amount of power available in the battery. A plurality of propellers of the vehicle can be configured to move the vehicle in one or more directions. The propeller of the vehicle can be one of a controllable-pitch propeller, skewback propeller, modular propeller, or Voith Schneider propeller. The quality metric of the vehicle can indicate a thickness of the portion of the tank at the second position within the tank.

At least one aspect is directed to a method of inspecting a tank containing a flammable fluid. The method can be performed by a vehicle having one or more processors and memory. The method can include lowering, via a cable, the vehicle into the tank containing the flammable fluid, wherein the vehicle can comprise a propeller, a battery, a control unit, an inspection device, and a ranging device. The method can include removing, subsequent to deploying the vehicle, the cable from the tank. The method can include moving, by the propeller, the vehicle through the flammable fluid in the tank. The method can include generating, by the control unit based on data received from the ranging device, a map of the tank. The method can include determining, by the control unit, a first position of the vehicle on the map of the tank. The method can include causing, by the control unit of the vehicle, the propeller to move from the first position to a second position within the tank. The method can include determining, via the inspection device, a quality metric for a portion of the tank corresponding to the second position on the map. The method can include storing, in a data structure in memory of the vehicle, the quality metric corresponding to the second position within the tank.

The method can include executing, by the control unit, a diagnostic program prior to causing the propeller to move the vehicle. The method can include determining, by the control unit based on results of a diagnostic program, to initiate a tank inspection process, and providing, by the control unit based on the tank inspection process, a command to cause the propeller to move the vehicle from the first position to the second position within the tank. The method can include disabling, by the control unit based on a diagnostic program, the propeller to prevent the propeller from moving the vehicle from the second position. The method can include executing, by the control unit, a diagnostic program prior to causing the propeller to move the vehicle, and setting, by the control unit, a speed of the propeller based on a result of the diagnostic program.

The method can include causing, by the control unit, the propeller to move the vehicle to a plurality of portions of the tank, generating, by the control unit, a map of the tank based on traversing a plurality of portions of the tank, and detecting, by the control unit, an exit condition based on the generated map. The method can include adjusting, by the control unit, a speed of the propeller based on a current location of the vehicle on the map. The method can include detecting, by the control unit, the exit condition based on an amount of power available in the battery. The method can include moving, by a plurality of propellers, the vehicle in one or more directions. The propeller of the method can be one of a controllable-pitch propeller, skewback propeller, modular propeller, or Voith Schneider propeller. The quality metric of the method can indicate a thickness of the portion of the tank at the second position within the tank.

At least one aspect is directed to a system to inspect a tank containing a flammable fluid. The system can include a battery, a control unit, an inspection device having one or more conductors, and a ranging device. The inspection device can be electrically connected to the control unit and the battery. The inspection device can receive, from the control unit responsive to identifying a first position of the vehicle on a map of the tank based on data from the ranging device, a command to initiate inspection at the first position on the map. The inspection device can change, responsive to the command to initiate inspection, a magnetic field in the one or more conductors to induce loops of electric current that extend towards a portion of the tank corresponding to the first position on the map. The inspection device can detect values corresponding to the induced loops of electric current at the portion of the tank corresponding to the first position on the map. The inspection device can provide, to the control unit, data comprising the detected values to cause the control unit to determine a quality metric at the portion of the tank corresponding to the first position of the vehicle on the map, and store, in memory of the vehicle, the quality metric.

The inspection device can generate pulsed eddy currents to determine the quality metric. The inspection device can include a plurality of conductors arranged in an array to generate array eddy currents to determine the quality metric at a portion of the tank corresponding to a second position of the vehicle on the map. The inspection device can include an ultrasonic array or ultrasonic phased array system to determine a second quality metric at the portion of the tank corresponding to the first position of the vehicle on the map.

The inspection device can include at least two different types of sensors. The inspection device can obtain measurements from the at least two different types of sensors to generate the quality metric at the portion of the tank corresponding to the first position of the vehicle on the map. The quality metric can indicate a thickness of the portion of the tank corresponding to the first position of the vehicle on the map. The quality metric can indicate a predictive corrosion metric based on a plurality of tank inspection performed by the vehicle during a time interval. The inspection device can selects, based on a condition associated with the portion of the tank corresponding to the first position of the vehicle on the map, one of the at least two different types of sensors to inspect the portion of the tank.

The system can include a model generator that generates a risk-based inspection model based on a time-series of quality metrics determined based on the loops of electric current provided by the inspection device that extend towards the portion of the tank. The model generator can aggregate historical quality metrics obtained from a plurality of tank inspections to forecast a level of thickness of the tank based on the quality metric.

The ranging device can detect acoustic waves reflected off one or more portions of the tank, and the control unit generates the map of the tank based on the detected acoustic waves.

At least one aspect is directed to a method of inspecting a tank containing a flammable fluid. The method can include lowering, via a cable, a vehicle into the tank containing the flammable fluid. The vehicle can include a battery, a control unit, an inspection device having one or more conductors, and a ranging device. The method can include removing, subsequent to deploying the vehicle, the cable from the tank. The method can include the inspection device receiving, from the control unit responsive to identifying a first position of the vehicle on a map of the tank based on data from the ranging device, a command to initiate inspection at the first position on the map. The method can include the inspection device charging, responsive to the command to initiate inspection, a magnetic field in the one or more conductors to induce loops of electric current that extend towards a portion of the tank corresponding to the first position on the map. The method can include the inspection device detecting values corresponding to the induced loops of electric current at the portion of the tank corresponding to the first position on the map. The method can include the inspection device providing, to the control unit, data comprising the detected values to cause the control unit to determine a quality metric at the portion of the tank corresponding to the first position of the vehicle on the map, and store, in memory of the vehicle, the quality metric.

The method can include the inspection device generating a pulsed eddy current. The method can include determining the quality metric based on the pulsed eddy current.

The method can include generating, by a plurality of conductors of the inspection device, array eddy currents. The method can include determining the quality metric at a portion of the tank corresponding to a second position of the vehicle on the map based on the array eddy currents.

The method can include determining, via an ultrasonic array or ultrasonic phased array system of the inspection device, a second quality metric at the portion of the tank corresponding to the first position of the vehicle on the map.

The method can include generating the quality metric at the portion of the tank corresponding to the first position of the vehicle on the map by obtaining measurements from at least two different types of sensors of the inspection device. The quality metric can indicate a thickness of the portion of the tank corresponding to the first position of the vehicle on the map. The quality metric can indicate a predictive corrosion metric based on a plurality of tank inspection performed by the vehicle during a time interval.

The method can include generating, by a model generator, a risk-based inspection model based on a time-series of quality metrics determined based on the loops of electric current provided by the inspection device that extend towards the portion of the tank. The method can include aggregating historical quality metrics obtained from a plurality of tank inspections. The method can include forecasting, using the aggregated historical quality metrics, a level of thickness of the tank based on the quality metric.

The method can include receiving acoustic waves reflected off one or more portions of the tank. The method can include generating the map of the tank based on the acoustic waves.

At least one aspect is directed to a vehicle to inspect a tank containing a flammable fluid. The vehicle can include a propeller, a latch mechanism, a pressure switch, and an inspection device. The vehicle can include a control unit in communication with the propeller, the latch mechanism, the pressure switch, and the inspection device. The control unit can receive an indication from the pressure switch to power on. The control unit can receive the indication responsive to the pressure switch detecting an ambient pressure greater than a minimum threshold. The control unit can receive, from the latch mechanism, an indication of a state of the latch mechanism. The control unit can determine, based on the state of the latch mechanism, that the cable used to lower the vehicle into the tank containing the flammable fluid is detached from the vehicle. The control unit can command, responsive to the determination that the cable is detached from the vehicle, the propeller to move the vehicle through the flammable fluid. The control unit can determine, via the inspection device and subsequent to generation of a portion of a map, a quality metric of a portion of the tank.

The pressure switch can detect that the vehicle is submerged by a threshold depth in the flammable fluid. The pressure switch can provide, responsive to detection of the threshold depth, an indication to power on the control unit of the vehicle. The vehicle can be powered off as it is lowered through a vapor layer in the tank above the flammable fluid.

The latch mechanism can disengage the cable used to lower the vehicle into the flammable fluid in the tank. The latch mechanism can couple the cable to the vehicle to lower the vehicle into the flammable fluid in the tank. The vehicle can include an actuator that locks or unlocks the latch mechanism. The control unit can cause the actuator to unlock the latch mechanism to disengage the cable subsequent to the vehicle lowered into the flammable fluid in the tank.

The control unit can detect an exit condition in a tank inspection process. The control unit can cause the latch mechanism to re-engage the cable to couple to the cable to the vehicle. The cable can be a passive rope, such as a passive metal rope.

The control unit can execute a diagnostic program to detect a state of the cable. The control unit can generate, based on the state of the cable, a command to control at least one of the propeller or the latch mechanism coupling the cable to the vehicle.

The sensor can determine that the vehicle is in contact with the floor of the tank. The control unit can detect, via the sensor, that the vehicle is in contact with the tank floor. The control unit can command the latch mechanism to decouple the cable from the vehicle in the flammable fluid. The control unit can command the propeller to move the vehicle responsive to the second state of the latch mechanism.

The control unit can receive, from a remote computing device, an indication that the cable is decoupled from the vehicle in the flammable fluid. The control unit can receive, from a remote computing device, an indication to perform a tank inspection process comprising causing the propeller to move the vehicle to one or more positions in the tank, and determine one or more quality metrics.

At least one aspect is directed to a method of inspecting a tank containing a flammable fluid. The method can include lowering, via a cable, a vehicle into the tank containing the flammable fluid. The vehicle can include a control unit, a propeller, a pressure switch, a latch mechanism, and an inspection device. The method can include the control unit receiving, from the pressure switch, an indication to power on. The method can include removing, subsequent to deploying the vehicle, the cable from the tank. The method can include the control unit receiving, from the latch mechanism, an indication of a state of the latch mechanism. The method can include the control unit determining, based on the state of the latch mechanism, that the cable used to lower the vehicle into the tank containing the flammable fluid is detached from the vehicle. The method can include the control unit commanding, responsive to the determination that the cable is detached from the vehicle, the propeller to move the vehicle through the flammable fluid. The method can include the control unit determining, via the inspection device and subsequent to generation of a portion of a map, a quality metric of a portion of the tank.

The method can include detecting, by the pressure switch, that the vehicle is submerged by a threshold depth in the flammable fluid. The method can include providing, by the pressure switch responsive to detection of the threshold depth, an indication to power on the control unit of the vehicle, wherein the vehicle is powered off as it is lowered through a vapor layer in the tank above the flammable fluid.

The method can include the latch mechanism disengaging the cable used to lower the vehicle into the flammable fluid in the tank. The method can include coupling, via the latch mechanism, the cable to the vehicle to lower the vehicle into the flammable fluid in the tank. The method can include locking or unlocking, by the control unit in communication with an actuator, the latch mechanism to disengage the cable subsequent to the vehicle lowered into the flammable fluid in the tank.

The method can include detecting, by the control unit, an exit condition in a tank inspection process. The method can include re-engaging, by the control unit, the latch mechanism with the cable to couple to the cable to the vehicle. The cable can be a passive rope, such as a passive metal rope.

The method can include executing, by the control unit, a diagnostic program to detect a state of the cable. The method can include generating, by the control unit based on the state of the cable, a command to control at least one of the propeller or the latch mechanism coupling the cable to the vehicle.

The method can include determining, via a sensor, that the vehicle is in contact with the floor of the tank. The method can include commanding, by the control unit, the latch mechanism to decouple the cable from the vehicle in the flammable fluid. The method can include commanding, by the control unit, the propeller to move the vehicle responsive to the second state of the latch mechanism.

The method can include receiving, by the control unit from a remote computing device, an indication that the cable is decoupled from the vehicle in the flammable fluid. The method can include receiving, by the control unit from a remote computing device, an indication to perform a tank inspection process comprising causing the propeller to move the vehicle to one or more positions in the tank, and determine one or more quality metrics.

At least one aspect is directed to a method of inspecting a tank containing a flammable fluid. The method can include opening a lid of a tank containing the flammable fluid. The method can include connecting a cable to a vehicle. The vehicle can include a battery and a control unit. The method can include lowering, via the cable and through an opening of the tank, the vehicle through a vapor barrier within the tank and on top of the flammable fluid. The method can include disengaging the cable from the vehicle subsequent to the vehicle contacting the floor of the tank. The method can include removing the cable from the tank. The method can include closing the lid of the tank to seal the vehicle in the tank. The method can include performing, via the control unit of the vehicle, a tank inspection process under battery power. The tank inspection process can include generating a map of the tank and determining a quality metric for a portion of the tank corresponding to a location on the generated map.

The method can include initializing, in memory of the vehicle, a map data structure for the tank. The method can include storing, in the map data structure, the map.

The method can include determining, by the control unit upon being lowered in the tank, to generate the map for the tank. The method can include instructing, by the control unit, a ranging device of the vehicle to generate the map for the tank.

The method can include establishing a predetermined duration for the tank inspection process. The method can include storing the predetermined duration in a configuration file in memory of the vehicle. The method can include initiating, by the vehicle responsive to being sealed in the tank and beginning the tank inspection process, a timer based on the predetermined duration. The method can include terminating the tank inspection process responsive to expiration of the timer.

The method can include identifying, by the control unit, an uninspected portion of the tank based on the generated map. The method can include causing, by the control unit, a propeller of the vehicle to move the vehicle towards the identified uninspected portion of the tank.

The method can include identifying, by the control unit, an absence of any uninspected portions of the floor of the tank based on the generated map. The method can include providing, responsive to identifying the absence, an indication that the tank inspection process is complete. The indication that the tank inspection process is complete can include a wireless signal or acoustic signal.

The method can include unreeling, by a winch located external to the tank, the cable to lower the vehicle into the tank. The method can include reeling, by the winch, the cable subsequent to disengaging the cable from the vehicle to remove the cable from within the tank. The method can include unreeling, upon completion of the tank inspection process comprising generating the map of the tank and storing a plurality of indications of the quality metric for the at least one portion of the tank, the cable into the tank. The method can include re-engaging the cable with the vehicle. The method can include reeling the cable re-engaged with the vehicle to remove the vehicle from within the tank.

At least one aspect is directed to a system of inspecting a tank containing a flammable fluid. The system can include a vehicle comprising a battery and a control unit. The system can include a cable connected to the vehicle. The system can include a winch located external to a tank lowering, through an opening of the tank, the vehicle through a vapor barrier within the tank and on top of a flammable fluid contained in the tank. The vehicle can disengage from the cable subsequent to the vehicle contacting the floor of the tank. The winch can remove the cable from the tank. The lid of the tank is closed to seal the vehicle in the tank subsequent to removal of the cable from the tank. The control unit of the vehicle can perform a tank inspection process under battery power, the tank inspection process comprising generating a map of the tank and determining a quality metric for a portion of the tank corresponding to a location on the generated map.

The control unit can initialize, in memory of the vehicle, a map data structure for the tank, and store the map in the map data structure. The control unit can determine, upon the vehicle contacting the floor of the tank, to generate the map for the tank. The control unit can instruct a ranging device of the vehicle to collect data used to generate the map for the tank.

The control unit can retrieve, from a configuration file stored in memory of the vehicle, a predetermined duration for the tank inspection process. The control unit can initiate, subsequent to being sealed in the tank and beginning the tank inspection process, a timer based on the predetermined duration.

The control unit can terminate the tank inspection process responsive to expiration of the timer. The control unit can identify an uninspected portion of the tank based on the generated map. The control unit can cause a propeller of the vehicle to move the vehicle towards the identified uninspected portion of the tank.

The control unit can identify an absence of any uninspected portions of the floor of the tank based on the generated map. The control unit can provide, responsive to identifying the absence, an indication that the tank inspection process is complete. The indication that the tank inspection process is complete can include a wireless signal or an acoustic signal.

The winch can unreel the cable to lower the vehicle into the tank. The winch can reel the cable subsequent to disengaging the cable from the vehicle to remove the cable from within the tank. The winch can unreel, upon completion of a tank inspection process comprising generating the map of the tank and storing a plurality of indications of the quality metric for the at least one portion of the tank, the cable into the tank. The winch can reel, upon the cable re-engaging the vehicle, the cable to remove the vehicle from within the tank.

At least one aspect is directed to a system for inspecting a tank containing a flammable fluid. The system can include a vehicle including a propeller, a battery, a control unit, an inspection device, and a ranging device. The system can include the battery of the vehicle providing power to the propeller, the control unit, the inspection device, and the ranging device. The system can include the control unit generating, based on data received from the ranging device, a map of the tank, and determining a first position of the vehicle on the map of the tank. The system can include the propeller of the vehicle, electrically connected to the battery, moving the vehicle through the flammable fluid in the tank. The system can include the inspection device, electrically connected to the battery, comprising a pulsed eddy current array for obtaining inspection data indicative of a quality of a tank wall. The system can include the control unit, electrically connected to the battery, the ranging device, the propeller, and the inspection device. The control unit can be configured to cause the propeller to move the vehicle from the first position to a second position within the tank. The control unit can be configured to obtain, via the inspection device, first inspection data indicative of the quality of the tank wall at a portion of the tank at the second position within the tank. The control unit can be configured to store, in a data structure in memory of the vehicle, the first inspection data corresponding to the second position within the tank.

The system can include an external computing device located external to the tank, the external computing device to receive the inspection data comprising the first inspection data, and determine the quality of the tank wall based on the inspection data. The system can include the inspection device to obtain the inspection data for each portion of a plurality of portions of the tank. The system can include the external computing device to determine a separate quality metric for each portion of the plurality of portions of the tank. The system can include the external computing device to determine, based on the inspection data for each portion of the plurality of portions of the tank, an isolated defect at a portion of the tank. The system can include the external computing device to determine, based on the inspection data, a general wall loss of the tank.

The system can include an external computing device located external to the tank to receive the inspection data comprising the first inspection data. The system can include the external computing device to determine, based on the first inspection data, a defect diameter at the second position. The system can include the external computing device to identify, based on a lookup in a defect table customized for the inspection device, an amount of wall loss. The system can include a fiber optic tether communicatively coupling the vehicle to the external computing device. The system can include the inspection device configured with a liftoff distance established based on a predetermined plate thickness, wherein the inspection device is configured to generate a magnetic field established at an intensity based on the liftoff distance and the predetermined plate thickness.

At least one aspect is directed to a method for inspecting a tank containing a flammable fluid. The method can include providing a vehicle including a propeller, a battery, a control unit, an inspection device, and a ranging device. The method can include providing, by the battery of the vehicle, power to the propeller, the control unit, the inspection device, and the ranging device. The method can include generating, by the control unit based on data received from the ranging device, a map of the tank. The method can include determining, by the control unit, a first position of the vehicle on the map of the tank. The method can include causing, by the control unit, the propeller to move the vehicle from the first position to a second position within the tank. The method can include obtaining, via the inspection device electrically connected to the battery and comprising a pulsed eddy current array, first inspection data indicative of a quality of a tank wall at the portion of the tank at the second position within the tank. The method can include storing, by the control unit, in a data structure in memory of the vehicle, the first inspection data corresponding to the second position within the tank.

The method can include receiving, by an external computing device located external to the tank, the inspection data comprising the first inspection data, and determine the quality of the tank wall based on the inspection data. The method can include obtaining, by the inspection device, the inspection data for each portion of a plurality of portions of the tank. The method can include determining, by the external computing device, a separate quality metric for each portion of the plurality of portions of the tank. The method can include determining, by the external computing device based on the inspection data for each portion of the plurality of portions of the tank, an isolated defect at a portion of the tank. The method can include determining, by the external computing device based on the inspection data, a general wall loss of the tank.

The method can include receiving, by an external computing device located external to the tank, the inspection data comprising the first inspection data. The method can include determining, by the external computing device based on the first inspection data, a defect diameter at the second position. The method can include identifying, by the external computing device based on a lookup in a defect table customized for the inspection device, an amount of wall loss. The method can include communicating data between the vehicle and the external computing device via a fiber optic tether communicatively coupled to the vehicle and the external computing device. The method can include generating, by the inspection device, a magnetic field established at an intensity based on a liftoff distance and a predetermined plate thickness, wherein the liftoff distance established based on the predetermined plate thickness.

The first inspection data can indicate the quality of the tank wall comprising a thickness of the tank wall at the second position within the tank. The liftoff distance can be 0.5 inches and the predetermined plate thickness can be at least 0.125 inches, and a traveling velocity of the vehicle can be based on the predetermined plate thickness. The pulsed eddy current array of the inspection device can include a 7-element array with 7 inch coverage.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 12 is an example illustration of a PECA which is lifted off of a plate with a predetermined thickness;

FIGS. 16A-B depict example mounting structures for one or more autonomous tank inspection devices;

DETAILED DESCRIPTION

Following below are more detailed descriptions of various concepts related to, and implementations of, systems, methods and apparatus for inspecting a tank containing a flammable fluid. The various concepts introduced above and discussed in greater detail below may be implemented in any of numerous ways.

This technology is directed to systems, methods and apparatus for inspecting a tank containing a flammable fluid. The system can include an autonomous vehicle having a propeller, battery and control unit. The vehicle, using the control unit, can be self-contained and autonomously inspect the tank. For example, a winch can lower the vehicle into the tank using a cable. While the vehicle is being lowered through the vapor layer over the flammable fluid, the vehicle can remain in a powered off state. The vehicle can include a mechanical pressure switch that detects when the vehicle has been submerged to a predetermined depth into the fluid, and then powers on the vehicle responsive to being submerged to the desired depth. The winch can lower the vehicle to the tank floor, at which point the winch or vehicle can detect that the vehicle is in contact with the tank floor and disengage the cable from the vehicle. Upon being lowered into the flammable fluid in the tank, the vehicle can be disconnected from systems or components external to the tank. The control unit of the vehicle can command the propeller to move the vehicle through the flammable fluid in the tank. While moving throughout the tank, the control unit, using a ranging device, can generate a map of the tank. The control unit can inspect the tank using an inspection device, and store the collected data. The control unit can associate the data from the inspection device with a position or location on the generated map of the tank. By analyzing the collected data, the system can determine the integrity of the tank, such as the thickness of the tank floor, or the level of corrosion of the tank floor.

Thus, systems, methods and apparatus of this technical solution can perform a tank inspection without emptying or draining a flammable fluid from the tank prior to inspecting the tank, thereby improving the efficiency and safety of the tank inspection process, saving time, and utilizing fewer resources. By performing the tank inspection without emptying the flammable fluid, the technology allows for more frequent tank inspections, which can facilitate early detection of tank failures, a more accurate prediction of when the tank may fail, a forecast of the predicted tank integrity.

Figure 1:
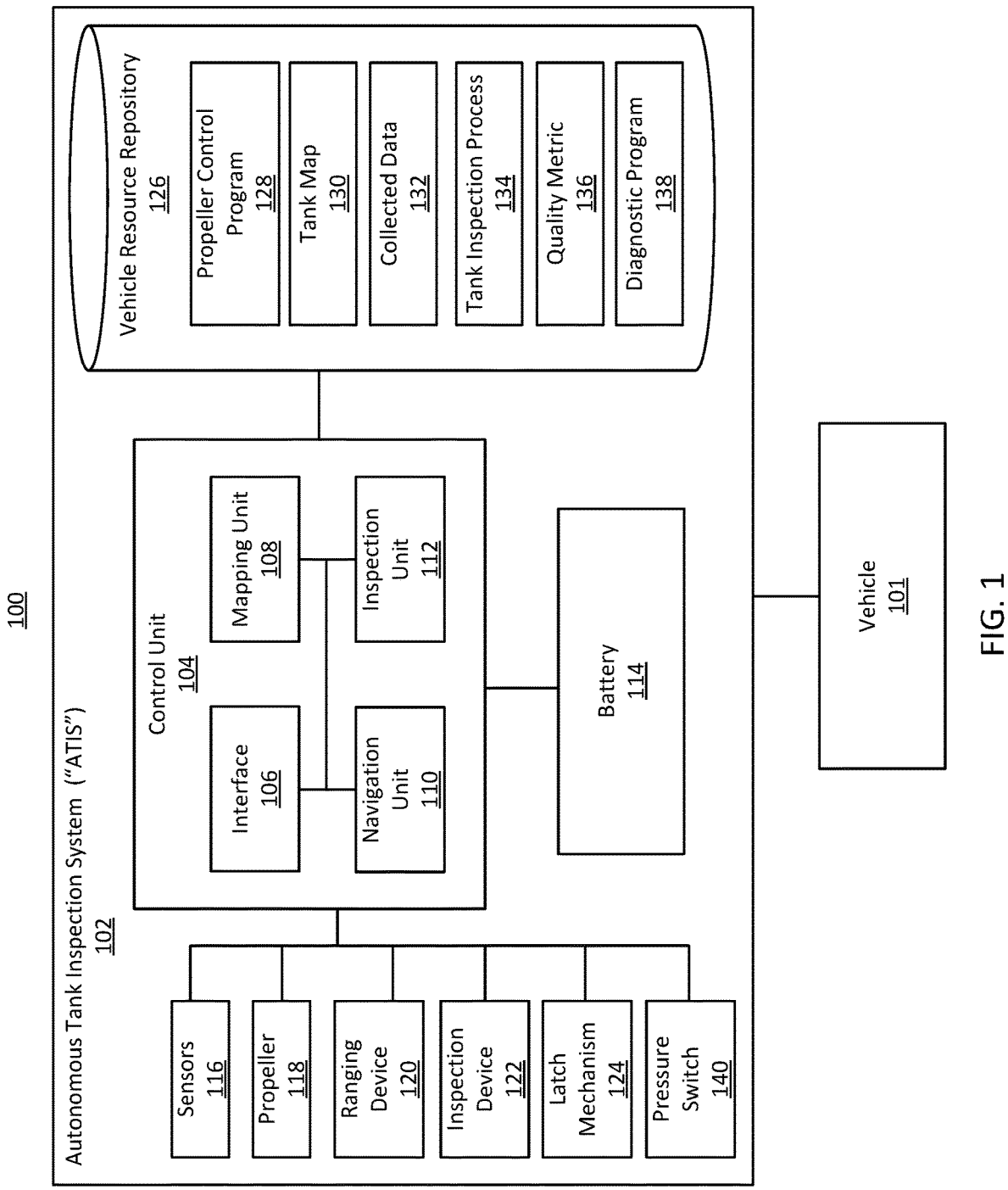
FIG. 1 is a block diagram of an example system to inspect a tank containing a flammable fluid, in accordance with an implementation.

Referring now to FIG. 1, a block diagram of an example system to inspect a tank containing a flammable fluid, in accordance with an implementation, is shown. The system 100 can include a vehicle 101 and an autonomous tank inspection system 102 for performing an autonomous tank inspection. The autonomous tank inspection system ("ATIS") 102 can include at least one control unit 104, at least one battery 114, at least one sensor 116, at least one propeller 118, at least one ranging device 120, at least one inspection device 122, at least one latch mechanism 124, or at least one vehicle resource repository 126. The vehicle resource repository 126 can store software or data associated with the vehicle, including programs, instructions, or data collected by sensors 116. The ATIS 102 can include hardware or a combination of hardware and software, such as communications buses, circuitry, processors, communications interfaces, among others. The autonomous tank inspection system 102 can reside on or within a corresponding vehicle 101.

Each of the components of the ATIS 102 can be implemented using hardware or a combination of software and hardware. Each component of the ATIS 102 can include logical circuitry (e.g., a central processing unit or CPU) that responds to and processes one or more instructions fetched from a memory unit (e.g., memory, storage device, or vehicle resource repository 126). Each component of the ATIS 102 can include or use a microprocessor or a multi-core processor. A multi-core processor can include two or more processing units on a single computing component. Each component of the ATIS 102 can be based on any of these processors, or any other processor capable of operating as described herein. Each processor can utilize instruction level parallelism, thread level parallelism, different levels of cache, etc. For example, the ATIS 102 can include at least one logic device such as a computing device or server having at least one processor.

The components or elements of the ATIS 102 can be one or more separate components, a single component, or a part of the ATIS 102. For example, the control unit 104 (or the other components of the ATIS 102) can include one or more combinations of hardware and software, such as one or more processors configured to initiate stop commands, initiate motion commands, and transmit or receive timing data. The one or more components can work individually external to the ATIS 102.

The one or more component of the ATIS 102 can be hosted on or within a vehicle 101. The components of the ATIS 102 can be connected or communicatively coupled to one another. The connection between the various components of the ATIS 102 can be wired or wireless, or any combination thereof.

The vehicle 101 can include the autonomous tank inspection system ("ATIS") 102 to inspect the tank containing a flammable fluid. The vehicle 101 can include an actuator that locks or unlocks a latch using a latch mechanism 124. The vehicle 101 can include a transducer to transmit a plurality of acoustic signal. The vehicle 101 can be constructed using one or more materials including steel, stainless steel, aluminum, iron, glass, rubber, plastic, or titanium. The vehicle 101 can include one or more wheels and one or more propellers. The wheels can be constructed with one or more materials similar to the vehicle 101. The wheels can be designed as standard/fixed wheel, orientable wheel, ball wheel, Omni wheel, Mecanum wheel, or continuous track. The vehicle 101 can perform one or more tasks by the control unit 104. The tank, the flammable fluid, or the cable can be referred to in FIG. 2A-B or FIG. 3.

The vehicle 101 can be connected to a cable using a latch mechanism 124, which can be used to lower the vehicle 101 through an opening of the tank through a vapor layer within the tank and on top of the flammable fluid. The vehicle 101 can disengage the cable subsequent to the vehicle at least partially submerged in the flammable fluid. The vehicle 101 can then be sealed in the tank, responsive to removing the cable from the tank and closing the lid of the tank. The vehicle 101 can initiate and perform a tank inspection process 134, via the control unit 104, under battery 114 power.

In some cases, the vehicle 101 can include one or more propellers 118 which can be driven by a motor, but not include any wheels. The wheels may be absent from the vehicle 101 because the one or more propellers can propel or move the vehicle 101 through the flammable fluid in the tank. The vehicle 101 can include one or more wheels driven by a motor. In some cases, the vehicle 101 can include wheels but not a motor to drive the wheels. For example, the wheels may not be motor driven because the propeller 118 can propel or move the vehicle 101 through the flammable fluid in the tank. The vehicle 101 can include one or more fans (e.g. blower fan or axial fan) or heat sinks inside the body that can cool, reduce, maintain, or otherwise manage a temperature of physical components of the ATIS 102.

The vehicle 101 can operate in one or more orientations. The orientations indicating a tilt of the vehicle 101, for example, a 30 degrees tilt or a 180 degrees tilt (e.g. upside down orientation). The one or more wheels can be located at the front, back, side, or bottom of the vehicle, for example. The vehicle 101 can include the one or more wheels on one or more surfaces of the vehicle 101, for example, the wheels can be included on top of the vehicle 101 which can move the vehicle 101 during a reverse or an upside down orientation. The vehicle 101 can configure the one or more wheels located on the one or more surfaces based on the orientation of the vehicle 101.

The vehicle 101 can be coated with non-flammable solution or an insulator. The non-flammable solution or insulator can be applied by spray coating, paint coating, attachment, or sheet cover. The non-flammable solution can include glass, mineral wool, gypsum, or magnesium. The insulator can include glass fiber, polyurethane, clay, or ethylene propylene diene terpolymer ("EPDM") rubber. The vehicle 101 can be coated with linked or merged non-flammable solution and insulator to form a protected layer. The non-flammable solution and insulator can be selected based on the flammable fluid contained inside the tank. The vehicle 101 can incorporate the protected layer for flammable environment, for example, the vehicle can be submerged in the tank containing flammable fluid. The vehicle 101 can be further coated with water resistance solution including durable water repellent ("DWR"). The vehicle 101 coated with DWR can be hydrophobic, which can prevent fluid from entering the vehicle 101. The one or more coating of the vehicle 101 can be coated on the exterior of the vehicle 101 or embedded into the vehicle 101 containing the ATIS 102. The vehicle 101 can operate under mild environment, for example, below freezing temperature or above boiling temperature. The vehicle 101 can operate under submerged environment or on dry environment, such as to perform an in-service tank inspection by submerging the vehicle 101 under the flammable fluid, for example. The vehicle 101 can be re-coated based on the solubility of the coating exposed to the flammable fluid. However, in some cases, the vehicle 101 may not be coated with a non-flammable solution or insulator and perform an in-service tank inspection due to the vehicle 101 using a battery, cable and remaining powered off as the vehicle 101 traverses a vapor layer and until fully submerged in the flammable fluid.

The vehicle 101 can be constructed to prevent sparks or electrostatic discharge. The vehicle 101 can be constructed with one or more insulated layers to prevent sparks or electrostatic discharge. The one or more insulated layers can include a spark protection layer, which can be, for example, a rubber layer between one or more layer of steels, preventing accidental collision between the steel layers which can cause a spark. The vehicle 101 can be equipped with a non-sparking tool or at least one anti-static tool. The non-sparking tool can be characterized by lack of ferrous metals including steel or iron, which can prevent ignition of sparks under certain condition. The vehicle 101 and the ATIS 102 can be grounded by the anti-static tool, which can prevent static electricity build up to cause an ignition. The vehicle 101 can equip the non-sparking tool or the anti-static tool to operate inside the tank containing the flammable fluid, which can prevent the vehicle 101 from igniting sparks caused by grinding one or more vehicle 101 layers or the building up of electrostatic discharge caused by the battery 114 supplying power to the ATIS 102, for example. The vehicle 101 can include housing for the one or more components of the ATIS 102, which can be constructed using similar materials to the vehicle 101. However, grounding the vehicle to a launch and recovery cable at the time of deployment or retrieval may sufficiently discharge any electrostatic charge, and the vehicle 101 may not be further constructed with insulation layers or other coatings or layers to mitigate sparks.

The vehicle 101 can be powered off or enter a low power state or standby state as the vehicle crosses the vapor layer (or vapor gap) above the surface of the flammable fluid. The vehicle 101 can power on or enter an active state after the vehicle is fully submerged (or at least partially submerged) in the flammable fluid. For example, the vehicle 101 can remain powered off until the vehicle 101 is a certain threshold distance under the surface of the flammable fluid (e.g., 1 meter, 2 meters, 3 meters, 4 meters or more). The vehicle 101 can be configured with a pressure switch that can automatically power on the vehicle responsive to detecting that the vehicle 101 has been fully submerged by the threshold distance.

The vehicle 101 can operate under dense flammable environment. The dense flammable environment can include ethanol, gasoline (petrol), diesel, oil, or jet fuel. The vehicle 101 can maintain a temperature lower than an ambient temperature, an autoignition temperature, or a flash point. The autoignition temperature can indicate a temperature point at which a substance can be ignited in normal atmosphere without an external source of ignition. The flash point can indicate the lowest temperature at which vapors of the material will keep burning after an ignition source is removed. For example, gasoline can include an autoignition temperature of 280 Celsius and a flash point of 43 Celsius. The vehicle 101 can use a temperature sensor of the ATIS 102 to indicate the temperature of the vehicle 101, such that the vehicle 101 can initiate an operation condition upon the temperature exceeding certain threshold, for example. The operation condition can lower the speed of the propeller 118, pause the vehicle 101, or stop the vehicle 101 operation. The vehicle 101 can determine the speed of the propeller 118 or inspection time, based on the density of the dense flammable environment. For example, a vehicle submerged in gasoline can determine a first speed of one or more propellers configured for a density of 750 kg/m³, and a second vehicle similar to the first vehicle submerged in diesel can determine a second speed, faster than the first speed, of one or more propellers configured for a density of 830 kg/m³.

The vehicle 101 can monitor the temperature of the vehicle 101 in order to facilitate safely traversing the vapor layer. The vehicle 101 may allow or tolerate a higher temperature when fully submerged in the flammable fluid as compared to when the vehicle 101 traverses the vapor layer located above the flammable fluid during deployment or retrieval operations. For example, the vehicle 101 can allow or tolerate a temperature that may be higher than the flash point of the flammable fluid in the tank while the vehicle 101 is fully submerged in the flammable fluid. However, as the deployment process initiates, the vehicle 101 can reduce or otherwise control the temperature of the vehicle 101 such that the temperature of the vehicle 101 falls below a threshold or desired temperature prior to the vehicle 101 traversing the vapor layer during retrieval. In some cases, the vehicle 101 can maintain the temperature of the vehicle 101 below the flash point of the vapor gap or vapor layer even while the vehicle is fully submerged. In some cases, the vehicle 101 can The vehicle 101 can determine, based on the control unit 104 using a diagnostic program 138, a malfunction of one or more components of the ATIS 102, which can be based on a signal received from the components or a discontinued electrical signal to the components. The vehicle 101 can further determine to use a different component, based on the malfunctioned components, to continue inspecting the tank, for example, the vehicle 101 can determine, based on a malfunctioned propeller 118 due to the propeller 118 not receiving power, to continue the tank inspection using the one or more wheels to drive the vehicle 101, if the vehicle 101 is configured with a propeller 118 and wheels, for example.

The battery 114 can provide power to the vehicle 101 and the components of the ATIS 102. The battery 114 can be embedded into or attached on to the vehicle 101. The battery 114 can include a rechargeable or non-rechargeable type including an alkaline battery, a nickel-cadmium battery, a nickel-metal hydride battery, a lithium-ion battery, or a lead-acid battery. The battery 114 can be recharged using an interface 106 of the control unit 104 of the ATIS 102. The vehicle 101 or battery 114 can be equipped with a temperature sensor. The temperature sensor can determine the temperature of the battery 114, which can indicate a thermal dissipation of the battery 114. The vehicle 101 or ATIS 102 can use the measured or detected temperature of the battery 114 to initiate or change an operation condition associated with the vehicle 101, ATIS 102, tank inspection process or proper control program. Operation conditions can include, for example, an exit condition, waiting condition, low power state, cooling state, or high performance state. For example, the diagnostic program 138 can access the temperature information of the battery 114 and initiate the cooling state based on the temperature reaching a threshold temperature set by the ATIS 102 or initiate the wait condition based on the temperature exceeding the threshold temperature by a predetermined amount. The predetermined amount can be configured prior to the vehicle 101 initiating the tank inspection process 134.

The battery 114 can be embedded inside a housing, which can be constructed with materials similar to the vehicle. The battery 114 can dissipate heat to the housing, such that the housing can dissipate the heat of the battery 114. The housing of the battery 114 can include a temperature sensor, which can indicate the temperature of the housing. The housing temperature can be used to initiate or change an operation condition upon exceeding a temperature threshold of the diagnostic program 138. The temperature threshold can be determined or set based on the type of flammable fluid, such as ethanol, gasoline (petrol), diesel, or jet fuel, a dimension of the tank, the construction of the vehicle 101, or a location of the tank.

The battery 114 can provide an indication of power available to the control unit 104, which can be used by the diagnostic program 138. The indication of power available can be used to determine an operation condition by the diagnostic program 138 of the control unit 104. For example, the power available can be used to determine a speed setting of the propeller 118, such that the ATIS 102 operates on high performance state prior to reaching a first power threshold, operates on low power state based on reaching the first power threshold, or execute the exit condition based on the power available reaching a second power threshold lower than the first power threshold.

The sensors 116 can include a proximity sensor, touch sensor, accelerometer, angular rate sensors, gyroscopes, speed sensor, torque sensor, pressure sensor, temperature sensor, light sensor, electrical charge sensor, electrical current sensor, electrostatic sensor, position sensor, tilt sensor, pitch, roll and heading sensor, or odometer. The sensors 116 can be connected to the battery 114. The sensors 116 can be attached to the vehicle 101 or embedded inside the vehicle 101 such as in front, back, above, side, or underneath the vehicle 101. The sensors 116 can collect one or more information of the vehicle 101 or the ATIS 102 including vehicle speed, propeller torque, component temperature, vehicle travel distance, or vehicle touch information. The vehicle 101 can determine the vehicle state (e.g., accelerations, angular rate, attitude and heading, depth, or position). The sensors 116 can provide data or measurements to the navigation unit 110, which can determine the state of the vehicle 101 (e.g., accelerations, angular rate, attitude and heading, depth, or position).

The vehicle 101 can include a pressure switch 140. The pressure switch can be designed, constructed or configured to close an electrical contact when a certain set fluid pressure has been reached on its input. The pressure switch 140 can be configured to make contact either on pressure rise or pressure fall. The pressure switch 140 can detect mechanical force. The pressure switch 140 can be configured with various types of sensing elements to detect or sense pressure. For example, the pressure switch 140 can include a capsule, bellows, Bourdon tube, diaphragm or piston element that deforms or displaces proportionally to applied or detected pressure. The pressure sensing element of the pressure switch 140 can be arranged to respond to a difference of two pressures. The resulting motion can be applied directly, or through amplifying levers, to a set of switch contacts to power on the vehicle 101 or control unit 104 by closing an electronic circuit between the control unit 104 and the battery 114.

The pressure switch 140 can be configured to operate in flammable fluid by having an enclosure to prevent an arc at the contacts from igniting the surrounding gas. The switch enclosure can be formed of a material that can be non-flammable, weatherproof, corrosion resistant, or submersible.

The pressure switch 140 can close an electrical contact to power the control unit 104 responsive to detecting a threshold pressure. The threshold pressure can correspond to the vehicle 101 being submerged at least 1 meter, 2 meters, 3 meters or more in a fluid. The pressure switch 140 can be designed, constructed or operational to detect the depth based on a known density of the fluid. The pressure can be determined based on P=height*density*acceleration of gravity. The threshold pressure can be set based on determining the desired depth at which the control unit 104 is to be powered on (e.g., 1 meter, 2 meters, 3 meters, or more), the density of the fluid (e.g., 0.7 kg/m$^3$, and gravity (e.g., 9.8 m/s$^2$). The pressure switch 140 can be configured to power on the control unit 104 responsive to detection of the threshold pressure.

The sensors 116 of the vehicle 101 can include a fuel level sensor. In some cases, the vehicle 101 can derive or determine the fuel level via an external fuel level sensor or by not using a separate fuel level sensor. For example, the vehicle 101 can derive the fuel level based on its depth and altitude above the floor. In another example, the vehicle 101 can receive the fuel level information from an external source (e.g., checking the mechanical level gauges installed in or on a tank) prior to deployment into the tank the mechanical level gauges usually installed in tanks. The vehicle 101 can determine the fuel level based on the density of the flammable fluid, the pressure sensor in the vehicle, and an acoustic speed sensor (which can provide altitude above the floor). The vehicle 101 can determine the depth and altitude based on the pressure, which can indicate the liquid level. In some cases, the vehicle 101 can determine the fuel level from a gauge configured on the tank.

The information identified by the sensor 116 can be stored in the collected data 132 within the vehicle resource repository 126, which can be accessed by the control unit 104. The sensor 116 can perform an operation by the control unit 104. The operation can include sensor selection, sensor initiation, or sensor deactivation. The sensor selection can select a sensor 116 from multiple sensors based on one or more commands to be executed by the control unit 104. The sensor initiation can activate at least one sensor 116 to perform the one or more commands, and the sensor deactivation can deactivate at least one sensor 116 upon completing the one or more commands. For example, sensor initiation and deactivation can include selecting the proximity sensor to identify obstruction within the tank for collision avoidance, activating the sensor 116 to obtain proximity data of the tank, and deactivating the sensor 116 upon storing the collected data in the data repository, indicating completion of the one or more commands.

The sensors 116 information can configure or determine a plurality of settings for one or more components of the ATIS 102, for example, using the temperature sensor to determine an operation condition of the vehicle 101. The temperature sensor can be included in or on the battery 114, the propeller 118, or one or more portions of the vehicle 101 to determine the temperature information, wherein the temperature information can be stored in the collected data 132. The temperature sensor can detect changes in temperature based on changes in the one or more substances of the temperature sensor, the changes in the substance can be an expansion or contraction of mercury inside the sensor 116 container. The temperature information can be accessed by the control unit 104 executing the diagnostic program 138 to determine an operation condition of the one or more components of the system 100. The diagnostic program 138 can determine to change the operation condition based on the temperature reaching a first threshold, or to initiate the operation condition based on the temperature reaching a second threshold, for example, the diagnostic program 138, initiating the low power state, decrease the propeller speed based on the temperature of the battery 114 reaching the first threshold and initiate the exit condition to stop the vehicle 101 from executing a command based on the battery 114 reaching the second threshold.

The sensors 116 and the ranging device 120 provide data used by the navigation unit 110 to determine the position of vehicle 101 as it moves along its desired path in the tank 202. The navigation unit 110 can determine or configure the navigation path using the sensors 116. The proximity sensor can be attached or embedded in front of the vehicle 101 to detect nearby object for collision avoidance without physical contact with the object. The proximity sensor can emit an acoustic beam or beam of electromagnetic radiation (e.g., a laser range finding system), and measure travel time to determine the present of one or more objects, which can be referred to as one or more targets. For example, the navigation unit 110, based on the proximity sensor detecting obstruction in close proximity of the vehicle 101, can responsively maneuver the vehicle 101 to avoid collision. A combination of measurements from sensors 116 and the ranging device 120 can be used to determine the vehicle's position over time and generate a map of the tank. For example, the ranging device 120 can determine the position of the vehicle 101 relative to the side of the tank. The ranging device 120 can use sensors 116, or other sensors, for dead reckoning (e.g., the process of determining the position of the vehicle 101 by estimating the direction and distance traveled). In some cases, the sensor 116, such as the odometer, can be used to determine total distance travelled by the vehicle 101. The total distance can be used to generate a map of the tank, determine an operation efficiency of the tank inspection, determine a resource utilization value of the tank inspection, or an amount of power consumed by the vehicle 101 during the tank inspection process. The sensor 116, such as an electrical current sensor, can be used to determine a state of the latch mechanism 124 of the vehicle 101 coupling a cable to the vehicle 101. The state of the latch mechanism 124 can indicate the engagement of the cable to the vehicle 101, which can be based on the flow of current of the latch mechanism 124 detected by the sensor 116. The sensor 116 can detect a first state of the latch mechanism 124 and a second state of the latch mechanism 124 of the vehicle 101 in the flammable fluid. For example, the first state can be the connected state of the latch mechanism 124 and the second state can be the disconnected state of the latch mechanism 124.

The sensors 116 can provide fuel level information using the fuel level sensor embedded in or on the vehicle 101 indicating an amount of fuel remaining in the tank during inspection. The fuel level sensor can include a float, an actuating rod, and a resistor, which can provide a signal indicating the amount of fuel in residing in the tank. The fuel level sensor on the vehicle 101 can provide information to determine a submersion level of the vehicle 101. The submersion level can be used by the control unit 104 to initiate the diagnostic program 138. The fuel level sensor can be used to determine or configure an operation condition based on the tank dimension. The sensors 116 can determine the tilt information using the tilt sensor, indicating the orientation of the vehicle 101. The tilt sensor can be used by the control unit 104 to prevent disorientation of the vehicle 101. Disorientation can refer to the vehicle 101 being upside down, or otherwise oriented in an incorrect or erroneous direction.

The propeller 118 can include a controllable-pitch propeller, skewback propeller, modular propeller, or Voith Schneider propeller. The propeller 118 can be connected to the battery 114. The propeller 118 can use the one or more sensors 116 to determine one or more propeller information including a propeller speed, a propeller torque, or a propeller motor temperature. The propeller information can be stored within the collected data 132 of the vehicle resource repository 126. The propeller 118 can execute one or more commands by the navigation unit 110 of the control unit 104 using the propeller control program 128 stored in the vehicle resource repository 126, which can be based on an execution of a diagnostic program 138. The control unit 104 can increase or decrease the speed of the propeller 118 to adjust the vehicle 101 speed, or change the orientation of the propeller 118 to adjust the direction of the vehicle 101. The control unit 104 can adjust the speed or orientation of the vehicle responsive to or based on the results of executing the diagnostic program 138, or a location of the vehicle 101 on the map of the tank. In some cases, the control unit 104 can disable or turn off the propeller 118 responsive to the results from executing diagnostic program 138. For example, the diagnostic program 138 can identify a failure of a component or an undesired operating condition. The control unit 104, based on the failure or operating condition, can determine not to provide power to the propeller 118. Instead, the control unit 104 can determine to re-run the diagnostic program 138 one or more times until a satisfactory operating condition has been detected.

The propeller 118 can be used to rotate or move the vehicle 101 through the flammable fluid in the tank in one or more directions based on the navigation unit 110 using the propeller control program 128. The propeller 118 can be configured with an operation condition to increase or decrease the propeller speed. In some cases, the propeller 118 can be configured by the diagnostic program 138 to operate in a low power state based on the amount of power or energy remaining in the battery 114. The propeller 118 can operate in a cooling state, based on the temperature information of the battery 114 or the propeller 118. In some cases, the control unit 104 can be configured with a wait condition in which the control unit 104 pauses the propeller 118 responsive to a condition (such as heat buildup or a buildup in electrostatic charge as detected by a sensor 116).

The ranging device 120 can include a bump sensor, infrared sensor, ultrasonic sensor, laser sensor, or radar sensor. The ranging device 120 can be controlled, instructed or managed by the mapping unit 108 of the control unit 104 to execute one or more mapping commands. The ranging device 120 can be connected to the battery 114. The ranging device 120 can provide data to the mapping unit 108 to generate or update a map of the tank based on information from the one or more components of the ranging device 120. The ranging device 120 can collect data used to generate or update the map of the tank based on the vehicle 101 traversing a plurality of portions of the tank. The ranging device 120 can determine, maintain, or update a position of the vehicle 101. The ranging device 120 can be configured by the mapping unit 108 of the control unit 104, for example, to update the position of the vehicle 101. The map of the tank generated by the ranging device 120 can be included, stored, maintained, and updated within a tank map 130 of the vehicle resource repository 126. The mapping unit 108 can use information obtained from any sensors 116 or other sources to generate the map, including, but not limited to, for example the ranging device 120 and sensors 116.

The ranging device 120 can include or use the radar sensor to measure distance between the vehicle 101 and the enclosure of the tank using radio waves with an antenna. The antenna can transmit the radio waves and receive a reflection of the radio waves, the reflection of the radio waves can indicate the enclosure of the tank, which can indicate the dimension of the tank. The dimension of the tank can be stored within the tank map 130. The ranging device 120 can use the ultrasonic sensor to measure the distance between the vehicle 101 and the enclosure of the tank. The ultrasonic sensor can include an ultrasonic element for both emission and reception of ultrasonic waves, the ultrasonic element can emit the ultrasonic waves, initiate a timer, receive the ultrasonic waves, and stop the timer. The ultrasonic sensor can execute a distance measurement technique to determine the distance between the vehicle 101 and the enclosure of the tank. The ranging device 120 can generate the tank map 130 based on acoustic waves reflected off one or more portions of the tank, the acoustic waves generated by the one or more ranging device 120 sensors.

The inspection device 122 can include a magnetic sensor, a magnetic sensor array, an ultrasonic sensor, an ultrasonic array system, an ultrasonic phased array system, or a sweeping device. The inspection device 122 can be connected to the battery 114. The inspection device 122 can be configured by the inspection unit 112 of the control unit 104 to execute one or more commands. The inspection device 122 can inspect the tank to make quality metric measurements, such as measurements related to the thickness or level of corrosion of a portion of the tank. The inspection device 122 can initiate a tank inspection process 134 to make quality metric measurements for portions of the tank. The tank inspection process 134, which can be retrieved from the vehicle resource repository 126, which can be subsequent to the generation of a portion of a tank map 130. The tank inspection process 134 can be based on the result of the diagnostic program 138. The ATIS 102 can store the inspected portion of the tank within the tank map 130 in the vehicle resource repository 126. The inspection device 122 can determine a quality metric 136 of a portion of the tank. The quality metric 136 can include or indicate the thickness of a portion of the tank, or a level of corrosion of a portion of the tank. The vehicle 101 can determine and store the quality metric 136 in the vehicle resource repository 126. The inspection device 122 can execute the inspection process 134 responsive to identifying that a portion of the tank map 130 has not yet been inspected. The inspection device 122 can, however, determine not to execute the inspection process 134 responsive to identifying that the portion of the tank map 130 has already been inspected, thereby reducing computing and energy resource consumption by the vehicle 101.

Figure 3:
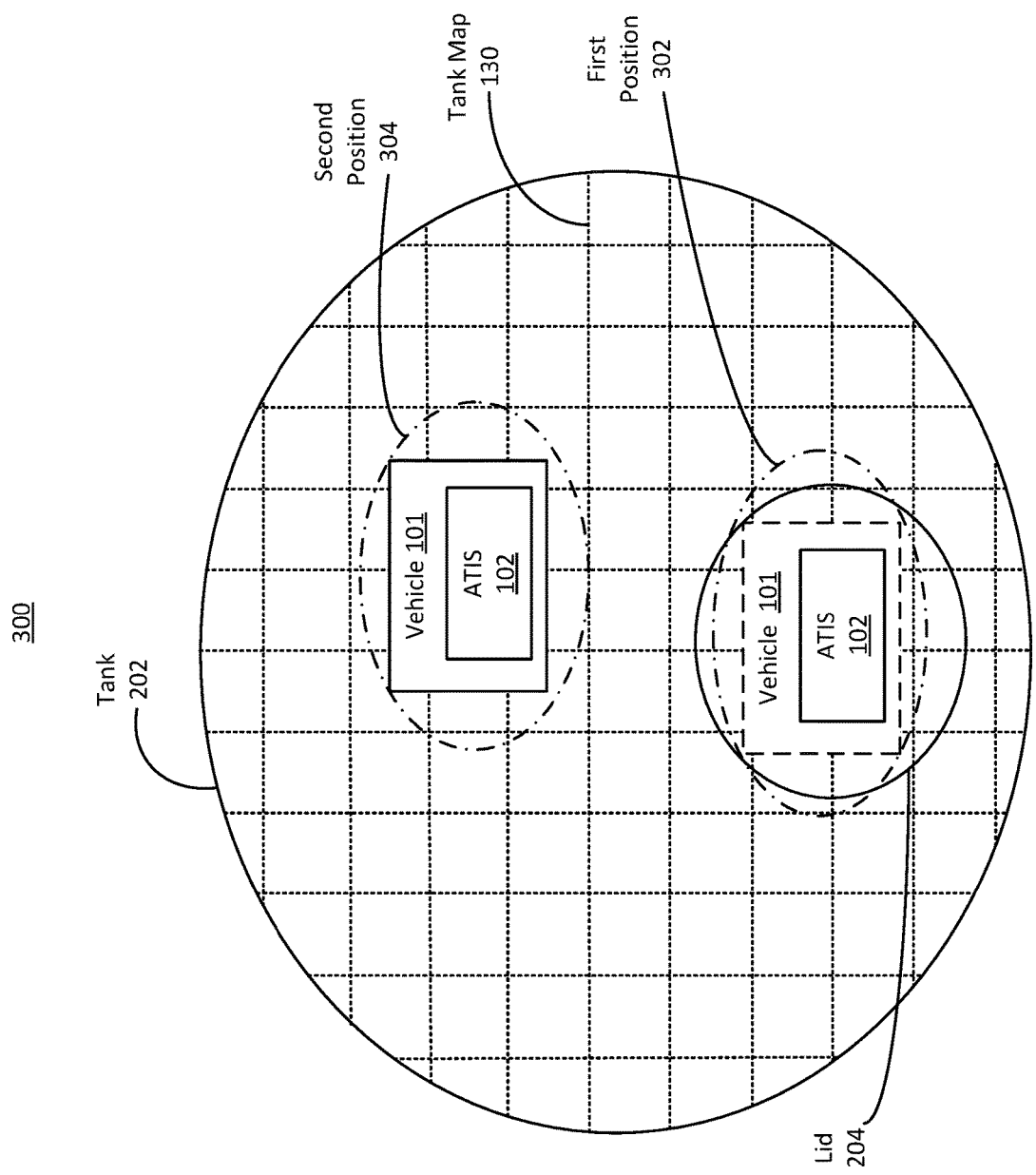
FIG. 3 is an example illustration of a system inspecting a tank containing a flammable, in accordance with an implementation.

The inspection device 122 can use the magnetic sensor or magnetic sensor array to determine the thickness of the tank floor. The magnetic sensor can include one or more coils or one or more conductors that can generate a magnetic field. The inspection device 122 can induce loops of electric current at one or more portions of the tank corresponding to a first position of the vehicle 101 on the tank map 130 (e.g., as illustrated in FIG. 3). The position can refer to a region, area or section of the tank. The control unit 104 can provide instructions or commands to the inspection device 122 to cause the inspection device 122 to modify the magnitude, intensity, or duration of the magnetic field generated by the conductors. For example, the control unit 104, executing the inspection process 134, can generate control commands and output the commands to the inspection device 122.

The inspection device 122 can detect or measure values corresponding to the induced loops of electric current at the one or more portions of the tank. The measured values can correspond to a property of the magnetic field, such as a magnitude, intensity, or decay time, and can be stored in the collected data 132 of the vehicle resource repository 126. The control unit 104 can receive the detected or measured values from the inspection device 122, and process the values to determine a quality metric. The control unit 104 can store the received values as collected data 132 for future processing by the ATIS 102 or an external data process system. To process the values, the inspection unit 112 can use a thickness table (e.g., stored in the vehicle resource repository 126) to convert the measured values associated with the magnitude field to tank floor thickness, which can be stored in the quality metric data structure 136.

The vehicle 101 can include a sweeping device to remove debris that might negatively affect measurements related to the quality metric. For example, the sweeping device can remove substances between the tank enclosure and the inspection device 122 (or sensors 116). The vehicle 101 can measure values after sweeping to obtain an accurate measurement. The vehicle 101 can measure values before and after sweeping to determine the variation or impact on the measurement caused by the debris.

The inspection device 122 can generate pulsed eddy currents to determine the quality metric 136. The inspection device 122 can include a pulsed eddy currents probe to determine a thickness or a corrosion of the tank floor using the pulsed eddy current. The magnetic field can penetrate through the one or more layers or constructions of the tank floor and stabilize in the layer of the tank floor. The electrical current generated by the inspection device 122 can be disabled to cause a drop in the magnetic field, which results in eddy currents appearing in the layers of the tank floor and decreasing strength over time. The pulsed eddy currents probe can be used to monitor the decay in eddy current, the decay can determine the thickness of the tank floor. The electrical current magnitude in a given loop can be proportional to the strength of the magnetic field, the area of the loop, and the rate of change of flux, and inversely proportional to the resistivity of a material.

The inspection device 122 can generate array eddy currents along an array of coils to determine the quality metric 136 at a portion of the tank corresponding to a second position of the vehicle 101 on the tank map 130. The second position can be referred to in FIG. 3. An alternating current can be injected into the coil of the inspection device 122 to create a magnetic field. The inspection device 122 can be placed over the tank floor to generate one or more opposed alternating current. The inspection device 122 can then determine a flaw or corrosion of the tank floor based on the measured distortion of the opposed alternating current.

The inspection device 122 can include an ultrasonic array system or ultrasonic phased array system to determine a second quality metric 136 at the portion of the tank corresponding to the first position of the vehicle 101 on the tank map 130. The second quality metric 136 can be similar to, or different from, the first quality metric 136. The ultrasonic phased array system can include ultrasonic transducers, which can be pulsed independently using computer-calculated timing. Pulsing the ultrasonic transducers can result in steering a beam generated by the ultrasonic transducers to scan the portions of the tank. The inspection device 122 can include two different technologies to generate the quality metric 136 at the portion of the tank. For example, the inspection device 122 can determine a thickness of the tank floor using eddy currents information and a thickness of the tank floor using the ultrasonic phased array information. This allows the vehicle 101 to take advantage of the complementarity of the two technologies. For example, eddy current technology can provide better results compared to ultrasonic technology in the presence of residual sediment after the brush cleans the floor, or in the case the tank floor inside the tank (e.g., topside) is corroded corrosion. Ultrasonic can provide better results as compared to eddy current technology when the floor has been sufficiently cleaned by the brush and is primarily affected by pitting. In some cases, one technology may consume more battery power than another technology, so the vehicle 101 can select a lower power technology in the event the battery level is low in order to prolong the inspection. Thus, the inspection device can include at least two different types of sensors, and select, based on a condition associated with the portion of the tank corresponding to the first position of the vehicle on the map, one of the at least two different types of sensors to inspect the portion of the tank.

Figure 2A:
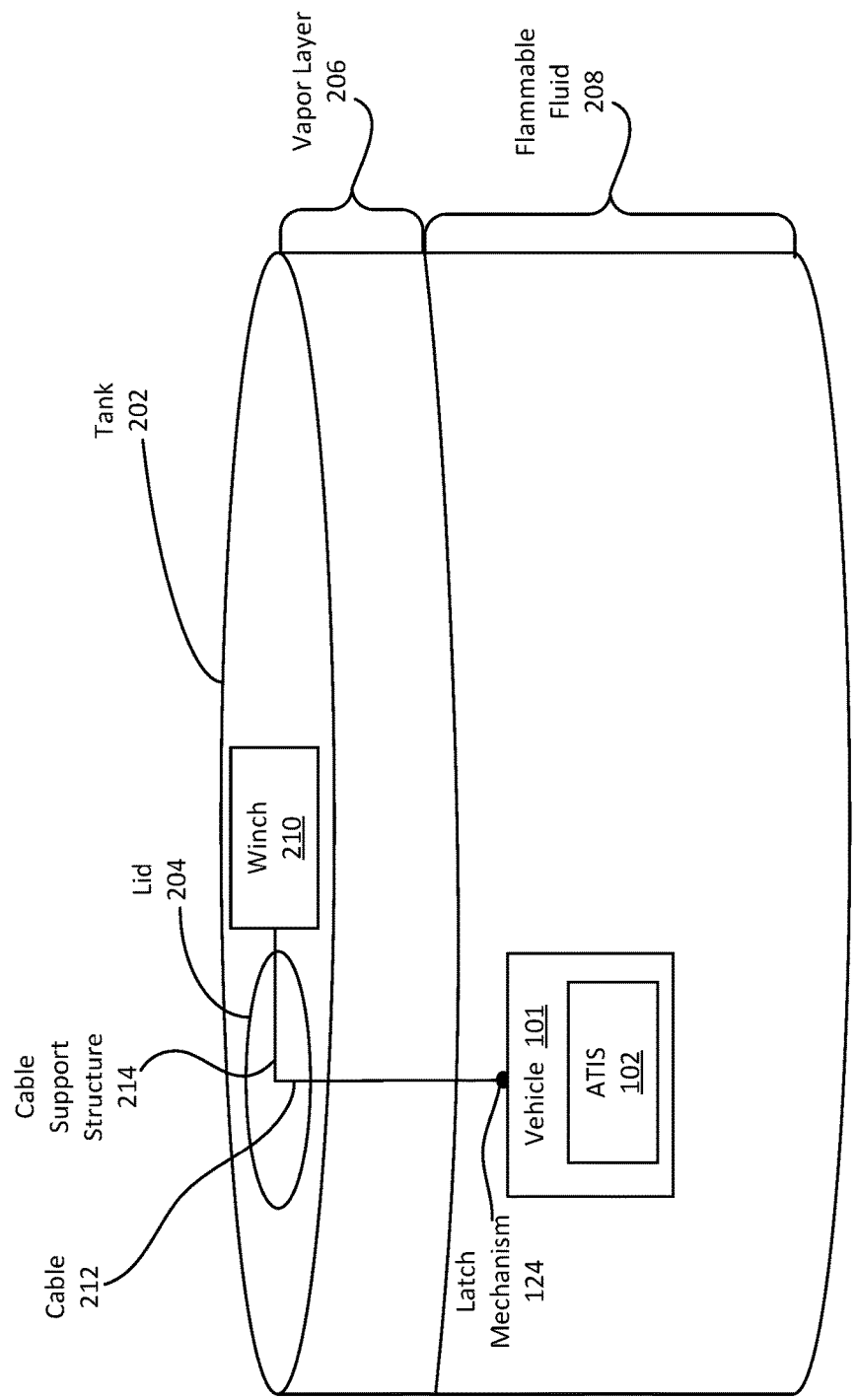
FIG. 2A is an example illustration of a system inspecting a tank containing a flammable, in accordance with an implementation.
Figure 2B:
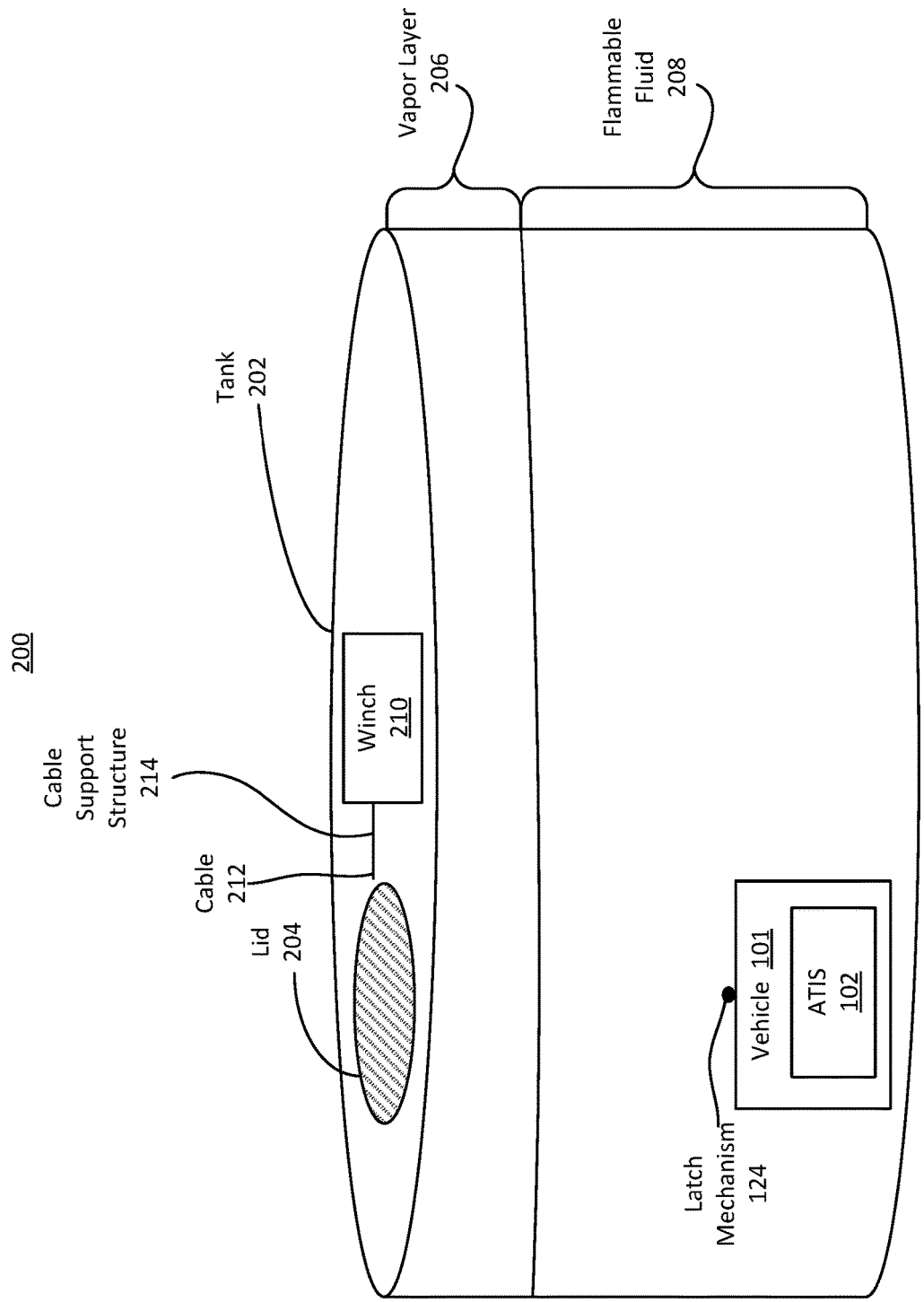
FIG. 2B is an example illustration of a system inspecting a tank containing a flammable, in accordance with an implementation.

The latch mechanism 124 can include a latch detection sensor or a latch lock. The winch can be located external to the tank. The latch mechanism 124 can be connected to the battery 114. The latch detection sensor can determine a state of the latch mechanism 124. The state of the latch mechanism 124 can include a connected state or a disconnected state of the cable 212. The latch mechanism 124 state can indicate the connectivity of the latch, which can be based on a presence or an absence of the latch provided to the control unit 104. The latch detection sensor can include circuitry to determine a latch connection based on an indication of continuous electrical signal. The continuous electrical signal can be provided based on a closed loop connection, which can indicate a connected state of the latch. The disconnection of the latch can be determined based on an absence of the continuous electrical signal. The latch mechanism 124 can be configured by the control unit 104 to execute one or more commands, such as lowering the vehicle 101, by the winch unreeling the cable, into the tank containing the flammable fluid. FIGS. 2A-2B depict an example winch. The latch mechanism 124 can determine to remove the cable from the tank, subsequent to deploying the vehicle 101, for example, reeling the cable subsequent to disengaging the cable from the vehicle 101 to remove the cable form within the tank using the winch. The latch mechanism 124 state can be used by the control unit 104 to determine that a cable used to lower the vehicle into the tank containing the flammable fluid is detached from the vehicle 101. The indication of the detached cable can be provided to the control unit 104 to command the propeller 118 to move the vehicle 101 through the flammable fluid. The latch mechanism 124 can maintain or update the latch mechanism 124 state in the collected data 132 of the vehicle resource repository 126. The latch mechanism 124 can transmit an acknowledgement to the control unit 104 to execute the diagnostic program 138 based on the disconnection of the latch.

The latch mechanism 124 can couple the cable to the vehicle 101 to lower the vehicle 101 into the flammable fluid in the tank using a winch. The latch mechanism 124 can couple the cable to the vehicle 101 to lift the vehicle 101 from the flammable fluid in the tank. The latch mechanism 124 can disengage the cable, based on the vehicle 101 lowered into the tank. The latch mechanism 124 can be locked or unlocked by an actuator of the vehicle 101 connected to the battery 114, the actuator can be configured by the control unit 104. The actuator can unlock the latch mechanism 124 to disengage the cable subsequent to the vehicle 101 lowered into the flammable fluid. The latch mechanism 124 can re-engage the cable to couple the cable to the vehicle 101 based on an exit condition indicated by the inspection process 134, or the diagnostic program 138. The latch mechanism 124 coupling the cable to the vehicle 101 can be controlled by the control unit 104 based on a state of the cable. The latch mechanism 124 state can be used by the control unit 104 to decouple the cable from the vehicle 101 in the flammable fluid based on a first state of the latch mechanism 124 and a policy. The latch mechanism 124 state can be used by the control unit 104 to command the propeller 118 to move the vehicle 101 based on a second state of the latch mechanism 124.

The winch 210 can unreel the cable into the tank upon completion of the tank inspection process 134 comprising generating the map of the tank and storing a plurality of indications of the quality metric 136 for the portion of the tank. The cable can then be re-engaged with the vehicle 101 upon unreeling the cable into the tank using the winch. The winch can then reel the cable re-engaged with the vehicle 101 to remove the vehicle 101 from within the tank.

The vehicle resource repository 126 can include or store the propeller control program 128, the tank map 130, the collected data 132, the tank inspection process 134, the quality metric 136, and the diagnostic program 138. The propeller control program 128 can include or store one or more propeller commands, the propeller commands can determine propeller speed, torque, and orientation, which can adjust the vehicle 101 speed, distance travel, or direction, for example. The propeller control program 128 can be controlled based on the result of the diagnostic program 138 or the state of the cable of the latch mechanism 124. The propeller control program 128 commands can include moving the vehicle 101 through the flammable fluid in the tank. The propeller control program 128 can be used or updated by the navigation unit 110 of the control unit 104 to control the propeller 118.

In some cases, the propeller control program 128 can be configured by the control unit 104 to operate in high performance state based on the available power of the battery 114 or the tank map 130 dimension. In some cases, the propeller control program 128 can operate in low power state based on the available power reaching a first power threshold. In some cases, the propeller control program 128 can initiate an exit condition based on the available power reaching a second power threshold, lower than the first power threshold. In some cases, the propeller 118 can operate in the cooling state, based on the temperature information of the battery 114 or the propeller 118.

The tank map 130 can include, store, or maintain one or more maps of the tank to generate a path for tank inspection or a map data structure to generate a map of the tank. The map data structure can be stored in the data repository 126, which can be part of the tank inspection process 134. The tank map 130 can store information collected from the ranging device 120, which can be configured by the inspection unit 112 of the control unit 104. The tank map 130 can include or store information on the dimension of the tank, or position information of the vehicle 101 corresponding to the map. The dimension information of the tank can include length, width, height, or the circumference or diameter or radius, which can be used by the navigation unit 110 to set the vehicle 101 speed to move in the tank or by the inspection unit 112 using the tank inspection process 134 to set the inspection speed. The tank map 130 can include or store information on one or more inspected portions or one or more uninspected portions of the map. The tank map 130 can be updated by data received from the ranging device 120.

The collected data 132 can include or store data from the sensors 116, the propeller 118, the inspection device 122, the latch mechanism 124, or the battery 114. The sensor data can include the speed of the vehicle 101, speed of the propeller 118, temperature of the vehicle 101 (or portion thereof), temperature of the propeller motor 118, temperature of the battery 114, the travel distance (or position, direction, or heading) of the vehicle 101, the propeller 118 torque, touch information, the magnetic field information, the ultrasonic sensor information, or the latch connection information. The collected data 132 can store acknowledgement feedback from the propeller 118 as a response to the propeller 118 receiving the control instruction. The collected data 32 can store inspection data obtained by the inspection device 122, including magnetic field information and the ultrasonic sensor information to determine a quality metric 136 of the tank enclosure. The collected data 132 can store diagnostic result from executing the diagnostic program 138. The diagnostic result can be used by the control unit 104 to determine whether to initiate the tank inspection process 134, disable the propeller 118 to prevent the propeller 118 from moving the vehicle, or set a speed of the propeller 118. The collected data 132 can include or store latch connectivity information to lower the vehicle 101, via a cable, into the tank containing the flammable fluid, or to remove the cable from the tank, subsequent to deploying the vehicle 101. The collected data can include or store the battery information indicating the power available in the battery 114, the power available can initiate the operation condition by the control unit 104.

The tank inspection process 134 can include or store a plurality of inspection instruction, which can comprise generating the tank map 130 and determining a quality metric 136 for a portion of the tank corresponding to a location on the generated map. The tank inspection process 134 can be configured or used by the inspection unit 112 of the control unit 104 to initiate the inspection device 122. The tank inspection process 134 can be configured based on the result of the diagnostic program 138. The tank inspection process 134 commands can include sweeping instruction for removing sediment on the tank floor, or data collection command for the inspection unit 112 to determine the quality metric 136 of a portion of the tank. The tank inspection process 134 can maintain or update the inspection commands based on the collected data 132 from the inspection device 122, one or more uninspected portions of the tank indicated by the tank map 130, or path of the tank inspection based on the navigation unit 110.

The control unit 104 (e.g., via an inspection unit 112) can retrieve, from the vehicle resource repository 126, a tank inspection process 134. The control unit 104 can load, execute, initiate, run or otherwise perform the tank inspection process 134 retrieved from the vehicle resource repository 126. The tank inspection process 134 can include one or more rules, parameters, conditions, operations, procedures, or other information used to perform a tank inspection. For example, the tank inspection process 134 can include a type of tank inspection, such as an expedient, preliminary, or efficient inspection on one or more portions of the tank floor based on the tank map 130. The tank inspection process 134 can execute a type of inspection based on the size of the tank, tank status, vehicle 101 status, or other condition. An expedient inspection process can reduce the amount of time spent inspecting one or more portion of the tank floor. The expedient inspection process can include increasing the speed at which the vehicle 101 moves through the flammable fluid within the tank, or using a wider track spacing than the length of the inspection device such that the tank floor is not fully covered.

The tank inspection process 134 can maintain or update a predetermined duration (e.g. 30 minutes, 1 hour, 2 hours, etc.) for tank inspection based on one or more inspection unit 112 commands. The predetermined duration can be stored in the tank inspection process 134. The tank inspection process 134 can include a timer based on the predetermined duration. The tank inspection process 134 can be initiated the timer based on the vehicle 101 being sealed in the tank, the timer can provide an indication to terminate the tank inspection process 134 based on the timer reaching the predetermined duration (e.g. expiration of the timer).

The quality metric 136 can refer to values, measurements, or determinations made using collected data 132. The quality metric 136 can be generated by applying one or more processes or techniques to the collected data 132. The processing techniques can include, for example, a thickness measurement technique, thickness table, or corrosion level measurement technique. The quality metric 136 can include or indicate computed thickness information which can be obtained by using the stored collected data 132 from the inspection device 122. The quality metric 136 can maintain and update one or more corrosion level corresponding to the portion of the tank map 130 determined by the inspection device 122. The quality metric 136 can indicate the corrosion level for one or more portions of the tank based on a plurality of tank inspection process 134 performed by the vehicle 101 during a time interval. The quality metric 136 can indicate the corrosion level based on a comparison between the computed thickness information of a first portion compared to a previous inspected thickness information of the first portion, which can be from past inspection, or a second portion thickness information different from the first portion using the thickness table. The thickness table can indicate the standard thickness corresponding to the tank, the standard thickness corresponding to the original thickness of the tank prior to filling the tank with the flammable fluid. The thickness table can include a comparison between magnitude, intensity, or decay time of a magnetic field to the thickness of the tank. The quality metric 136 can include or store a comparison metric, identifying corrosion level difference between the one or more portions of the tank.

The diagnostic program 138 can include or store diagnostic instruction for the vehicle 101. The diagnostic program 138 can include or store one or more instructions to at least test one or more functionalities of the sensors 116, the propeller 118, the ranging device 120, the inspection device 122, the latch mechanism 124, or the battery 114. The diagnostic program 138 can include one or more policies indicating a required condition of the vehicle 101. The required condition can include the vehicle 101 at least partially submerged in the flammable fluid or a successful test of the one or more functionalities of the ATIS 102. The condition can be used by the control unit 104 to provide one or more instructions to the component. The diagnostic program 138 can store one or more diagnostic results in collected data 132 of the vehicle resource repository 126. The diagnostic program 138 can disable the propeller 118 to prevent the propeller 118 from moving the vehicle 101 from a position.

The diagnostic program 138 can provide the one or more diagnostic results to the control unit 104 for determining to initiate the tank inspection process 134, or to initiate the operation condition, which can be based on one or more condition of the ATIS 102 components including the power available in the battery 114, the state of the latch mechanism 124, the sensors 116 information, the propeller 118 information, the ranging device 120 information, or the inspection device 122 information. The diagnostic program 138 can detect the state of the cable, which can indicate the connection of the cable to the vehicle 101. The operation condition can include an exit condition, a wait condition, a low power state, a cooling state, or a high performance state. The exit condition can include one or more commands to move the vehicle 101 towards a first portion of the tank map 130, reel down the cable to the vehicle 101, cause the latch mechanism 124 to re-engage the cable to couple to the cable to the vehicle 101, or terminate vehicle 101 operation. The exit condition can be based on an expiration of a timer of the tank inspection process 134. The wait condition can include one or more commands to hold the vehicle 101 operation which can include movement and sensor activation, or initiate a countdown before executing the vehicle 101 operation. The low power state can include one or more commands to decrease the propeller 118 speed, deactivate one or more sensors 116, or execute a quick tank inspection process 134 which can cover more portions of the tank using the available power of the battery 114. The cooling state can include one or more commands to initiate the propeller 118 inside the body of the vehicle 101 to cool the ATIS 102, decrease execution of the ATIS 102, or hold the vehicle 101 operation based on the temperature. The high performance state can include one or more commands to increase execution of the ATIS 102 which can include activating one or more sensors 116, increasing the propeller 118 speed, or initiating a comprehensive tank inspection process 134.

The control unit 104 of the ATIS 102 can include the interface 106, the mapping unit 108, the navigation unit 110, and the inspection unit 112. The control unit 104 can configure the sensors 116, the propeller 118, the ranging device 120, the inspection device 122, and the latch mechanism 124 using the interface 106, the mapping unit 108, the navigation unit 110, or the inspection unit 112. The control unit 104 can be connected to the battery 114. The control unit 104 can receive an indication of the latch mechanism 124 state from the latch mechanism 124, determine that a cable used to lower the vehicle 101 into the tank containing the flammable fluid is detached from the vehicle 101 based on the latch mechanism 124 state, and command the propeller 118 to move the vehicle 101 through the flammable fluid based on the cable having been detached. The control unit 104 can command the latch mechanism 124 to decouple the cable from the vehicle in the flammable fluid based on the policy and the first state of the latch mechanism 124. The control unit 104 can command the propeller 118 to move based on the second state of the latch mechanism 124, the second state different from the first state.

The control unit 104 can determine to generate the map for the tank based on the vehicle 101 being lowered in the tank. The control unit 104 can then instruct the ranging device 120 using the mapping unit 108 to generate the map for the tank. The map of the tank can be stored in tank map 130. The control unit 104 can identify one or more uninspected portions of the tank based on an absence of indication of inspected one or more portions of the tank map 130. The uninspected one or more portions of the tank can be flagged by the inspection unit 112, the flag can be stored in the tank map 130. The control unit 104 can cause the propeller 118 of the vehicle 101 to move the vehicle 101 towards the identified uninspected portion of the tank. The control unit 104 can initiate the tank inspection process 134 on the uninspected portion using the inspection unit 112. The control unit 104 can identify an absence of any uninspected portions of the floor of the tank based on the tank map 130 generated. The control unit 104 can then provide an indication that the tank inspection process 134 is complete using the exit condition based on identifying the absence of an uninspected portion of the tank. The indication of completing the tank inspection process 134 can comprise an acoustic signal or radio waves.

The interface 106 can include an LCD display, which can include haptic feedback capability for receiving and transmitting information to the control unit 104. The LCD display of the interface 106 can include a graphical user interface which can be used to configure the vehicle 101 setting prior to lowering the vehicle 101 into the flammable fluid. The interface 106 can maintain or update processes of the mapping unit 108, the navigation unit 110, and the inspection unit 112 based on the received or transmitted information. The interface 106 can include one or more ports for external connection to the ATIS 102, such as a serial port, USB port, display port, Ethernet port, or Bluetooth receiver and transmitter. The one or more ports can be used to transfer one or more data to or from the vehicle resource repository 126, such as the propeller control program 128, the tank map 130, the collected data 132, the tank inspection process 134, the quality metric 136, or the diagnostic program 138. The port can be used to charge the battery 114 of the vehicle 101. The interface 106 can be covered by one or more materials for waterproofing.

The mapping unit 108 can provide one or more commands to the ranging device 120, which can be based on the tank map 130, the collected data 132, or the tank inspection process 134. The mapping unit 108 can initiate the map data structure stored in the data repository 126 to generate the map of the tank using the ranging device 120. The mapping unit 108 can be connected to the battery 114. The mapping unit 108 can configure or instruct the ranging device 120 to collect acoustic, electromagnetic radiation, touch or other data associated with the tank. The mapping unit 108 can store the collected data and generate a map of the tank, which can be stored in the tank map 130 located in the vehicle resource repository 126. The mapping unit 108 can determine a first position of the vehicle on the tank map 130. The mapping unit 108 can receive data from the ranging device 120 to generate or update the tank map based on traversing a plurality of points of the tank.

The navigation unit 110 can provide one or more commands to the propeller 118, which can be based on the propeller control program 128, the tank map 130, the operation condition based on the diagnostic program 138 result, or the collected data 132. The navigation unit 110 can configure the propeller 118 to move the vehicle 101 through the flammable fluid in the tank from the first position to the second position, which can be based on the tank inspection process 134. The navigation unit 110 can disable the propeller 118 to prevent the propeller 118 from moving the vehicle 101 from the second position based on the operation condition. The navigation unit 110 can hold the vehicle 101 operation before execution of the diagnostic program 138. The navigation unit 110 can further configure the propeller 118 speed, which can be based on the operation condition, or the location of the vehicle 101. The navigation unit 110 can navigate the vehicle 101 to only the one or more uninspected portions of the tank based on the tank map 130. The navigation unit 110 can navigate the vehicle 101 to cover the entire tank map 130.

The inspection unit 112 can provide one or more commands to the inspection device 122, which can be based on the tank inspection process 134 or the quality of the collected data 132 stored in the vehicle resource repository 126. The inspection unit 112 can identify, based on the collected data 132 using the inspection device 122, the quality of the collected data 132 for the quality metric 136. The quality of the collected data 132 can be based on the inspection device 122, the magnitude of noise obtained by the inspection device 122, or obstruction within the tank, for example, one or more substances covering the tank enclosure can misrepresent the thickness of the tank. The inspection unit 112 can configure the inspection device 122 to inspect the tank based on initiating a tank inspection process 134. The tank inspection process 134 can be based on the operation condition of the diagnostic program 138 result.

The inspection unit 112 can determine the quality metric 136 of a portion of the tank based on the collected data 132 from the inspection device 122, the quality metric 136 indicating a thickness of the portion of the tank at a vehicle 101 position. The quality metric 136 determined by the inspection device 122 can be stored in the vehicle resource repository 126 accessible by the control unit 104. The inspection unit 112 can update the tank inspection process 134 based on the collected data 132, for example, to repeat the tank inspection process 134 on one or more portions of the tank. The inspection unit 112 can re-execute the tank inspection process 134 based on the identified quality of the collected data 132. The inspection unit 112 can configure the inspection device 122 to perform the quick inspection based on the tank map 130 size, or the operation condition, for example, the inspection unit 112 can initiate the quick inspection during the low power state based on the available power of the battery 114 and the one or more uninspected portions of the tank.

Referring now to FIGS. 2A-2B, example illustrations for inspecting a tank containing a flammable fluid, in accordance with some implementations, are shown. The system 200 can include one or more component or functionality of system 100 depicted in FIG. 1. FIG. 2A provides a side view illustration of the tank 202. The system 200 can include a vehicle 101, a tank 202, or a winch 210. The vehicle 101 can include one or more aspects of the vehicle 101 depicted in FIG. 1. The vehicle 101 can include an autonomous tank inspection system ("ATIS") 102 which can comprise one or more aspects depicted in FIG. 1. The tank 202 can include a lid 204, a vapor layer 206, and the flammable fluid 208. The tank 202 can be constructed using one or more materials including metal (e.g. steel, aluminum, alloys, etc.), glass, or plastic (e.g. high-density polyethylene). The lid 204 of the tank can be constructed using the one or more materials similar to the tank 202. The lid 204 can be configured with a locking mechanism to prevent opening of the lid 204 prior to a completion of the tank inspection process 134. The lid 204 can be constructed to seal or keep the vapor layer 206 within the tank 202.

Within the tank 202, and above the surface of the flammable fluid 208, there can be a vapor layer 206. The vapor layer 206 can refer to or include a gaseous state of the flammable fluid 208. The vapor layer 206 can be internal to the tank 202 and above the flammable fluid 208. The vapor layer 206 can be flammable. The vehicle 101 can traverse the vapor layer 206 when the winch 210 lowers the vehicle 101 into the flammable fluid 208, or retrieves the vehicle 101 from the flammable fluid 208.

The winch 210 can include, for example, a snubbing winch, a wakeskate winch, a glider winch, or an air winch. The winch 210 can include a motor, pulley, conveyor, engine, or other mechanism such as a geared hand crank to haul, lift, move or transport the vehicle 101 using a cable 212. The winch 210 can be positioned on the tank 202. The winch 210 can include one or more component depicted in system 400 to control operation of the winch 210. An administrator or user can control the operation of the winch 210.

The cable 212 can include a rope, or wire. The cable 212 can include, or be constructed with, one or more materials such as polyester, nylon, steel, rubber, plastic, cloth, alloys, or wires. To facilitate discharge of potential static build up on the vehicle 101, the cable can be constructed or formed of metal and grounded (e.g., on the topside of the tank).

The cable 212 can be a passive metal cable, or include a copper or fiber optic network cable for receiving or transmitting information to or from the vehicle 101. The cable 212 may not provide any data transfer as the vehicle 101 is deployed and traverses the vapor layer above the flammable fluid, but may transfer data prior to deployment or subsequent to the vehicle 101 being submerged in the flammable fluid. The winch 210 can use the cable 212 to lower the vehicle 101 into the tank 202, or lift the vehicle 101 from the tank 202. The cable 212 can be grounded such that electrostatic charge built up on the vehicle 101 may be discharged when latching on the grounded recovery cable 212. Materials for the cable 212 can be selected to prevent or minimize electrostatic charge build up, or facilitate discharge of electrostatic charge.

The winch 210 can lower the vehicle 101 into the tank 202 with a cable 212. Before lowering the vehicle 101 into the tank, the lid 204 of the tank is opened or removed, thereby creating an opening in the tank 202. The lid 204 can be located on a top portion of the tank 202 such that opening the lid 204 does not result in leakage of the flammable fluid 208. For example, the lid 204 can be located on a portion of the tank 202 that is above a surface of the flammable fluid 208. In some cases, the lid 204 can be temporarily submerged in the flammable fluid 208, but subsequently opened when the level of the flammable fluid 208 falls below an opening that results from opening the lid 204.

To lower the vehicle 101 into the tank 202 containing flammable fluid, the lid 204 can be opened or removed. A cable 212 is connected to the vehicle 101, which can include the ATIS 102. The vehicle 101 can include one or more components depicted in FIG. 1, including, for example, a battery 114 and control unit 104. The cable 212 can be connected to the vehicle 101 using a latch mechanism 124 of the vehicle 101. When using an actuator and sensor, the control unit 104 can receive, from the latch mechanism 124, an indication of the state of the latch mechanism 124. The state can indicate whether the cable 212 is connected to the latch mechanism 124 or the vehicle 101, or whether the cable 212 is disconnected from the latch mechanism 124 or the vehicle 101. The state can indicate a status of the latch mechanism 124, such as whether the latch mechanism 124 is operational or broken. The control unit 104 can lock or unlock, or engage or disengage, the latch mechanism 124 based on the state.

As illustrated in FIG. 2A, vehicle 101 is inserted into the tank 202 through the opening in the tank 202 formed by removing the lid 204. The winch 210 can lower, via the cable 212, the vehicle 101 through a vapor layer 206 within the tank 202 and into the flammable fluid 208. The vapor layer 206 can be located above the flammable fluid 208. The winch 210 can include or use a cable support structure 214 to guide the cable 212 through the lid 204. The cable 212 can be connected to the vehicle 101 via a latch mechanism 124 located on the vehicle 101. The cable support structure 214 can include, for example, a guide rail, conveyor, pipe, pulley, or other supporting structure.

The winch 210 can control one or more aspects related to lowering the vehicle 101 based on a state of the latch mechanism 124. For example, if the cable 212 is connected to the latch mechanism 124, then the state of the latch mechanism 124 can indicate that the cable is connected, engaged, or otherwise coupled to the vehicle 101. The state can be reflected as a binary value, such as 0 or 1, disconnected or connected, standby or active, or open or closed, for example. The latch mechanism 124 can include a sensor 116 or other electronic component that can determine the state of the latch mechanism 124. The vehicle 101 can determine the state of the latch mechanism 124. In some cases, the winch 210 can determine the state of the latch mechanism 124 based on a tension of the cable 212. For example, the tension of the cable 212 may be higher if the cable 212 is connected to the vehicle 101, as compared to when the cable 212 is not connected to the vehicle 101. The vehicle 101 can provide, or the winch 210 can receive or determine, the state of the latch mechanism 124. The winch 210 can determine to lower vehicle 101 into the tank 202 responsive to determining or detecting that the cable 212 is connected to the vehicle 101. The winch 210 can determine to retrieve, raise, or reel up the vehicle 101 responsive to determining or detecting that the cable 212 is connected to the vehicle 101 based on the state of the latch mechanism 124.

FIG. 2B is an example illustration of a system inspecting a tank containing a flammable liquid or fluid, in accordance with an implementation. The vehicle 101 can be lowered through the vapor layer 206 into the flammable liquid 208 using the winch 210 and cable 212. A mechanical pressure switch 140 located in the vehicle 101 can power-up the vehicle 101 when the surrounding pressure is equal to or greater than, for example, 1 meter depth in the flammable fluid, 2 meters depth, 3 meters depth or more. The latch mechanism 124 in the vehicle 101 can disengage the cable 212 after the vehicle 101 has been at least partially submerged in the flammable fluid 208. The control unit 104 can determine not to disengage the latch mechanism 124 from the cable 212 until the vehicle 101 is at least partially submerged in the flammable fluid 208, or not to disconnect until the vehicle 101 has come into contact with the tank floor. The control unit 104 can determine that the cable 212 used to lower the vehicle 101 into the tank 202 containing the flammable fluid 208 is detached from the vehicle 101 based on the disconnected state of the latch mechanism 124.

As illustrated in FIG. 2B, the winch 210 can remove the cable 212 from the tank 202. The winch 210 can remove the cable 212 from the tank 202 responsive to the cable 212 disengaging from the latch mechanism 124 of the vehicle 101. The winch 210 can determine to remove the cable 212 from the tank 202 based on the disconnected state. After the cable 212 has been removed from the tank 202, the lid 204 can close the opening in the tank used to lower the vehicle 101. The lid 204 can seal the tank, thereby preventing the release of any vapor from the vapor layer 206, or the flammable fluid 208. By closing the lid 204, the vehicle 101 can be sealed in the tank 202 without being connected to the winch 210 or any other component or system external to the tank 202. For example, the vehicle 101 may not be physically coupled or connected to any system or component external to the tank 202. The vehicle 101 may not be communicatively coupled to any system or component external to the tank 202 via a cable 212 or wire.

The winch 210 can determine to remove the cable 212 from the tank 202 based on a sensor 116, such as a mechanical force sensor, on the cable 212 indicating a disconnection of the latch mechanism 124 from the cable 212. The sensor 116 on the cable 212 can determine the vehicle 101 was lowered into the flammable fluid 208 based on the difference of forces measured by the sensor 116. For example, the sensor 116 can measure a 1000 N force prior to lowering the vehicle 101 into the tank, measure a 50 N force when the vehicle 101 is fully submerged in the flammable fluid 208 prior to reaching the tank 202 floor, and measure a 10 N force when the vehicle 101 rests on the tank 202 floor. Once the latch mechanism 124 detaches the vehicle 101 from the cable 212, the force measure by the force sensor 116 goes to near 0. The winch 210 can then determine, based on the difference between the forces measured by the sensor 116, to reel up the cable 212 based on the vehicle 101 being at least partially submerged and detached from the cable 212 in the flammable fluid 208 or the vehicle 101 resting on the tank 202 floor and detached from the cable 212. The winch 210 can further determine to remove the cable 212 from the tank 202 based on a timer. The timer can be predetermined based on a historical data 420 indicating a time for the vehicle 101 to be lowered into the tank 202 and disconnect the cable 212 from the latch. The historical data 420 can be referred to in FIG. 4.

The vehicle 101 can perform the tank inspection process 134 using power provided by the battery 114. The battery 114 can provide power to one or more component of the vehicle 101, including, for example, the control unit 104, sensors 116, propeller 118, ranging device 120, inspection device 122, latch mechanism 124 or data repository 126. The control unit 104 can execute a tank inspection process 134 to inspect the tank. The tank inspection process 134 can include instructions to generate a map of the tank 202 or to determine a quality metric 136 for a portion of the tank 202 corresponding to a location of the generated tank map 130. The control unit 104 can perform or execute the one or more instructions of the tank inspection process 134 when the vehicle 101 is at least partially submerged, or fully submerged, in the flammable fluid 208. The control unit 104 can determine not to perform the tank inspection process 134 based on the state of the latch mechanism 124. For example, if the state of the latch mechanism 124 indicates that the cable 212 is still connected to the vehicle 101, the control unit 104 can determine not to initiate the tank inspection process 134, or otherwise abort or terminate the tank inspection process 134.

The control unit 104 can determine to not initiate, abort or terminate the tank inspection process if the lid 204 of the tank is open. The control unit 104 can receive an indication of whether the lid 204 is open or closed, or otherwise detect or determine whether the lid 204 is open or closed. For example, a sensor 116 (such as a light sensor or optical sensor) of the vehicle 101 can determine whether the lid 204 is open or closed by detecting a light source or an ambient light level in the tank 202. If the ambient light level is greater than or equal to a threshold, then the vehicle 101 can determine that the lid 204 is open. If the ambient light level is less than or equal to a threshold, then the control unit 104 can determine that the lid 204 is closed. Responsive to determining that the lid 204 is closed, the control unit 104 can command the propeller 118 to move the vehicle 101 through the flammable fluid 208. The vehicle 101 can determine that the cable has been detached from the vehicle 101 based on determining that the lid 204 is closed. The control unit 104 can determine generate a portion of the map 130 of the tank, and determine, via the inspection device 122, a quality metric 136 for the portion of the tank 202 corresponding to the portion of the map 130.

FIG. 3 is an example illustration for inspecting a tank containing a flammable fluid, in accordance with an implementation. The system 300 can include one or more component or functionality depicted in FIG. 1, 2A or 2B, including, for example, a vehicle 101 or a tank 202. FIG. 3 depicts a top view of the tank 202. The vehicle 101 can include one or more aspects of vehicle 101 of system 100 depicted in FIG. 1. The vehicle 101 can include an autonomous tank inspection system ("ATIS") 102 which can comprise one or more aspects depicted in FIG. 1. The vehicle 101 can generate a tank map 130, which can be represented in the illustration 300. The tank 202 can include a lid 204 or other aspects depicted in FIG. 2A-B. The system 300 can include an inspection device 122 of the vehicle 101, which can be electrically connected to the control unit 104 and the battery 114. The inspection device 122 can receive a command to initiate an inspection at the first position on the tank map 130 from the control unit 104 responsive to the ranging device 120 identifying a first position 302 of the vehicle 101 on the tank map 130. The inspection device 122 can be configured by the tank inspection process 134. The first position 302 can indicate the position of the lid 204 with respect to the tank 202, the lid 204 used for lowering the vehicle 101 into the tank 202. The control unit 104 can move the vehicle 101 to the first position 302 based on an initiation of an exit condition.

The system 300 can include the vehicle 101 located within the tank 202. The vehicle 101 can include the inspection device 122. The inspection device 122 can include one or more conductors. The vehicle 101 (e.g., via the inspection unit 112) can command the inspection device 122 to change a magnetic field generated by the one or more conductors to induce loops of electric current that extend towards a portion of the tank 202 corresponding to the first position 302 on the tank map 306. The vehicle 101 (e.g., via the inspection unit 112) can then detect or receive one or more values corresponding to the induced loops of electric current at the portion of the tank 202 corresponding to the first position 302 on the tank map 306. The one or more values can include a magnitude, amplitude, intensity, flux, flux density, decay time, or direction of the magnetic field, which can indicate the thickness of the tank 202. The magnitude or the direction of the magnetic field can correspond to the direction of the induced loops of electric current or magnitude of the electric current. The magnitude of a magnetic field can be provided in teslas ("T"), the flux of the magnetic field can be provided in webers ("Wb"), and the flux density can be provided as Wb/square meter.

Figure 4:
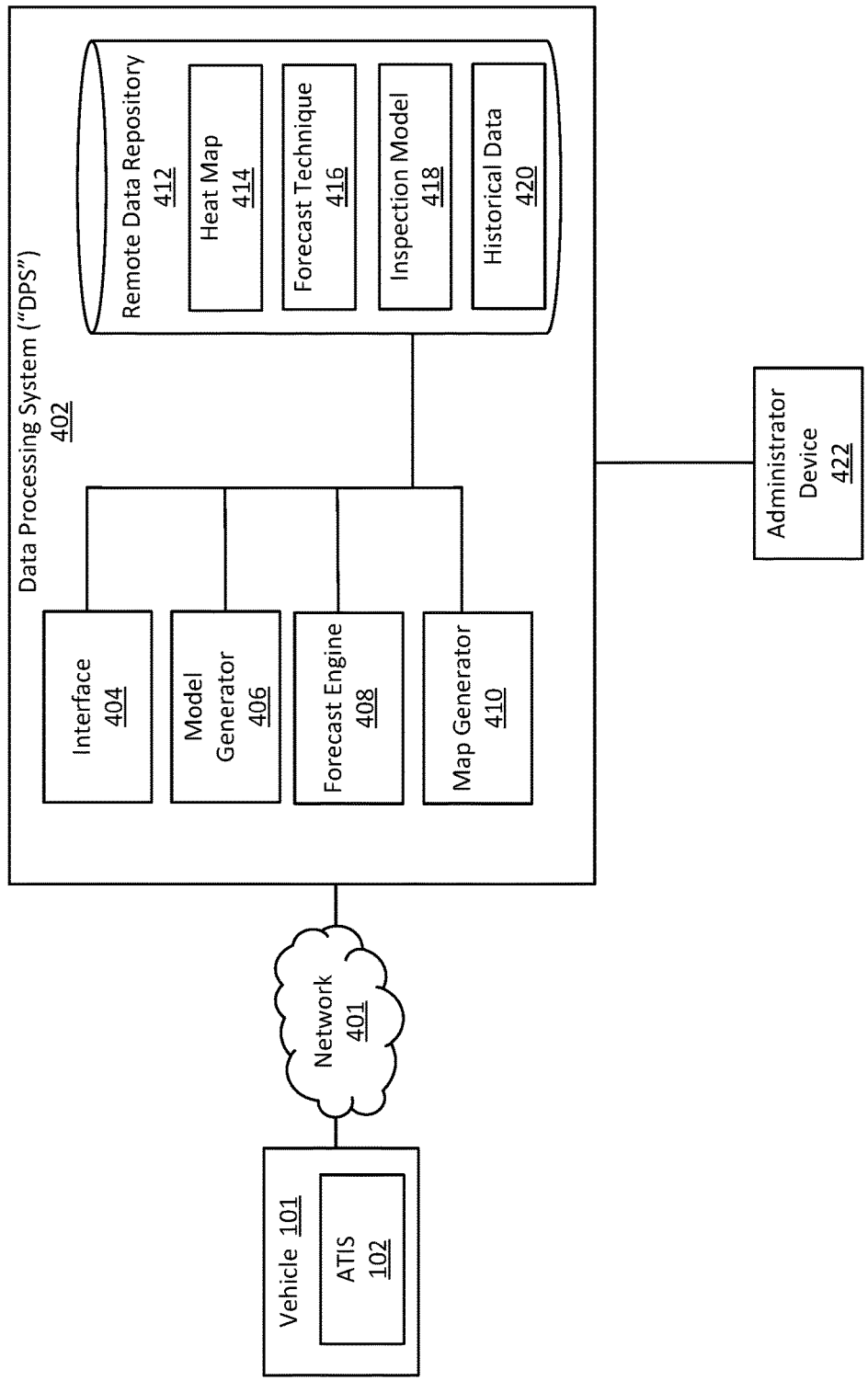
FIG. 4 is a block diagram of an example system to facilitate a tank inspection.

FIG. 4 is a block diagram of an example system to perform a tank inspection. The system 400 can include one or more component or functionality of system 100 depicted in FIG. 1. The system 400 can include a vehicle 101, network connection 401, data processing system ("DPS") 402, or administrator device 422. The vehicle 101 can include an autonomous tank inspection system ("ATIS") 102 which can include at least one aspect depicted in FIG. 1. The vehicle 101 can be connected to the network 401 via wired or wireless connection. The vehicle 101 can be disconnected from the network 401 and operate independent from the data processing system 402. The vehicle 101 can access information from the data processing system 402 via the network 401. The data processing system 402 can be updated or configured by the administrator device 422. The administrator device 422 can be connected wired or wireless to the data processing system 402.

The network 401 can include or refer to a wired or wireless connection, communication, or transfer of information. The network 401 can include computer networks such as the Internet, local, wide, metro, or other area networks, intranets, satellite networks, and other communication networks such as voice or data mobile telephone networks. The network 401 can include a wired connection or communication using, for example, USB, Ethernet, serial port, digital subscriber line ("DSL"), cable, or fiber. The network 401 can transmit information to or receive information from the vehicle 101 via the interface 106 of the vehicle 101.

The network 401 can be any type or form of network and can include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 401 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The data processing system 402 can include an interface 404, a model generator 406, a forecast engine 408, a map generator 410, or a remote data repository 412. The data processing system 402 can include hardware or a combination of hardware and software, such as communications buses, circuitry, processors, communications interfaces, among others, similar to the ATIS 102. The data processing system 402 can be connected to the vehicle 101 via the network 401. The data processing system 402 can be connected to the network 401 via a wired or wireless connection.

Each of the one or more components of the data processing system 402 can be implemented using hardware or a combination of software and hardware. Each component of the data processing system 402 can include logical circuitry (e.g., a central processing unit or CPU) that responses to and processes one or more instructions fetched from a memory unit (e.g., memory, storage device, or remote data repository 412). Each component of the data processing system 402 can include or use a microprocessor or a multi-core processor. A multi-core processor can include two or more processing units on a single computing component. Each component of the data processing system 402 can be based on any of these processors, or any other processor capable of operating as described herein. Each processor can utilize instruction level parallelism, thread level parallelism, different levels of cache, etc. For example, the data processing system 402 can include a logic device such as a computing device or server having at least one processor.

The one or more components or elements of the data processing system 402 can be one or more separate components, a single component, or be part of the data processing system 402. For example, the model generator 406 (or the other components of the data processing system 402) can include one or more combinations of hardware and software, such as one or more processors configured to initiate model generation commands, initiate update model commands, and transmit or receive the model information. The one or more components can work individually external to the data processing system 402.

The one or more component of the data processing system 402 can be configured or updated by the administrator device 422. The one or more components of the data processing system 402 can be connected or communicatively coupled to one another. The connection between the various components of the data processing system 402 can be wired or wireless, or any combination thereof.

The interface 404 of the data processing system 402 can include one or more ports for connecting to the network 401 or the administrator device 422. The one or more ports can include, for example, a serial port, USB port, Ethernet port, or Bluetooth receiver and transmitter. The interface 404 can transmit or receive one or more remote data repository 412 information to or from the vehicle 101 or the administrator device 422. The information of the remote data repository 412 can include a heat map 414, a forecast technique 416, an inspection model 418, and historical data 420. The interface 404 of the data processing system 402 can be similar to the interface 106 of the ATIS 102. For example, the interface 404 can be provided with one or more inspection information by the vehicle 101 to store or update the historical data 420. The interface 404 can be provided with one or more previous inspection information from a plurality of tanks 202 inspection by the administrator device 422 to update the historical data 420.

The model generator 406 can generate a risk-based inspection model 418 based on a time-series of quality metrics 136 determined based on ultrasonic thickness data or the loops of electric current provided by the inspection device 122 that extend towards one or more portions of the tank 202. The inspection model 418 can be stored in the remote data repository 412. The quality metric 136 can only store one or more raw information of the tank 202 based on the information from the inspection device 122. The model generator 406 can access or utilize the historical data 420 of the tank 202, the historical data 420 comprising one or more information of the quality metrics 136 from one or more past inspection of various tanks 202. The model generator 406 can generate a model based on a forecast of the forecast engine 408 using the forecast technique 416. The forecast can provide an indication of predicted one or more level of thickness of the tank 202 based on one or more information of the historical data 420.

The model generator 406 can aggregate one or more historical quality metrics 136 from the historical data 420 obtained from a plurality of tank inspections to forecast a level of thickness of the tank 202 based on the quality metric 136. The historical quality metrics 136 indicating one or more thickness level of the tank 202. The forecast thickness level of the tank 202 can indicate the risk of leakage of the tank 202, the risk can be provided to the administrator device 422. For example, a plurality of quality metrics 136 of the tank 202 obtained from year 2018 can be aggregated with a quality metric 136 of the tank 202 obtained from year 2019 using the forecast engine 408. The forecast engine 408 can utilize the forecast technique 416 to indicate a deterioration rate of the tank 202, which can be based on the difference between the 2019 quality metric and the 2018 quality metric. The model generator 406 can receive the indication of the deterioration rate of the tank 202 and generate a risk-based inspection model 418 which can indicate a time leakage will occur in one or more portions of the tank 202.

Inputs to the risk-based inspection model 418 can include original design and construction drawings as well as information about the quality of the materials and fabrication techniques (e.g., welding) used to build the tank, which can provide a baseline for future inspections. A record of operating conditions can allow verification that the tank was operated within its functional limits (e.g., max fill level). A history of tank floor quality metrics, recorded during previous inspections, can be used as the primary driver to establish deterioration trends using a variety of models associated with different types of deteriorations (for instance general, local or pitting corrosion). The forecast engine 408 can perform risk analysis by determining the probability of failure, which is then converted into a period of time after which the tank should be taken out of service for repairs. The forecast engine 408 can assess the probability of failure based on a qualitative approach (engineering/expert judgement and experience using qualitative terms such as very unlikely, unlikely, possible, probable, or highly probable), a semi-qualitative approach (modification of the nominal floor failure frequency—if available—by factors specific to the particular floor's management and environment) or a quantitative approach (structural reliability analysis method). The output of the model can include a period of time the tank can remain in service until the tank should be taken out of service for repairs. Thus, the model generator 406 can generate a risk-based inspection model based on a time-series of quality metrics (e.g., determined based on the loops of electric current provided by the inspection device that extend towards the portion of the tank), and aggregate the historical quality metrics obtained from a plurality of tank inspections to forecast a level of thickness of the tank based on the quality metric.

The forecast engine 408 can access one or more forecast techniques 416 to perform a risk prediction of the tank 202. The risk can indicate a corrosion level of the tank 202, an indication of the tank 202 thickness over time, or a leakage time of the tank 202. The risk can be determined based on a historical quality metric 136, a historical flammable fluid level, or a historical environment of the tank 202. The historical quality metric 136 can indicate one or more thickness levels of the tank 202 from one or more past inspection. The historical flammable fluid level can indicate a plurality of periodic flammable fluid levels of the tank 202 based on flammable fluid level information provided by the administrator device 422, or the historical data 420 including flammable fluid level information from a previous inspection of the tank 202. The historical environment or an environmental information of the tank 202 can indicate a plurality of periodic information based on atmospheric information (e.g. gases and other atmospheric particles) or a climate information provided by the administrator device 422 or the historical data 420 comprising one or more environmental conditions (e.g. temperature, humidity, etc.) of the tank 202 based on one or more past inspection. The forecast engine 408 can generate a graph to indicate a corrosion rate based on one or more historical data 420 containing a plurality of quality metric 136 from a plurality of inspections, the graph can be a time to thickness comparison. The quality metric 136 from the historical data 420 can be one or more points on the graph, for example, the forecast engine 408 can use a first quality metric 136 from an inspection of the tank 202 performed in the year 2010 and a second quality metric 136 from an inspection performed in the year 2015 to generate a line on the graph illustrating a linear rate of decay of the tank 202. The forecast engine 408 can further use the plurality of quality metric 136, such as 50 quality metrics 136 over a time, to predict a time interval for leakage based on the condition of the tank 202. The condition of the tank 202 can include a geographical location of the tank 202, a fuel level contained in the tank 202, or a current thickness of the tank 202. The graph can display a linear decay rate based on the tank 202 thickness from 20 cm to 15 cm and an exponential decay rate based on the tank thickness from 15 cm to 0 cm.

The map generator 410 can generate a heat map 414 of the tank 202 based on the quality metric 136 of the one or more portions of the tank 202. The map generator 410 can initiate a generation of the heat map 414, based on the vehicle 101 providing the tank map 130 and the quality metric 136 to the data processing system 402 via the network 401. The map generator 410 can aggregate the tank map 130 information and the quality metric 136 information to generate a heat map 414 indicating one or more levels of thickness of a plurality of portions of the tank 202 using a plurality of color codes. The plurality of color codes can range from red to green to blue. For example, a very thick portion of the tank 202 can be color coded with blue, a very thin portion of the tank 202 can be color coded with red, and a spectrum of color between the blue and the red can indicate the gradual increase or decrease of the thickness of the one or more portions of the tank 202. The map generator 410 can generate a 2-D heat map 414 or a 3-D heat map 414 of the tank 202 indicating the thickness of the plurality of portions of the tank 202.

The remote data repository 412 can include the heat map 414, the forecast technique 416, the inspection model 418, or the historical data 420. The remote data repository 412 can include storage (e.g. hard disk drives, solid state drives, floppy disks, magnetic tape, etc.) which can store tank information including information associated with previous inspections of one or more tanks. The remote data repository 412 can store environmental information. The environmental information can include, for example, atmospheric information (e.g. pressure, gases, atmospheric particles), climate information (e.g. temperature, humidity, radiation, and amount of rain), topographic information, altitude information, ground information, or subsurface information. The data processing system 402 can obtain the environmental information from the vehicle 101. The data processing system 402 can obtain the environmental information from external sources or databases. The administrator device 422 can provide the environmental information to the data processing system 402.

The heat map 414 can include or store a plurality of color coded tank maps 130 of the tank 202 generated by the map generator 410. The color code can range from red to green to blue. The heat map 414 can utilize the plurality of color codes to provide a graphical representation of the tank map 130 indicating the thickness level of the tank 202. For example, a very thick portion of the tank 202 can be color coded with blue, a very thin portion of the tank 202 can be color coded with red, and a spectrum of color between the blue and the red can indicate the gradual increase or decrease of the thickness of the one or more portions of the tank 202. The heat map 414 can indicate the texture of the tank 202 based on the thickness level information. The texture of the tank 202 can represent one or more bumps or one or more dips of the tank 202. The plurality of color code can be configured by the administrator device 422. The heat map 414 can be provided to the administrator device 422 to display the graphical representation of the tank map 130. The heat map 414 can store a 2-D heat map 414 or a 3-D heat map 414 of the tank 202 generated by the map generator 410.

The forecast technique 416 can include a plurality of time-series forecasting techniques for determining a risk-based inspection model 418. The forecast technique 416 can be accessed or used by the forecast engine 408. The risk can represent a deterioration rate of the tank 202 based on the difference between present and one or more past tank 202 thickness level, the environmental information, or the historical data 420. The risk can further represent a predicted leakage time of the one or more portions of the tank 202 or the indication of one or more thickness level of the tank 202 over time. The predicted time of leakage can be based on the present thickness level of the one or more portions of the tank 202 and the corrosion rate of the tank 202. The forecast technique 416 can be assisted by a machine learning technique or one or more information from the administrator device 422.

The inspection model 418 can store a plurality of risk-based model based on the time-series of quality metrics 136 generated by the model generator 406. The inspection model 418 can be a human readable report. The inspection model 418 can be provided to the administrator device 422 indicating the corrosion rate of the tank 202, at least an indication of the tank 202 thickness over time, or the predicted time of leakage of the tank 202. The inspection model 418 can be presented in a graphical format or a table. For example, the inspection model 418 can be generated and stored in the remote data repository 412 by the model generator 406. The inspection model 418 can be accessed and obtained by the administrator device 422 to display an inspection model 418, which can include the indication of the corrosion rate, the thickness over time, or the predicted time of leakage of the tank 202. The inspection model 418 can be used by the administrator device 422 to identify a maintenance time for one or more portions of the tank 202, at least an inspection cycle for the tank 202, or at least an indication of occurring leakage of the tank 202. The occurring leakage of the tank 202 can be based on an absence of one or more portions of the tank 202 identified by the inspection device 122.

The historical data 420 can include or store one or more quality metrics 136 which can indicate the thickness level of the tank 202. The historical data 420 can include or store a plurality of quality metrics 136 from one or more previous inspections of a plurality of tanks 202. Each tank 202 of the plurality of tanks 202 can be different in at least dimension, construction, or location. The historical data 420 can include or store a flammable fluid level of the tank 202, dimensions of tank 202, or the environmental information of the tank 202. The environmental information can include atmospheric information (e.g. gases and other atmospheric particles) or an environmental condition (e.g., temperature, humidity, pressure, or altitude) of the tank 202. The historical data 420 can be obtained, configured, or updated by the administrator device 422. The historical data 420 can be accessed by the forecast engine 408 or the model generator 406 for generating an inspection model 418. The vehicle 101 can receive historical data via a network.

The administrator device 422 can include an interface 404 similar to the data processing system 402 or the ATIS 102. The interface can include an LCD display, serial port, USB port, display port, Ethernet port, or Bluetooth receiver and transmitter. The administrator device 422 can be connected to the data processing system 402 via wired or wireless connection to the interface 404 of the data processing system 402. The administrator device 422 can be remote to the data processing system 402. The administrator device 422 can configure or update one or more components of the data processing system 402 which can include the model generator 406, the forecast engine 408, the map generator 410, or the remote data repository 412.

The administrator can be provided with a risk-based inspection model 418 based on a time-series of quality metrics 136, the inspection model 418 can be displayed on the administrator device 422 illustrating one or more risk of the tank 202 including the corrosion rate of the tank 202, at least an indication of the tank 202 thickness over time, or the predicted time of leakage of the tank 202. The inspection device 422 can update the historical data 420 with one or more quality metrics 136 of a plurality of tanks 202 via the interface 404. The administrator device 422 can update the historical data 420 with one or more environmental information of the tank 202. The administrator device 422 can provide one or more settings to adjust one or more color codes of the heat map 414 or adjust a type of heat map 414 to generate (e.g. 2-D or 3-D). The administrator device 422 can update the forecast technique 416 based receiving a different technique for forecasting. The administrator device 422 can identify a maintenance time for one or more portions of the tank 202, an inspection cycle for the tank 202, or an indication of occurring leakage of the tank 202 based on the inspection model 418.

Figure 5:
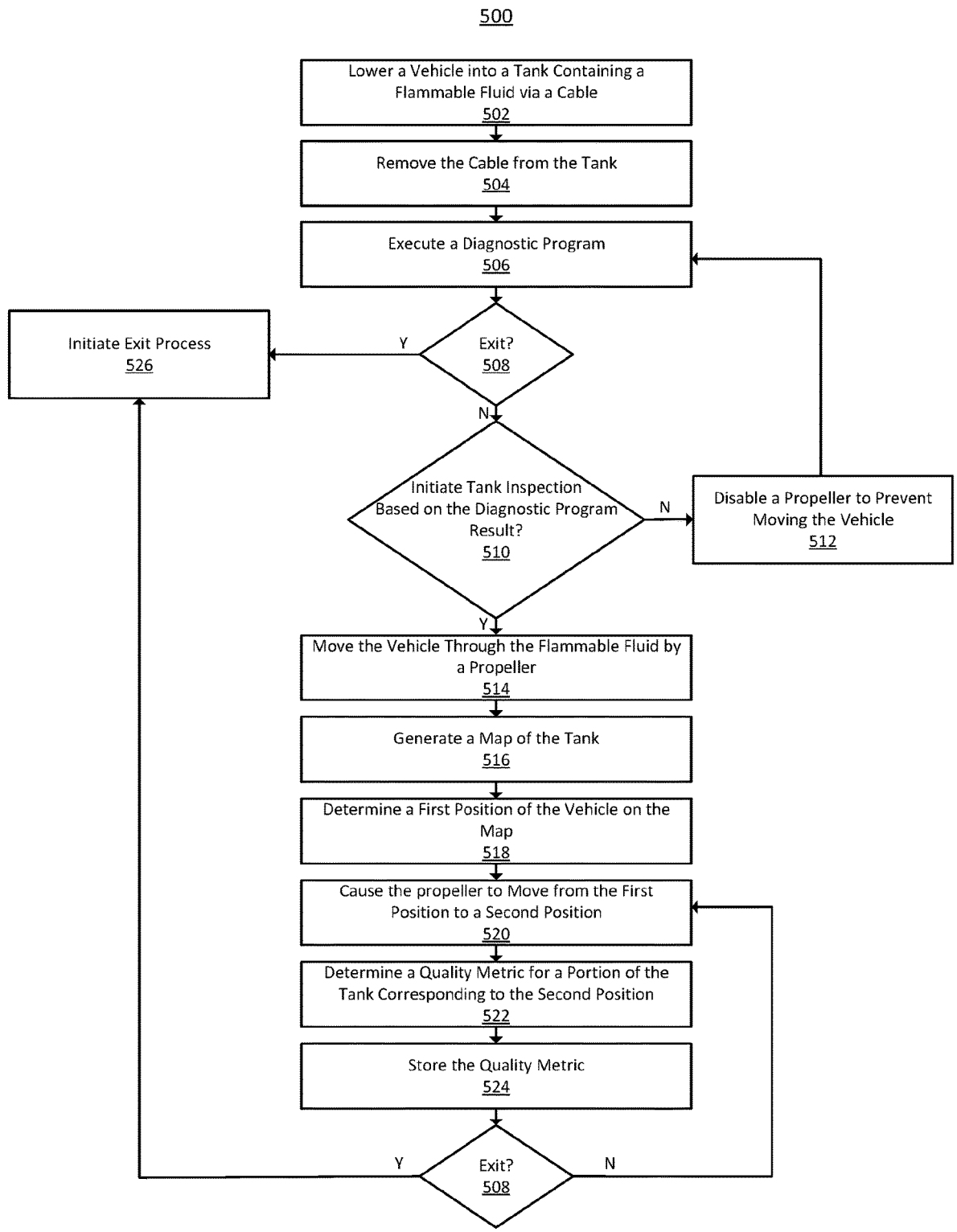
FIG. 5 is a flow diagram of an example method of inspecting a tank containing a flammable fluid.

FIG. 5 is a flow diagram of an example method of inspecting a tank containing a flammable fluid. The method 500 can be performed by system 100, system 400, or one or more component thereof. In brief overview, at step 502, a winch can lower at least one vehicle into the tank containing flammable fluid via a cable. At step 504, the winch can remove the cable from the tank. At step 506, the vehicle can execute the diagnostic program. At step 508, the vehicle can determine to initiate an exit process based on the diagnostic program result. At step 510, the vehicle can determine to initiate a tank inspection process based on the diagnostic program result. At step 512, the vehicle can disable the propeller to prevent moving the vehicle. At step 514, the vehicle can move through the flammable fluid by a propeller. At step 516, the vehicle can generate a map of the tank. At step 518, the vehicle can determine a first position of the vehicle on the tank map. At step 520, the vehicle can cause the propeller to move from the first position to a second position. At step 522, the vehicle can determine a quality metric for at least one portion of the tank 202 corresponding to the second position. At step 524, the vehicle can store the quality metric 136 in the vehicle resource repository. At step 526, the vehicle can initiate the exit process based on an exit condition from the diagnostic program result.

Still referring to FIG. 5, and in further detail, a winch can lower a vehicle 101 into the tank containing flammable fluid via a cable at step 502. The vehicle can include a control unit, battery, sensor, propeller, ranging device, inspection device, latch mechanism, or vehicle resource repository. The cable of the winch can be connected to the vehicle via the latch mechanism. The latch mechanism can be configured by the control unit to receive an indication of a state of the latch mechanism, the state can indicate the connection of the cable to the latch of the vehicle including a connected state or a disconnected state. The state of the latch mechanism can be used to lock the latch to the vehicle or release the latch from the vehicle.

The winch can lower the vehicle into the tank at a predetermined speed or rate. The winch can lower the vehicle into the tank based on the amount of fluid remaining in the tank, or the amount of fluid contained in the tank. Depending on the level of the fluid in the tank, the winch can lower the vehicle at a slower rate. The winch can receive an indication of the fluid level within the tank, or otherwise determine the level of the fluid. For example, the winch can include an input device or processor that receives an indication of the fluid level in the tank, or otherwise determine the fluid level within the tank. The winch can be preconfigured to lower the vehicle into the tank at a predetermined rate or default rate.

For example, a tank or other administrator can determine the distance from a floating roof to the tank floor with reasonable accuracy using a gauge, predetermined construction drawings, or a tape measure (e.g., the cable used to launch and recover the vehicle can include markings every 10 feet, for example). The tank administrator can provide this information to the system.

At step 504, the winch can remove the cable from the tank subsequent to deploying the vehicle. The winch can remove the cable from the tank after the winch has submerged the vehicle into the flammable fluid or lowered the vehicle to the tank floor. The winch can determine to remove the cable from the tank based, or responsive to, an indication. The winch can receive an indication from a sensor that indicates the vehicle has contacted the tank floor, or that the latch has disconnected the cable from the vehicle. The winch can receive an indication from a sensor that the vehicle has become at least partially submerged in the flammable fluid, or otherwise come into contact with the flammable fluid or the tank floor. The winch can remove the cable based on a time interval. For example, the winch can determine to remove or raise the cable from the tank based on expiration of a countdown timer that is set based on a predetermined vehicle deployment process. In another example, the winch can determine to remove the cable based on detecting that a tension in the cable has fallen below a threshold, which can indicate that the vehicle has contacted the tank floor and is being supported by the tank floor instead of the cable.

The sensor of the winch can determine the vehicle was lowered into the flammable fluid based on the difference on the force measured by the sensor. For example, the vehicle may weigh 100 kg. The sensor can detect a 1000 N force as the vehicle is being lowered into the tank, but prior to the vehicle contacting the fluid. The sensor can detect the force based on a tension associated with the cable connecting the vehicle to the winch. When the vehicle comes into contact with the flammable fluid, the sensor can detect a reduction in the force. For example, the sensor can detect a force of 750 N when the vehicle comes into contact with the flammable fluid. As the vehicle becomes increasingly submerged in the fluid, the sensor can detect a further reduction in the force until the vehicle is completely submerged in the fluid. However, since the vehicle may have negative buoyancy, the sensor may still detect some non-zero force, although the detected force may be significantly less than the originally detected weight of the vehicle. The sensor can detect a constant force, or substantially constant force (e.g., less than 5% variation) between the vehicle becomes fully submerged in the fluid and just before the vehicle contacts the tank floor. When the vehicle contacts the tank floor, the sensor can detect a further reduction in force. For example, the sensor can detect a near zero force—or a force only due to the weight of the cable—when the vehicle comes into contact with the tank floor because the tank floor can support the weight of the vehicle.

Thus, the winch can determine, based on a difference between forces measured by the sensor, to reel up the cable based on the vehicle at least partially submerged in the flammable fluid or the vehicle reaching the tank floor. The winch can further determine to remove the cable from the tank based on a timer. The timer can be predetermined based on a historical data indicating a time for the vehicle to be lowered into the tank and disconnect the cable from the latch.

At step 506, the vehicle can execute the diagnostic program. The vehicle can obtain the diagnostic program from memory or storage. The vehicle can select a diagnostic program based on a criteria or factor associated with the tank in which the vehicle is lowered. The vehicle can execute the diagnostic program to determine or identify a diagnosis or diagnostic result. The vehicle can use the diagnostic program, or results thereof, to determine whether to initiate a tank inspection process. For example, if the results of the diagnostic program indicate that there are no system errors, or that the conditions associated with performing a successful tank inspection process have been met, the vehicle can begin the tank inspection. The results of the diagnostic program can indicate an operation condition or status of one or more components of the ATIS or vehicle. The diagnostic program can detect the state of the cable, which can indicate the connection of the cable to the vehicle. The operation condition can include exit condition, wait condition, low power state, cooling state, or high performance state.

At step 508, the vehicle can determine to initiate an exit process based on the diagnostic program result. The diagnostic program result can indicate an exit condition based on at least an amount of power available in the battery, the condition of the vehicle or the one or more components of the ATIS (e.g. temperature, performance, etc.), or an absence of indication of uninspected one or more portions of the tank. The vehicle can determine not to initiate the exit process. Instead, the vehicle can determine to initiate the tank inspection process based on the diagnostic program result. The vehicle can determine not to initiate the exit process, but to execute step 520 based on the diagnostic program result responsive to the storing the quality metric as in step 524.

At step 510, the vehicle can determine whether to initiate a tank inspection process based on the diagnostic program result. If the vehicle determines not to initiate the tank inspection process at step 510, the vehicle can proceed to step 512. The vehicle can determine not to initiate the tank inspection process based on the diagnostic program result. The vehicle can disable the propeller to prevent moving the vehicle based on not initiating the tank inspection process, as in step 512. In another implementation, the diagnostic program can be run before the vehicle latch system detaches the vehicle from the cable. By doing so, recovery is facilitated if errors are found during execution of the diagnostic program.

For example, the vehicle can disable the propeller to prevent moving the vehicle. The propeller can be disabled by the control unit using the propeller control program based on the diagnostic program result. The vehicle can then execute the diagnostic program responsive to disabling the propeller. The vehicle can execute the diagnostic program in a manner similar to step 506. The diagnostic program result can indicate at least one operation condition including a waiting condition or a cooling state. The cooling state can be based on the temperature of the vehicle or the one or more components of the ATIS. The waiting condition can be based on the diagnostic program requiring one or more additional results, for example, results from testing the components of the ATIS.

If, however, the vehicle determines to initiate the tank inspection process at step 510, the vehicle can proceed to step 514. At step 514, the vehicle can initiate the tank inspection process by generating and providing one or more commands, such as a command to move the vehicle through the flammable fluid. The vehicle can move through the flammable fluid by a propeller. The vehicle can execute, by the control unit, the diagnostic program prior to causing the propeller to move the vehicle. The vehicle can use the propeller to move to a plurality of portions of the tank. The vehicle can use the ranging device concurrent to traversing the plurality of portions of the tank. The vehicle can configure the propeller to turn in a plurality of directions to move the vehicle in one or more directions.

At step 516, the vehicle can generate a map of the tank. The generation of the tank map 130 can be based on the vehicle traversing the plurality of portions of the tank. The vehicle can further generate a map without traversing the plurality of portions of the tank using the ranging device, such as an infrared sensor, an ultrasonic sensor, electromagnetic radiation sensor (laser) or a radar sensor. The map of the tank can be stored in the tank map within the vehicle resource repository. The control unit 104 of the vehicle can detect an exit condition based on the generated tank map, for example, the vehicle can be provided, based on the available power of the battery corresponding to the size of the tank, with the exit condition by the diagnostic program.

At step 518, the vehicle can determine a first position of the vehicle on the tank map 130. The first position can be determined based on information provided by the ranging device, for example, the ranging device can be configured by the mapping unit 108 to identify or update the position of the vehicle. The first position can indicate the position of the lid with respect to the tank, the lid used for lowering the vehicle into the tank. The first position 302 can be the first uninspected portion of the tank. The vehicle can determine, by the control unit based on one or more results of the diagnostic program, to initiate the tank inspection process. The tank inspection process can indicate a command for the vehicle to determine a quality metric for the first position. The vehicle can provide an indication of an inspected portion to the tank map or remove an indication of an uninspected portion from the tank map using the ranging device responsive to determining the quality metric for the first position of the tank.

At step 520, the vehicle can cause the propeller to move from the first position to a second position using the control unit. The control unit can provide a command to cause the propeller to move the vehicle from the first position to the second position based on at least the determined first position or the determined quality metric 136 corresponding to the first position based on the tank inspection process. The vehicle can be configured by the control unit, based on the diagnostic program 138, to disable the propeller to prevent the propeller from moving the vehicle from the second position. The second position can correspond to at least one uninspected portion of the tank. The speed of the propeller can be set or adjusted by the control unit based on the result of the diagnostic program 138, the result can be an operation condition, such as, an exit condition, a wait condition, a low power state, a cooling state, or a high performance state, as described in FIG. 1. The speed of the propeller can be set or adjusted based on a current position of the vehicle on the tank map. For example, the control unit can increase the speed of the propeller to move from the first position, decrease the speed of the propeller prior to reaching the second position, and disable the propeller based on the vehicle reaching the second position. The control unit can configure the propeller to move the vehicle in a different direction (e.g. reverse or sideways) based on the vehicle straying from the second position.

At step 522, the vehicle can determine a quality metric for at least one portion of the tank corresponding to the second position on the tank map via the inspection device. The inspection device can include a magnetic sensor, a magnetic sensor array, an ultrasonic array system, an ultrasonic phased array system, or a sweeping device. The sweeping device can include a brush for sweeping one or more substance off at least one portion of the tank. The quality metric can indicate a thickness of the portion of the tank at the second position within the tank. The vehicle can determine, based on the quality metric of the portion of the tank, to determine an additional quality metric for the portion of the tank, the additional quality metric can be determined using at least one different component of the inspection device. For example, the vehicle can determine a quality metric corresponding to the second position using the magnetic sensor of the inspection device, determine the quality of the information from the inspection device, and determine an additional quality metric corresponding to the second position using the ultrasonic array system based on obtaining a low quality information of the quality metric. The quality of the information can be based on a signal-to-noise ratio.

The vehicle can collect data from multiple sensing devices or inspection devices simultaneously (e.g., at the same time or overlapping times or immediately one after the other). The vehicle can record data from both sensors for further processing. The vehicle can perform real-time analysis of the data to determine whether one sensor is faulty, and switch to the other sensor.

At step 524, the vehicle can store the quality metric in the vehicle resource repository. The quality metric can correspond to at least the first position or the second position within the tank. The vehicle resource repository can be a data structure in memory of the vehicle. The vehicle resource repository can be accessed by the control unit. The quality metric corresponding to a position can indicate the one or more inspected portions of the tank. The indication of at least one uninspected portion of the tank can be based on an absence of the quality metric corresponding the portion of the tank, which can be released responsive to storing the quality metric corresponding to the portion of the tank. The vehicle can initiate the diagnostic program responsive to storing the quality metric in the vehicle resource repository. The diagnostic program result can configure the vehicle to initiate the exit process or cause the propeller to move the vehicle to at least one uninspected portion of the tank similar to moving the vehicle from the first position to the second position, as in step 520.

At step 526, the vehicle can initiate the exit process based on an exit condition from the diagnostic program result. The diagnostic program provides the exit condition based on generating the tank map, the power available in the battery, the absence of at least one uninspected portion of the tank, or an expiration of a timer of the tank inspection process, as described in FIG. 1. The exit process can include one or more commands to at least move the vehicle towards the first position of the tank, which can be the position of the lid 204, reel down the cable to the vehicle, cause the latch mechanism to re-engage the cable to couple the cable to the vehicle, or terminate vehicle operation. The termination of vehicle operation can include disabling the components of the vehicle.

Figure 6:
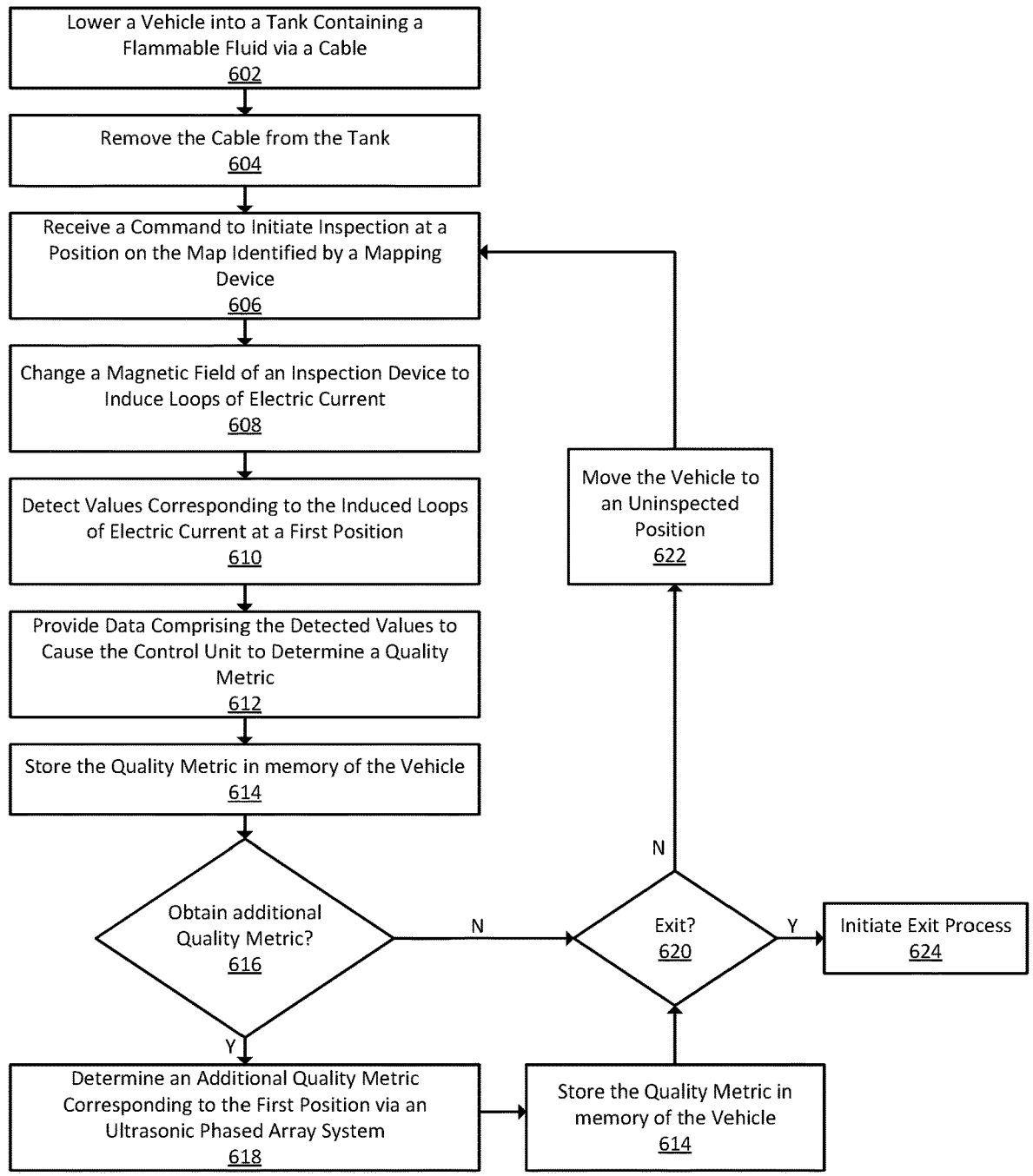
FIG. 6 is a flow diagram of an example method of inspecting a tank containing a flammable fluid.

FIG. 6 is a flow diagram of an example method of inspecting a tank containing a flammable fluid. The method 600 can be performed by system 100, system 400, or one or more component thereof. In brief overview, at step 602, a winch can lower at least one vehicle into a tank containing a flammable fluid via a cable. At step 604, the winch can remove the cable from the tank. At step 606, an inspection device can receive at least one command to initiate an inspection at a position on the map identified by a ranging device. At step 608, the inspection device can change at least one magnetic field to induce loops of electric current. At step 610, the inspection device can detect one or more values corresponding to the induced loops of electric current at a first position. At step 612, the inspection device can provide data comprising the detected values to cause the control unit to determine a quality metric. At step 614, the vehicle can store the quality metric in memory of the vehicle. At step 616, the vehicle can determine to obtain additional quality metric. At step 618, the vehicle can determine an additional quality metric corresponding to the first position via an ultrasonic array or phased-array system. At step 620, the vehicle can determine to initiate an exit process, as in step 624, based on a result of the diagnostic program. At step 622, the control unit can configure the vehicle to move to an uninspected portion of the tank. At step 624, the vehicle can initiate the exit process.

Still referring to FIG. 6, and in further detail, a winch can lower at least one vehicle into a tank containing a flammable fluid via a cable at step 602 similar to step 502 of method 500. At step 604, the winch can remove the cable from the tank subsequent to deploying the vehicle similar to step 504 of method 500. At step 606, an inspection device can receive at least one command from the control unit. The inspection device can receive the command responsive to the ranging device identifying a first position of the vehicle on the tank map. The command can include an instruction to initiate an inspection at the first position on the map. The command can be based on the tank inspection process, which can be configured based on a result of the diagnostic program. The command can include, for example, enabling or disabling the inspection device, moving the inspection device to a different portion of the tank corresponding to the first position, or changing the inspection device type. The inspection device type can change, for example, from one or more magnetic conductors to ultrasonic array or phased array system or vice versa. The ranging device can receive a command, based on the tank inspection process prior to the inspection device receiving the inspection command, to generate the tank map based on a plurality of acoustic waves reflected off one or more portions of the tank. Thus, the vehicle can use one inspection device at a time, alternate between inspection devices, use multiple inspection devices simultaneously, or switch from one inspection device to another based on a condition or an event.

At step 608, the inspection device can change, responsive to the command to initiate inspection, at least one magnetic field in the one or more conductors to induce loops of electric current that extend towards at least one portion of the tank corresponding to the first position on the map. The change of magnetic field can include magnitude, intensity, direction, duration, decay time, or frequency to increase or decrease the magnitude or intensity of electric current based on the inspection process. The inspection device can generate at least one pulsed eddy current for measuring thickness or detecting corrosion. The pulsed eddy currents can contain a continuum of frequencies, which can be used to measure electromagnetic response to various frequencies can using a single step. The magnetic field, created by an electric current from the inspection device, can penetrate through the one or more layers or constructions of the tank and stabilize in the layer of the tank. The electrical current generated by the inspection device can be disabled to cause a drop in the magnetic field, which can result in eddy currents appearing in the layers of the tank floor and decrease in strength over time. The pulsed eddy current probe can be used to monitor the decay in eddy currents, the decay time can determine the thickness of the tank. The electrical current magnitude in a given loop can be proportional to the strength of the magnetic field, the area of the loop, and the rate of change of flux, and inversely proportional to the resistivity of a material.

The inspection device can generate eddy currents by a plurality of conductors arranged in an array. A pulsed eddy current array can refer to a nondestructive testing technology that can provide the ability to drive multiple eddy currents coils, which can be placed side by side in the inspection device. Each individual eddy currents coil in the inspection device sends a strong magnetic field towards the floor below the coil and then abruptly releases that field. Each coil then measures the decay time of the eddy currents associated with the release of the magnetic field. The decay time can be converted into a thickness or corrosion level measurement. The inspection device can electronically drive and read multiple eddy currents sensors positioned side by side in the same inspection device assembly.

At step 610, the inspection device can detect one or more values corresponding to the induced loops of electric current at a first position. The inspection device can re-inspect the first position of the tank based on at least the tank inspection process, or the detected values. The values can be an indication of the distortion, the magnitude or the intensity of the magnetic field or electric current, a rate of decay of the magnetic field, or a duration of the magnetic field decaying to zero. The values can indicate a flaw in the tank, the corrosion of the tank, or the thickness of the tank. The values can be stored in the collected data of the vehicle resource repository, which can determine the quality metric of the tank.

At step 612, the inspection device can provide data comprising the detected values to cause the control unit to determine a quality metric at the portion of the tank corresponding to the first position of the vehicle on the map. The data can be raw information detected by the inspection device, which can be provided to the control unit. The quality metric can determine the thickness or the corrosion level of the tank based on the data. For example, the inspection device can detect the plurality of values using at least one inspection technique (e.g., pulsed eddy current or pulsed eddy current array), the values can be raw information. The inspection device can aggregate the values into a single data packet to provide to the control unit. The control unit can determine the quality metric of the tank based on the values, the quality metric indicating at least the thickness or the corrosion level of the tank. The quality metric can be based on the pulsed eddy current or the pulsed eddy current array corresponding to at least the first position or the second position of the vehicle.

At step 614, the vehicle can store the quality metric in memory of the vehicle (e.g. vehicle resource repository) similar to step 524 of method 500. The stored quality metric can be provided to a remote data repository of a data processing system ("DPS") to store in a historical data via a network. The historical data of the remote data repository of the data processing system can include at least one previously stored quality metric, the quality metric can indicate a predictive corrosion metric based on a plurality of tank inspection performed by the vehicle during a time interval. The model generator can generate a risk-based inspection model based on a time-series of quality metrics determined based on the loops of electric current provided by the inspection device that extend towards the portion of the tank. The model generator 406 can aggregate the historical data obtained from the plurality of tank inspections, and forecast, based on a forecast engine using the historical data, a level of thickness of the tank based on the quality metric, as referred to in FIG. 4.

At step 616, the vehicle can determine, based on the tank inspection process or the result of the diagnostic program, to obtain additional quality metric at the portion of the tank corresponding to the first position of the vehicle on the tank map. The additional quality metric can be obtained using a different inspection device or inspection technique, such as the ultrasonic array or phased array system of the inspection device. For example, the tank inspection process can configure the vehicle to obtain an additional quality metric to average between the quality metric obtained using the magnetic field and the additional quality metric to store as the quality metric for the portion of the tank corresponding to the first position. The diagnostic program result can indicate the quality of the inspection based on the quality metric. For example, the diagnostic program can determine an insufficient quality of the inspection and provide an indication to obtain additional quality metric to the vehicle, based on a signal-to-noise ratio, or the detected values.

At step 618, the vehicle can determine an additional quality metric corresponding to the first position of the vehicle on the tank map via an ultrasonic array system of the inspection device. The additional quality metric can be a second quality metric. The ultrasonic array system can comprise a plurality of ultrasonic transducers, which can be pulsed independently using computer-calculated timing, which can be used to steer the beam to scan the one or more portions of the tank. The inspection device can include two different technologies, and take advantage of their complementarity. For example, eddy current technology will provide better results in the presence of residual sediment after the brush cleans the floor or in case of topside corrosion. Ultrasonic will provide better results when the floor has been sufficiently cleaned by the brush and is primarily affected by pitting. The quality metrics from both technologies can be stored in the memory of the vehicle as in step 614.

At step 620, the vehicle can determine to initiate an exit process based on a result of the diagnostic program similar to step 508. At step 622, the control unit can move vehicle to an uninspected portion of the tank. The vehicle can be moved to the uninspected portion of the tank similar to moving the vehicle from the first position to a second position as in step 520. At step 624, the vehicle can initiate the exit process similar to step 526.

Figure 7:
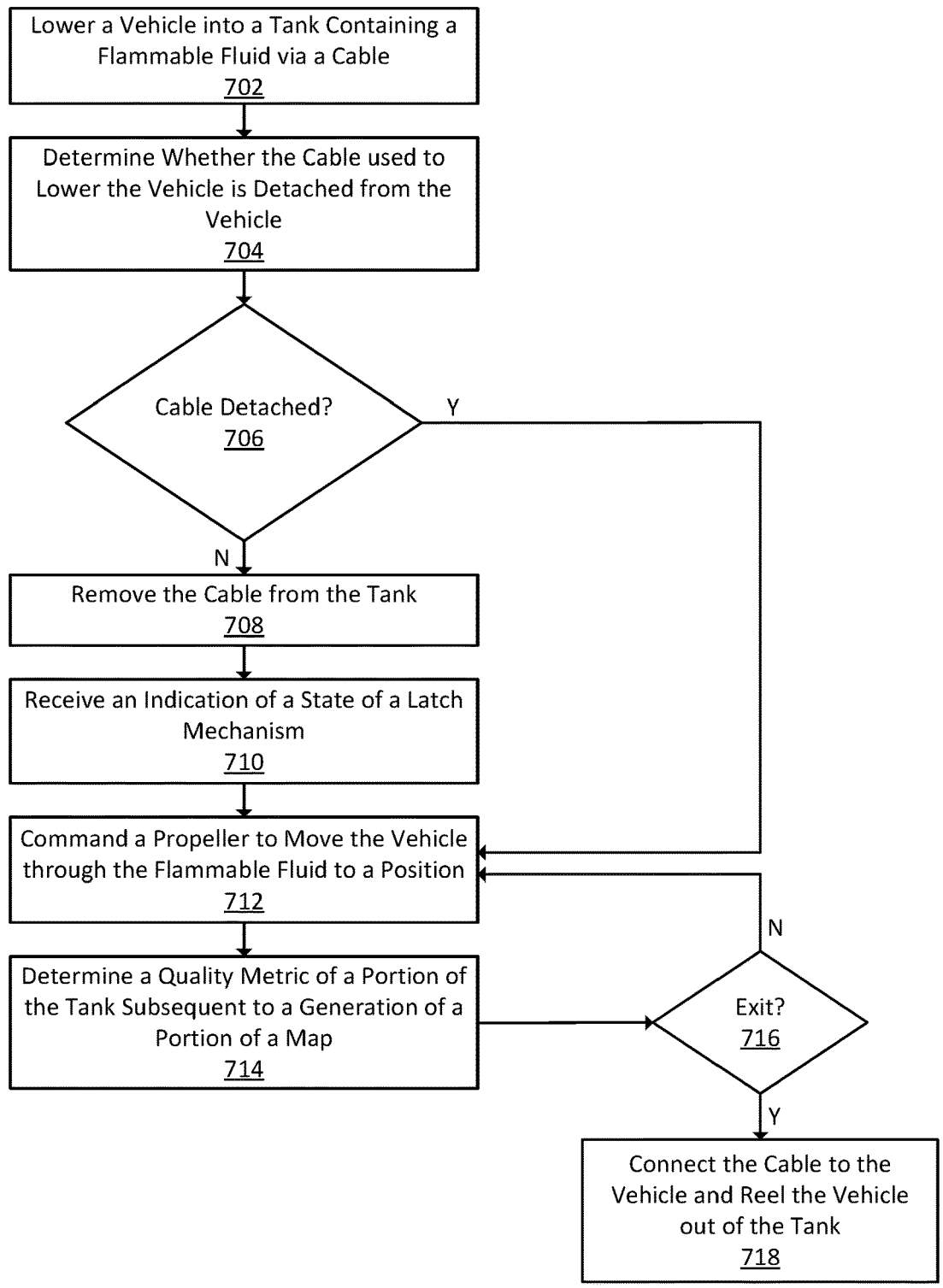
FIG. 7 is a flow diagram of an example method of inspecting a tank containing a flammable fluid.

FIG. 7 is a flow diagram of an example method of inspecting a tank containing a flammable fluid. The method 700 can be performed by system 100, system 400, or one or more component thereof. In brief overview, at step 702, a winch can lower at least one vehicle into a tank containing a flammable fluid via a cable. At step 704, the vehicle can determine whether the cable used to lower the vehicle is detached from the vehicle. At step 706, the vehicle can initiate at least one operation based on the state of the latch mechanism. At step 708, the winch can remove the cable from the tank. At step 710, the vehicle can receive an indication of the state of the latch mechanism. At step 712, the vehicle can command a propeller to move the vehicle through the flammable fluid to a position. At step 714, the vehicle can determine a quality metric of a portion of the tank subsequent to a generation of a portion of a map. At step 716, the vehicle can determine to initiate an exit process. At step 718, the winch can connect the cable to the vehicle using the latch mechanism and reel the vehicle out of the tank based on the exit process.

Still referring to FIG. 7, and in further detail, a winch can lower at least one vehicle into a tank containing a flammable fluid 208 via a cable at step 702 similar to step 502. The cable can be coupled to the vehicle to lower the vehicle into the flammable fluid via the latch mechanism.

At step 704, the vehicle using the control unit can determine, based on a state of the latch mechanism, whether the cable used to lower the vehicle into the tank containing the flammable fluid is detached from the vehicle. The state of the latch mechanism can include a connected state or a disconnected state, which can be detected based on the control unit executing the diagnostic program using at least one sensor. The connected state can indicate a connection between the cable can the latch mechanism. The disconnected state can indicate a disconnection or an absence of connection between the cable and the latch mechanism. The state of the latch mechanism can be based on the flow of current of the latch mechanism detected by the sensor of the vehicle.

At step 706, the vehicle can initiate at least one operation based on the state of the latch mechanism. The operation can include disconnecting the cable from the latch mechanism of the vehicle, which the winch can then remove the cable from the tank, as in step 708, or commanding at least one propeller of the vehicle to move the vehicle through the flammable fluid, as in step 712. The operation can include an exit process, for example, the latch mechanism can indicate the connected state, based on connecting the cable to the latch mechanism of the vehicle, to initiate the exit process. The state of the latch mechanism can determine the result of the diagnostic program.

At step 708, the winch can remove the cable from the tank subsequent to deploying the vehicle similar to step 504. The removal of the cable from the tank can be responsive to disengaging the cable used to lower the vehicle into flammable fluid 208 in the tank via the latch mechanism. The disengagement of the cable can be initiated via unlocking, by the control unit in communication with an actuator of the vehicle, the latch mechanism to disengage the cable subsequent to the vehicle lowered into the flammable fluid in the tank based on a policy and the state of the latch mechanism.

At step 710, the vehicle using the control unit can receive an indication of the state of the latch mechanism. The control unit can execute the diagnostic program responsive to receiving the indication of the state of the latch mechanism. The diagnostic program can provide a result to initiate the tank inspection process based on the disconnected state of the latch mechanism. The control unit can detect the indication of the state via the sensor of the vehicle. The state of the latch mechanism can be the disconnected state based on disconnecting the cable from the latch mechanism. In some cases, the control unit can receive an indication that the cable is decoupled from the vehicle in the flammable fluid 208 from a remote computing device (e.g. data processing system), for example, the remote computing device can provide the indication via a network based on the winch removing the cable from the tank.

At step 712, the vehicle can command a propeller to move the vehicle through the flammable fluid to a position using the control unit responsive to the determination that the cable is detached from the vehicle similar to step 514 or step 520. The command can be generated based on the tank inspection process to control the propeller or the latch mechanism coupling the cable to the vehicle. In some cases, the control unit can receive an indication to perform the tank inspection process comprising causing the propeller to move the vehicle to one or more positions of the tank and determine one or more quality metric from the remote computing device. The remote computing device can be the data processing system 402 in connection with the administrator device. The command can be based on the diagnostic program result indicating the disconnected state of the latch mechanism. For example, a first state can be the connected state and a second state can be the disconnected state. The control unit can command the latch mechanism to decouple the cable from the vehicle in the flammable fluid based on the first state. The sensor 116 of the vehicle can receive an indication of the second state based on disconnecting the cable. The vehicle can then command the propeller to move responsive to the indication of the second state.

At step 714, the control unit of the vehicle can determine a quality metric of a portion of the tank via an inspection device and subsequent to a generation of a portion of a map via a ranging device similar to aggregating step 514, step 516, or step 522. The vehicle can initiate the ranging device concurrent to the inspection device to synchronously update or generate the map of the tank and determine the quality metric of the portion of the tank. The determining of the quality metric and generation of the portion of the map can be based on the tank inspection process. The plurality of portions of the tank can be a plurality of uninspected portions of the tank. For example, the vehicle can reside in a first position of the tank based on the ranging device generating a first portion of the tank map. The vehicle can obtain a first quality metric of the first portion of the tank corresponding to the first position using the inspection device subsequent to the generation of the first portion of the tank map. The vehicle can move to a second position different than the first position. The ranging device can generate a second portion of the tank map and subsequently inspect the second portion corresponding to the second position using the inspection device. The vehicle can traverse the plurality of portions of the tank based on an indication of an uninspected portion of the tank.

At step 716, the vehicle can determine to initiate an exit process similar to step 508. At step 718, the winch can connect the cable to the vehicle using the latch mechanism and reel the vehicle out of the tank based on the exit process similar to step 526. The control unit in communication with the actuator of the vehicle can lock the latch mechanism to engage the cable to the vehicle. For example, the control unit can detect an exit condition in the tank inspection process. The control unit can command the propeller to move the vehicle to a position under the lid 204 of the tank. The cable can be reeled down to the vehicle by the winch. The vehicle can then re-engage the latch mechanism with the cable to couple the cable to the vehicle. The winch can reel up the vehicle responsive to detecting that the cable is coupled to the vehicle.

Figure 8:
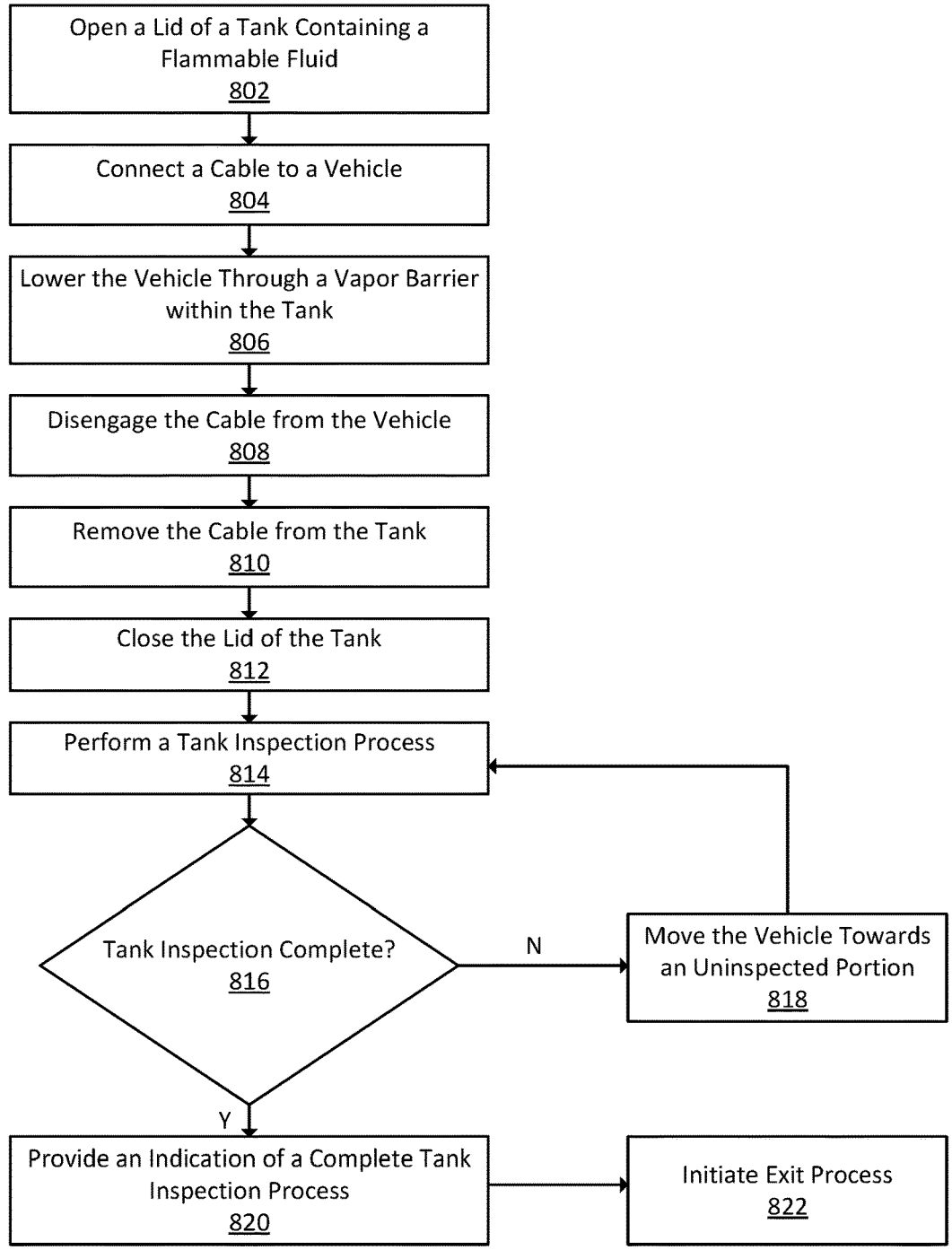
FIG. 8 is a flow diagram of an example method of inspecting a tank containing a flammable fluid.

FIG. 8 is a flow diagram of an example method of inspecting a tank containing a flammable fluid. The method 800 can be performed by system 100, system 400, or one or more component thereof. In brief overview, at step 802, a lid of a tank containing a flammable fluid can be opened. At step 804, a winch can connect a cable to a vehicle. At step 806, the winch can lower the vehicle through a vapor layer within the tank via a cable. At step 808, the latch mechanism can disengage the cable from the vehicle. At step 810, the winch can remove the cable from the tank. At step 812, the lid of the tank can be closed. At step 814, the vehicle can perform a tank inspection process. At step 816, the vehicle can determine whether the tank inspection process is complete based on a diagnostic program result. At step 818, the vehicle can move towards an uninspected portion of the tank based on an incomplete tank inspection process. At step 820, the diagnostic program result can provide an indication of a complete tank inspection process. At step 822, the vehicle can initiate an exit process.

Still referring to FIG. 8, and in further detail, a lid of a tank containing a flammable fluid can be opened at step 802. The lid can be opened manually using various lid opening tools. At step 804, a winch can connect the cable to the vehicle. The cable can be connected to the latch mechanism of the vehicle. The winch can be external to the tank. The latch mechanism can include an actuator to lock or unlock the cable from the vehicle. The latch mechanism can indicate a state based on the connection of the cable to the vehicle.

At step 806, the winch can lower the vehicle through a vapor layer 206 within the tank and on top of the flammable fluid via a cable and through an opening of the tank similar to step 502. The winch can unreel the cable connected to the vehicle to lower the vehicle into the tank.

At step 808, the latch mechanism can disengage the cable from the vehicle similar to step 504 or step 708. The disengagement of the cable can be initiated via unlocking, by the control unit in communication with an actuator of the vehicle, the latch mechanism to disengage the cable subsequent to the vehicle lowered into the flammable fluid in the tank based on at least one policy and the state of the latch mechanism. The latch mechanism can determine whether the cable was detached based on a sensor, such as a mechanical sensor, on the cable indicating a disconnection from the latch of the vehicle or on the winch indicating the vehicle was lowered into the flammable fluid.

At step 810, the winch can remove the cable from the tank by reeling the cable subsequent to disengaging the cable from the vehicle similar to step 504. At step 812, the lid 204 of the tank can be closed to seal the vehicle inside the tank responsive to removing the cable from the tank. The closing of the lid can be similar to opening the lid, as in step 802.

At step 814, the vehicle can be configured by the control unit to perform a tank inspection process under battery power based on the cable disconnected from the vehicle similar to step 606. The tank inspection process can include generating a map of the tank and determining a quality metric for a portion of the tank corresponding to a location on the generated tank map. The vehicle can initialize a map data structure (e.g. tank map) for the tank in memory (e.g. vehicle resource repository) of the vehicle. The vehicle can store the tank map in the map data structure. The control unit of the vehicle can determine, upon being lowered into the tank, to generate the tank map and instruct the ranging device to generate the map of the tank. The vehicle can be configured with a predetermined duration to perform the tank inspection process, the predetermined duration can be stored in a configuration file or collected data in memory of the vehicle. The vehicle can initiate a timer based on the predetermined duration responsive to being sealed in the tank and beginning the tank inspection process.

At step 816, the vehicle can determine whether the tank inspection process is complete based on a diagnostic program result. The control unit can identify an uninspected portion of the tank based on the generated tank map, which can be provided in the diagnostic program result. The diagnostic program result can cause the vehicle to move the vehicle towards the uninspected portion, as in step 818, or initiate an exit process based on an indication of complete tank inspection process, as in 822. The diagnostic program result can provide the vehicle with an indication of complete tank inspection process based on an absence of any uninspected portions of the floor of the tank based on the generated tank map.

At step 818, the vehicle can move towards an uninspected portion of the tank based on an incomplete tank inspection process similar to step 622. At step 820, the diagnostic program result can provide an indication of a complete tank inspection process. The indication of the complete tank inspection process can be based on an absence of any uninspected portions of the floor of the tank based on the generated tank map. The indication of the complete tank inspection process can include a wireless signal or acoustic signal. The wireless signal can be sent to a data processing system ("DPS") connected an administrator device via a network. The acoustic signal can be transmitted by the vehicle via a speaker of the vehicle. The indication of the complete tank inspection process can initiate the exit process, as in step 822.

At step 822, the vehicle can initiate an exit process similar to step 526 or step 718. In some cases, the vehicle can initiate the exit process to terminate the tank inspection process responsive to an expiration of the timer. The time of expiration can be predetermined or configured via the control unit of the vehicle.

Figure 9:
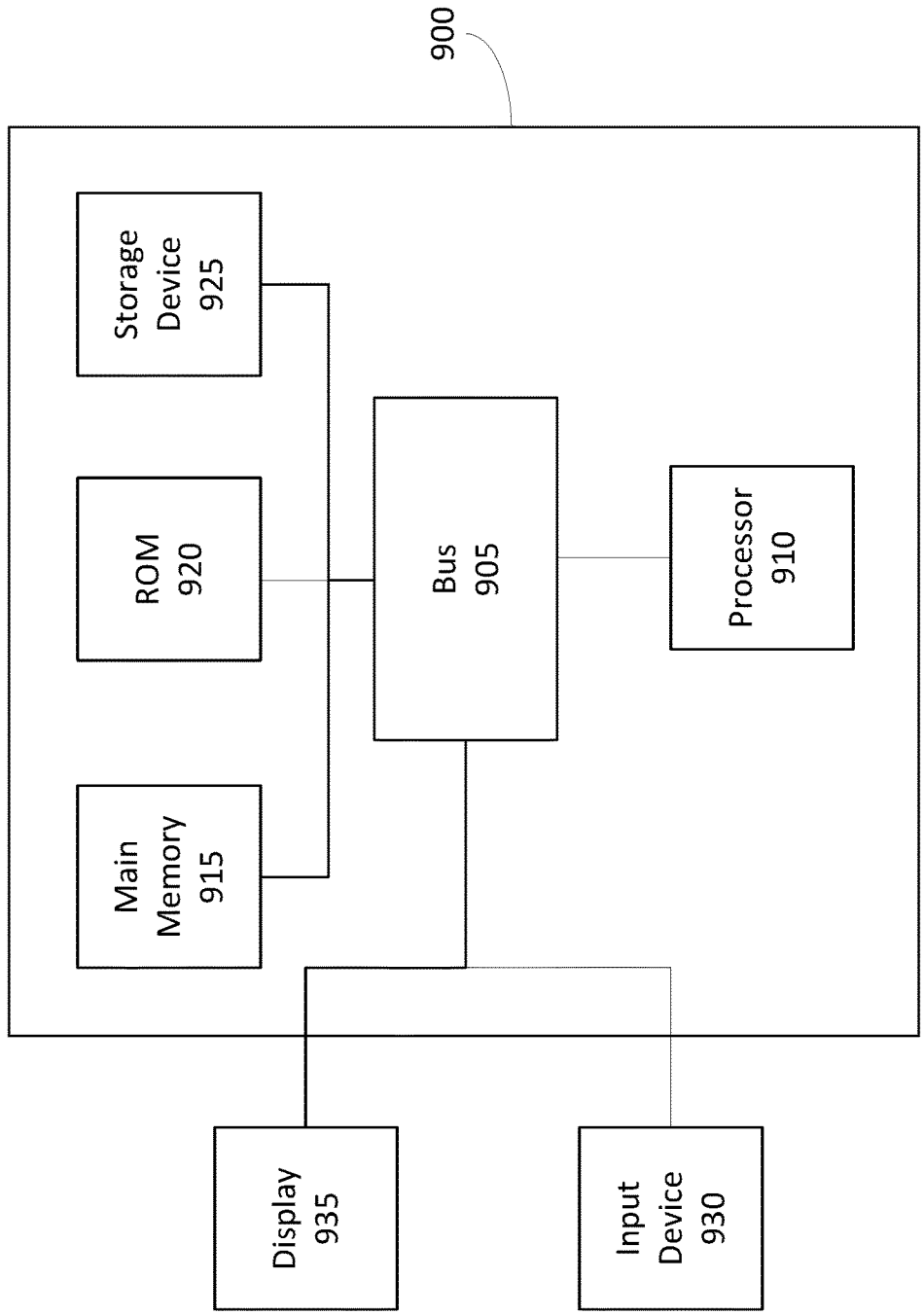
FIG. 9 is a block diagram illustrating an architecture for a computer system that can be employed to implement elements of the systems, methods and apparatus described and illustrated herein, including, for example, the systems and apparatus depicted in FIGS. 1-4, and the methods depicted in FIGS. 5-8.

FIG. 9 is a block diagram of an example computer system 900. The computer system or computing device 900 can include or be used to implement one or more component of system 100, 200, 300, or 400, or perform one or more aspect of the method 500, 600, 700 or 800. For example, the system 900 can implement one or more component or functionality of the ATIS 102, the data processing system 402, the vehicle, or the administrator device 422. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage device, coupled to the bus 905 for storing information, and instructions to be executed by the processor 910. The main memory 915. The main memory 915 can also be used for storing one or more of a propeller control program, tank map, collected data, tank inspection process, quality metric, diagnostic program, or other information. The computing system 900 may include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions. The storage device 925 can include or be part of the data repository 126.

The computing system 900 may be coupled via the bus 905 to a display 935, such as a liquid crystal display, or active matrix display, for displaying information to a user of the administrator device 422. An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935. The display 935 (e.g., on a vehicle dashboard) can, for example, be part of the ATIS 102, vehicle, data processing system 402, administrator device 422, or other component depicted herein.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the control unit 104, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

Figure 10:
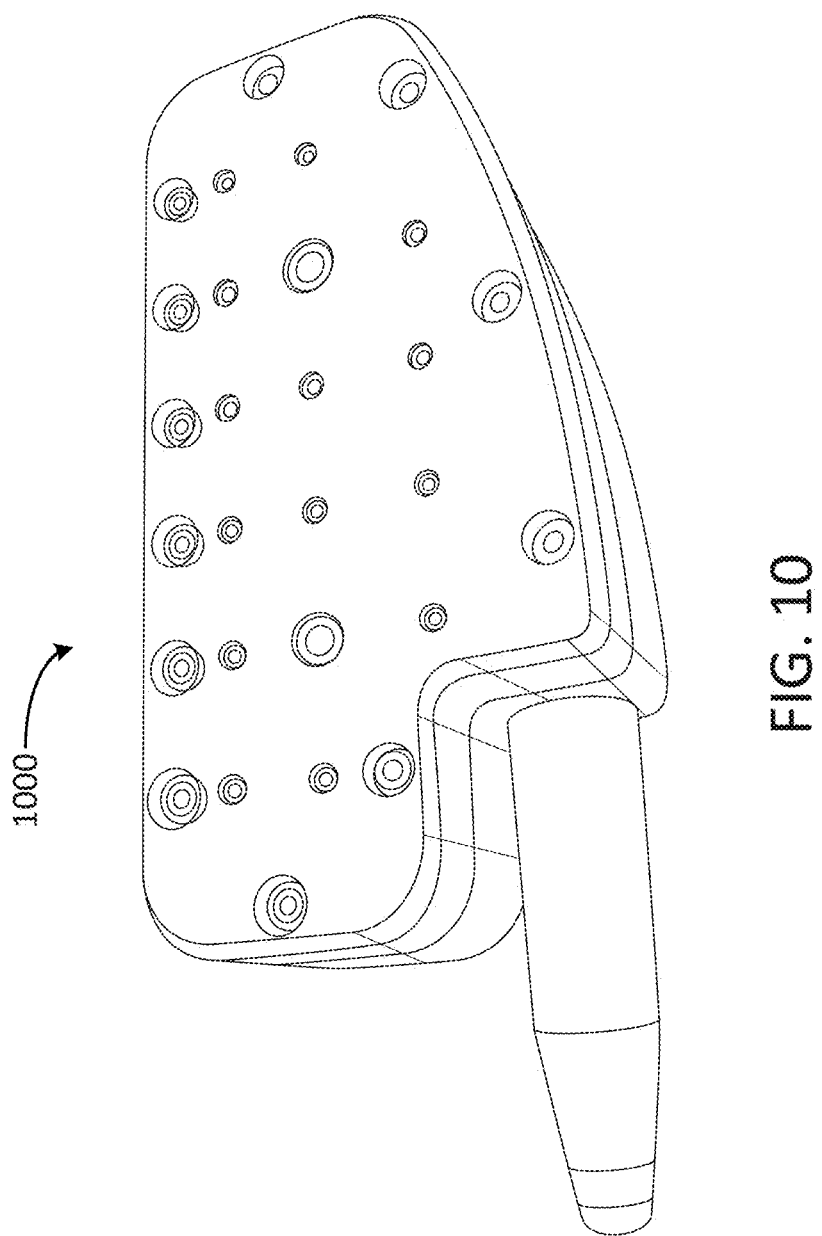
FIG. 10 is an example illustration of a pulsed eddy current array ("PECA") for sensing the plate thickness of one or more tank walls.

Referring now to FIG. 10, depicted is an example pulsed eddy current array ("PECA") for the inspection of one or more tank systems. A tank (e.g. a tank for containing one or more hazardous fluids), has walls with a predetermined thickness. The PECA device 1000 depicted in FIG. 10 can include a seven-element array with 7 inches×1 inch coverage, or about 178 millimeter linear coverage (each element in the linear array has a 1 square inch footprint on the floor). The PECA device 1000 can be inserted into a tank to detect one or more flaws in the walls of the tank. The PECA device 1000 can include electronics and software to support autonomous tank inspection with millions of A-scans. Any of the PECA or phased array ultrasonic testing ("PA") devices described herein can be, operate as, or operate in conjunction with the sensors 116, the inspection device 122, or any other components of system 100 described hereinabove in conjunction with FIG. 1. The PECA device 1000 can be attached or coupled to the vehicle 101. The PECA device 1000 can be interconnected or in electrical communication with at least the control unit 104 and other components of the vehicle 101. The PECA device 1000 may be embedded in or constructed onto the vehicle 101, such that the PECA device 1000 is a part of the vehicle 101. The PECA device 1000 can be detachable from the vehicle 101 via a locking or latching mechanism (e.g., bolt, clip, or hook) implemented or installed with the vehicle 101 and the PECA device 1000. The PECA device 1000 can be welded onto the vehicle 101 (e.g., non-removable). The PECA device 1000 may be installed on any portion of the vehicle 101, such as the bottom, the top, the front, the rear, or the side of the vehicle 101. The PECA device 1000 can be constructed with one or more components and features similar to the vehicle 101, such as to prevent sparks or ignition to occur within the tank containing flammable fluid. The PECA device 1000 can be implemented with a battery or connected to the battery of the vehicle 101.

For example, the inspection device 122 can include the PECA device 1000, and the vehicle 101 can perform a tank inspection using the PECA device 1000. The PECA device 1000 and any other PECA devices described herein can use advanced electromagnetic inspection technology and can be used to detect flaws and corrosion in ferromagnetic materials, among others. The PECA device 1000 and any other PECA devices described herein can include a corrosion mapping tool (e.g., screening tool) that can allow wall thickness measurements, and inspection through liftoff, coatings, and sedimentation. The PECA device 1000 and any other PECA devices described herein can be sensitive to far-side and near-side flaws, and may use grid (static) or dynamic (in motion) acquisition of data. For example, using grid data acquisition process, the vehicle 101 can travel from a first position to a second position within the tank. To measure the thickness of the tank, the vehicle 101 may stop at any given position within the tank and initiate the inspection of the tank wall using the PECA device 1000. In another example, using the dynamic data acquisition process, the vehicle 101 may initiate the tank wall inspection using the PECA device 1000 while in motion (e.g., moving from the first position to the second position within the tank). The positions can refer to any locations within the tank (e.g., in contact with the interior surface of the tank or hovering above the interior surface in the flammable fluid within the tank).

The PECA device 1000 and any other PECA devices described herein use averaged wall thickness measurements within the footprint of each element making up the array. If the wall loss is constant across the footprint of an element, the remaining wall thickness can be measured by the element with an accuracy of +/−10%, for example. In another example, if a defect is smaller in diameter than the wall footprint of an element, the measured thickness can be undersized due to the averaging of the wall thickness within the element footprint. The inspection area can be of similar dimensions to the PECA device 1000. The magnetic field generated by the PECA device 1000 can expand as the liftoff distance increases between the PECA device 1000 and the tank wall. For example, as the liftoff distance increases, the magnitude of the magnetic field applied to a portion of the tank wall decreases. Alternatively, decreasing the liftoff distance can increase the magnitude of the magnetic field applied to the tank wall for measuring the tank wall thickness and corrosion.

The magnetic field intensity generated by the PECA device 1000 can be adjusted based on the liftoff distance or the wall thickness. The control unit 104 can configure the magnetic field intensity, for example, responsive to receiving an instruction from an external computing device. For example, an operator can use an external computing device communicatively connected to the control unit 104 to control the PECA device 1000. The vehicle 101 being in contact with the floor, the operator can control the liftoff distance of the PECA device 1000 from the tank wall (e.g., tank floor) and the magnetic field intensity via instructions from the external computing device. Responsive to receipt of the instructions from the external computing device, the vehicle 101 can move the PECA device 1000 up or down relative to the vehicle 101 and thereby make the PECA device 1000 move further from or descend closer to the tank floor, for example. The control unit 104 can determine whether the PECA device 1000 is at the desired liftoff distance according to the instructions from the operator using at least one ranging sensor. The control unit 104 can instruct the vehicle 101 to maintain the vertical position of the PECA device 1000 in the vehicle 101 upon an indication that the PECA device 1000 is at the desired liftoff distance from the tank floor. For example, the vehicle 101 may be in contact with the interior tank surface (e.g., tank floor or tank wall). The elevation of the PECA device 1000 relative to the vehicle 101 can be dynamically adjusted to maintain a liftoff distance. In this case, since the vehicle 101 can negatively buoyant (e.g., sink), the vehicle 101 can roll on the floor, for example, via a 3-point of contacts using multiple omnidirectional wheels mounted at the bottom of the vehicle 101. Other omnidirectional wheels can be mounted at other portions of the vehicle 101. The PECA device 1000 can be rigidly mounted in or on the vehicle 101, to maintain or position the PECA device 1000 at a predetermined liftoff distance (e.g., 5" from the tank surface), for example, as the vehicle 101 is in contact with the floor. In some cases, the PECA device 1000 liftoff distance can be adjusted external to the tank (e.g., by taking the vehicle out of the tank to manually move the PECA device 1000 up or down in a mounting bracket installed on the vehicle 101). Subsequent to adjusting the PECA device 1000, the vehicle 101 can be sent back to the tank. In some cases, the liftoff distance of the PECA device 1000 may not be dynamically adjusted on the vehicle 101 during a survey.

The control unit 104 can configure the magnetic field intensity generated by the PECA device 1000 responsive to determining the wall thickness or the liftoff distance. For example, the vehicle resource repository 126 can include a list that includes one or more associations between magnetic field intensity data, liftoff distance data, and wall thickness information (e.g., factors or features associated with the PECA device 1000). A list may be referred to as, or used interchangeably with other descriptive terms, such as a table, a registry, or a record. An association may be referred to as an entry, a row, or a column within the list storing a magnetic field intensity setting to use for a liftoff distance and a wall thickness (e.g, plate thickness). This list may be referred to as magnetic field strength or intensity list. The entry can include values, codes, or any type of computer-readable language for configuring the PECA device 1000 or other components of the vehicle 101. The control unit 104 can use one or more features of an entry to calculate an unknown feature within the same entry. For example, to determine the magnetic field strength to use for inspection, the control unit 104 can identify an entry having a liftoff distance of the PECA device 1000 and a plate thickness of the tank for inspection. In another example, to determine the wall thickness, the control unit 104 can instruct the PECA device 1000 to collect decay rate data at a liftoff distance using a magnetic field intensity. Based on the collected decay rate, the control unit 104 can identify an entry consisting of the measured decay rate, the liftoff distance, and the magnetic field intensity corresponding to a plate thickness.

For example, the control unit 104 can initiate a calibration procedure to measure the PECA's response in nominal plate thickness conditions. The vehicle 101 may not move laterally nor longitudinally with respect to the calibration area during the calibration procedure. In some cases, the vehicle 101 may move during the calibration procedure, for example, if the plate has consistent thickness throughout the traveled distance for the test and the speed is slow enough. The calibration procedure can include measuring the eddy current decay rate from the plate of the tank at constant liftoff.

Subsequent to measuring the eddy current decay rate during the calibration procedure, the control unit 104 can determine the plate thickness by comparing the decay rates measured during the inspection with the decay rate measured during the calibration procedure. For example, a slower decay rate than that measured during the calibration procedure can indicate a thicker area than the calibration area and a faster decay rate can indicate a thinner area than the calibration area. The measurement data collected by one or more components of the vehicle 101 can be stored in the vehicle resource repository 126. Data collection by the one or more components may be referred to generally as data collection by the vehicle 101, or in some cases, the control unit 104.

The plate thickness of the tank can be provided prior to the inspection. For example, the plate thickness can be uploaded onto the memory of the vehicle 101, or onto the vehicle resource repository 126. By knowing the original plate thickness of the tank under inspection, the control unit 104 can set a liftoff distance and magnetic field intensity corresponding to the plate thickness.

In some cases, after the control unit 104 performs the calibration procedure, the plate thickness measured by the PECA device 1000 can exceed the actual plate thickness. This situation can indicate that the PECA system was calibrated in an area either thinner or thicker than the nominal plate thickness. The thickness data determined during the inspection can then be recalibrated using another decay rate signal measured during the inspection as reference decay rate.

The control unit 104 can control the velocity or speed of the vehicle 101 inspecting the tank wall based on one or more aforementioned features (e.g., wall thickness, magnetic field intensity, or the liftoff distance). The velocity or speed may be part of an entry within the table. The entry can include the one or more features. Thus, the control unit 104 can set the velocity of the vehicle 101 to inspect the tank via dynamic acquisition procedures. The velocity of the vehicle 101 carrying the PECA device 1000 can be predetermined for initiating the inspection process.

The PECA device 1000 can be used to detect wall thickness or corrosion in various applications. For example, the PECA device 1000 can detect corrosion under insulation ("CUT"), corrosion under fireproofing ("CUF"), scab corrosion, or flow accelerated corrosion ("FAC"). The thicker walls around the indication can influence the averaging calculation. The PECA device 1000 can be designed, constructed, and operated to detect isolated flow and general corrosion on both the top-side of the tank (e.g., inside the tank) and on the soil-side of the tank (e.g., an external surface of the tank in the ground). The PECA device 1000 can integrate with custom electronics and software (e.g., ATIS 102) to provide autonomous tank inspection with numerous (e.g., millions) of scans. The PECA device 1000 can detect, determine, or otherwise identify slow changes in the thickness of a wall of a tank, in addition to isolated defects. The vehicle 101 can calibrate the PECA device 1000 based on the calibration area, and then perform a measurement using the PECA device 1000 as the inspection device. For example, the ATIS 102 can roll over the tank wall within the flammable fluid and identify an area of the tank that is suitable for calibration. The ATIS 102 can perform a calibration routine or process. Subsequent to calibration, the ATIS 102 can inspect the tank wall or initiate a measurement procedure. In some cases, the ATIS 102 can perform the calibration external to the tank.

The PECA device 1000 can include one or more probes to monitor the decrease or decay in eddy currents. The decay in eddy currents can be used to determine the thickness of the tank wall. For example, the PECA device 1000 can include one or more probes and coils. The PECA device 1000 can generate a magnetic field by supplying electrical current to the coils of at least one probe. The magnetic field can penetrate through any layer in between the PECA device 1000 and the tank wall (e.g., an insulation layer, fireproofing layer, or coating). Subsequent to generating the magnetic field in the tank wall, the PECA device 1000 can cut-off the excitation magnetic field. By monitoring the decrease in eddy current using the probe of the PECA device 1000, the PECA device 1000 can determine the thickness of the wall based on the decay rate (e.g., thicker materials will delay the decay of the eddy current). The measured decay rate of the tank wall can be compared with a calibration decay rate of the tank wall. The comparison can be performed by one or more processors of the control unit 104 in the vehicle 101. The control unit 104 can receive the inspection data or raw data from the PECA device 1000 and store the data in the vehicle resource repository 126. For example, the PECA device 1000 can receive inspection data to determine wall thickness and corrosion level. The wall thickness and corrosion level can be correlated, e.g., high corrosion level may indicate a thinner wall and low corrosion level may indicate a thicker wall. To determine small flaws on the tank wall, the PECA device 1000 can include a custom 7-element array with 7 inches×1 inch coverage or 178 millimeters (e.g., each element of the linear array covers 1 square inch). The PECA device 1000 with the custom 7-element array may be referred to as a custom PECA device. The PECA device 1000 can be sensitive to isolated flaws and general corrosion, both top-side and soil-side.

The PECA device 1000 can include hardware and software to support autonomous tank inspection. The software may be updated via electrical communication with the control unit 104, such as during operation within the flammable fluid. For example, the control unit 104 can receive data packets from an external computing device (e.g., remote device or administrator device) to configure or update one or more features or software of the PECA device 1000. Responsive to receiving the data packets, the control unit 104 can configure the software of the PECA device 1000. The hardware and software of the PECA device 1000 can be updated, upgraded, or configured prior to initiating the tank inspection process or inserting the vehicle 101 into the tank. The vehicle 101 can be communicatively coupled to an external computing device via a fiber optic tether. The control unit 104 of the vehicle 101 can exchange data packets with the external computing device, including software or firmware of the PECA device 1000. The aforementioned features and functionalities of the PECA device 1000, and the control unit 104 providing instructions to the PECA device 1000, can be utilized, performed, or otherwise executed similarly or in addition to features and functionalities of other PECA devices. The vehicle 101 can be structurally compatible with one or more PECA devices. The control unit 104 can be compatible or updated to be compatible with one or more PECA devices.

Figure 11A:
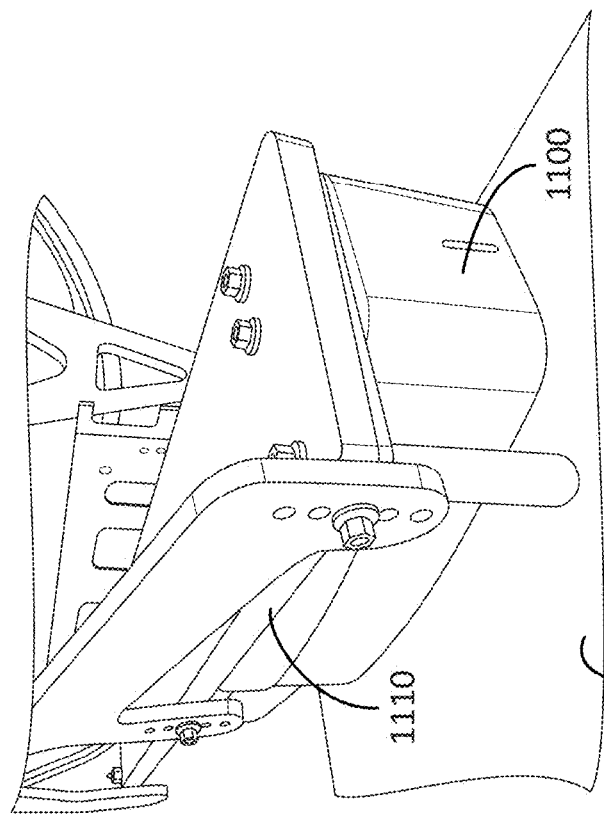
FIGS. 11A-B is an example illustration of a PECA mounted for sensing various conditions of tank plate walls
Figure 11B:
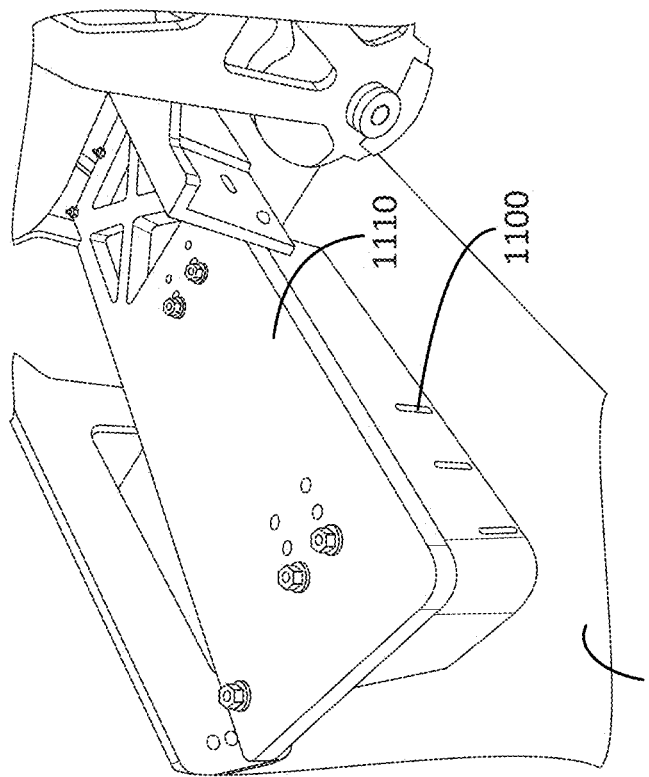

Referring now to FIGS. 11A-B, depicted is a mounted PECA device 1100 scanning a metal plate 1120. The PECA device 1100 can include similar hardware, software, features, and functionalities as the PECA device 1000 depicted and described in FIG. 10. The mounted PECA device 1100 can be used for demonstrative, testing, or inspection purposes, or may be further mounted on an autonomous carrier vehicle to facilitate the autonomous scanning of one or more tanks (e.g., tank wall). The mounted PECA device 1100 can be optimized for tank floor inspection. The PECA device 1100 may be maintained at a nominal liftoff distance of 0.5" (or about 12.7 millimeters) from the plate or the tank wall, for example. The plate thickness range depicted in FIGS. 11A-B can be between 0.25 and 1.25 inches or between 6.35 and 31.75 millimeters. The plate of the tank wall can include a thickness of 0.25 inches and up. The plate thickness can be an indicator for the traveling velocity of the vehicle 101 equipped with the PECA device 1100. The mounted PECA device 1100 can have a minimal footprint for optimal sensitivity.

The PECA device 1100 can be mounted on or attached to a mounting mechanism 1110 (e.g., mount, mounting structure, locking mechanism, or attachment). The mounting mechanism 1110 can be constructed with non-magnetic materials similar to the vehicle 101 or the PECA device 1100. In some cases, the mounting mechanism 1110 or other mounting mechanisms can be used to install the PECA device 1100 to the vehicle 101. The installation process can include locking the PECA device 1100 with the mounting mechanism 1110 and coupling the mounting mechanism 1110 with the PECA device 1100 to the vehicle 101. The vehicle 101 can include a coupling component or mechanism to lock the PECA device 1100. The vehicle 101 can include the coupling component on any part of the vehicle 101, such as the front, rear, sides, bottom, top, or in some cases, inside the vehicle 101. The mounting mechanism 1110 can be implemented in the chassis design of the PECA device 1100. For example, the PECA device 1100 can be designed with at least one coupling feature, such as grooves, notches, protrusions, indentations, cleats, or latch. The vehicle 101 can include similar features to support or compatible with the coupling feature of the PECA device 1100. The PECA device 1100 and the mounting mechanism 1110 can be coated with fire retardant substances, include at least one insulation layer, or other components to prevent sparks, reduce heat emission from the vehicle 101 or the PECA device 1100, or prevent substances from entering the vehicle 101 or the PECA device 1100.

Figure 13:
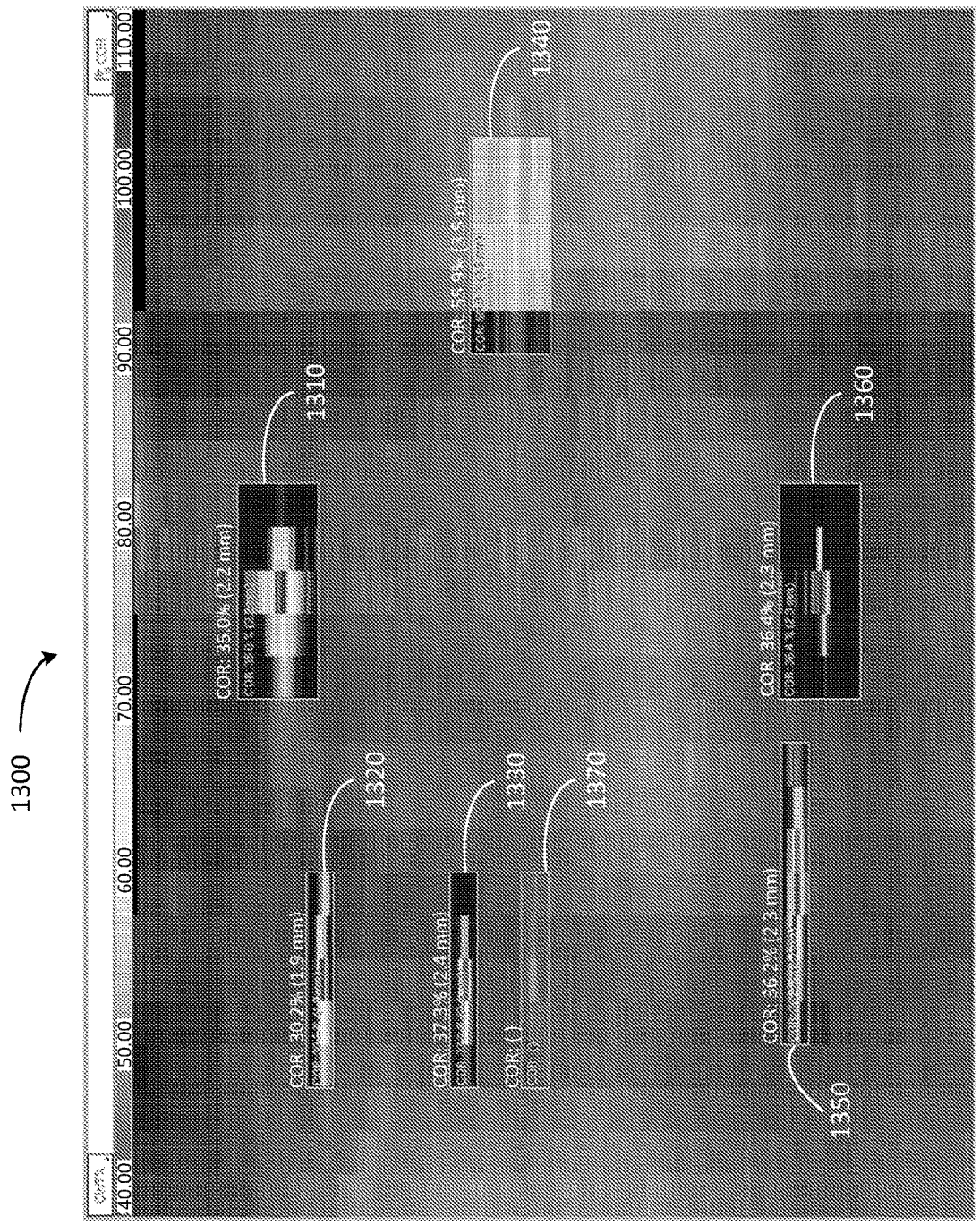
FIG. 13 is an example illustration of an output from one or more PECA sensors rendered on a display.

The metal plate 1120 may be referred to generally as a plate, constructed with one or more materials resistant to impact, changes in temperature, corrosion, or other potentially hazardous conditions. The resistivity provided by the materials can refer to a reduction in the consequences caused by external or internal environmental conditions. For example, the temperature, humidity, or objects impacting the plate may cause damages which leads to a reduction in plate thickness or an increase in corrosion level. The plate may be coated with at least a layer of fireproofing or corrosion preventive substances to reduce the degradation of the plate due to environmental conditions. The thickness of the plate can be consistent throughout. For example, from measuring the portions of the plate (e.g., from edge to edge), the corrosion level, plate thickness percentage, or other indicators of the plate thickness can be similar (e.g., within 1%, 2%, or 5% accuracy from the expected plate thickness). In other cases, the thickness of the plate may not be consistent. The plate can include corrosion, dent, bump, fold, or other abnormalities decreasing, or in some cases increasing, the plate thickness. The PECA device 1100 can average the thickness of the plate within a measured area. For example, the PECA device 1100 can be configured to cover 7 square inches of the plate for each measurement. The PECA device 1100 can be configured to cover greater or fewer areas, such as 3 square inches, 10 square inches, or 12 square inches. The PECA device 1100 can include hardware and software components to support measuring the plate thickness in various dimensions. Alternatively, the PECA device 1100 may not average the thickness of the plate. Instead, the PECA device 1100 can label one or more portions of the measured area to indicate the corrosion level or plate thickness respective to each portion, as depicted in FIG. 13. Therefore, by collecting raw data and labeling each portion of the plate thickness or corrosion level, undersizing the defects can be avoided. The metal plate 1120 can represent the plates used for constructing the tank wall for containing the flammable fluid (e.g., material, thickness, density, coating, or condition).

Before inserting the vehicle 101 into the tank for inspection, the PECA device 1100 installed with the vehicle 101 can be tested using the metal plate 1120. For example, the PECA device 1100 can collect plate thickness data or corrosion level data of the metal plate 1120 (e.g., test plate). The test plate may be representative of the tank wall. Subsequent to collecting the data, an operator can measure an actual thickness or an actual corrosion level of the test plate via additional tools. These tools may or may not be optimized for tank floor inspection. The differences between the measurement data collected via the PECA device 1100 can the actual measurement data collected via the additional tools can be calculated, for example, using an external computing device or the control unit 104 of the vehicle 101. The operator can configure or calibrate the PECA device 1100 based on the differences between the measurement data and the actual measurement data. The control unit 104 can receive the measurement data and the actual measurement data. In response to the receipt, the control unit 104 can configure or calibrate the PECA device 1100 accordingly. The calibration process can include configuring the settings of the voltage supplied to the PECA device 1100 (e.g., to increase or decrease magnetic field strength, the liftoff distance (e.g., either globally for the version of PECA devices or specifically for this PECA device 1100), or the velocity, if measuring the test plate while moving. The calibration process can include updating or reverting to a previous version of software or firmware.

Referring now to FIG. 12, depicted is a diagram describing the liftoff of the illustrative PECA device 1200. The PECA device 1200 can be similar to or include features and functionalities of the PECA devices depicted in FIGS. 10 and 11. As depicted, the illustrative PECA device 1200 has a nominal liftoff value from the plate (e.g., tank wall). The plate can have a predetermined thickness. The plate can also have a varying thickness throughout its surface, for example, each location on the plate may have a different thickness within predetermined or calculated boundaries. The plate thickness can represent or correspond to a corrosion level.

The illustrative PECA device 1200 can scan the plate without contacting the plate. For example, the PECA device 1200 may be floating in the flammable fluid, thereby elevating from the plate. The PECA device 1200 can produce accurate sensor readings (e.g., PECA sensor readings, corrosion readings, other readings, etc.) while at a predetermined or calculated distance (e.g., liftoff distance) away from the plate.

The plate can be coated or coupled with an additional layer. The coating or layer can include fire retardant substances, insulated layer, vapor layer, or corrosion preventive coating. The coating or layer can be applied to the plate, such as internal to the tank. The coating or layer can sit between the PECA device 1200 and the plate. The PECA device 1200 can collect data through the layer (e.g., emitting a magnetic field through the layer into the plate). The vehicle 101 with the PECA device 1200 can contact the layer without contacting the plate to collect plate thickness data (e.g., raw data, magnetic field data, decay data, or corrosion level data). The vehicle 101 can avoid contact with the layer or the plate to collect plate thickness data.

The liftoff distance can be the same as the plate thickness. The liftoff distance can be dependent on the plate thickness, for example, the liftoff distance can be a function of the plate thickness. The liftoff distance can be dependent on the capabilities of the illustrative PECA device 1200. For example, each PECA device 1200 (or any other PECA devices described herein) can include a nominal liftoff value which describes a nominal liftoff distance configuration.

In some cases, the interior tank surface, such as the tank wall (e.g., tank shell), tank floor, or the borders of the tank can be curved. For example, when inspecting the vertical wall or shell of a cylindrical tank, the vehicle 101 may traverse in the flammable fluid and make contact with the shell using rollers. The side of the vehicle 101 where the PECA device 1200 is installed can face the plate to collect plate thickness information. While inspecting the tank wall, the vehicle 101 with the PECA device 1200 can move along the wall to continuously collect plate thickness information at uninspected areas. The vehicle 101 can change its depth to access the entire shell of the tank. Controlling the depth of the vehicle 101 can be achieved via instructions from the control unit 104. Therefore, the control unit 104 can maintain the liftoff distance between the shell and the PECA device 1200 by maintaining the robot's rollers in contact with the shell.

Referring now to FIG. 13, depicted is an example rendering 1300 of one or more PECA sensors. The PECA sensors can be from at least one of the PECA device, for example, depicted in FIG. 10, 11, or 12. The example rendering 1300 may be referred to generally as a render 1300 of raw data collected from the PECA sensors. The render 1300 can represent a portion of the tank wall. The render 1300 can include one or more values which describe the thickness of the tank wall (e.g., plate, surface, or material). The values can be obtained by processing the raw data collected via the PECA sensors. The render 1300 can include one or more values indicating the corrosion level of the plate. The render 1300 can be displayed as a 2D image. The render 1300 can be displayed as a 3D image, navigable via a compatible software. The render 1300 can be saved as any file format available for reproduction in the compatible software, for example, STL, OBJ, FBX, EPS, 3DS, CSV, or PDF. The example render 1300 can represent a custom 7-element array with 7 inches coverage (178 mm). The renders can cover a larger area of processed data from the PECA sensors, such as 8 inches, 10 inches, or other sizes. The renders may cover a smaller portion of the tank plate based on a rendering setting.

The raw data indicative of the thickness level or corrosion level can be used by a machine learning engine. The machine learning engine can process the raw data to generate a 3D map, structure, or model of the tank. The generated 3D model may be saved in any 3D compatible file type, as mentioned above. The render 1300 can render values that are obtained from any of the PECA devices described herein. The render 1300 can be indicative of more than one PECA sensor or device. The render 1300 may be based on one or more post-processing methods, for example, post-processing to calibrate the one or more PECA devices described herein.

The render 1300 can be displayed via a display device of the external computing device. The display device can be in electrical communication with the control unit of the vehicle 101 (e.g., the display device installed in or on the vehicle 101). In some cases, the render 1300 can be generated by the control unit 104, such as in real-time or responsive to receiving the raw data from the PECA sensors. Responsive to an event may refer to performing an action or process immediately after the event. The render 1300 can be generated by the external computing device. For example, the control unit 104 can receive the raw data from the PECA sensors. The control unit 104 may store the raw data in the vehicle resource repository 126. The control unit 104 can transmit the raw data to the external computing device for generating the render 1300. In some cases, the raw data may not be stored in the vehicle source repository 126. Instead, the raw data may be stored in an external data repository subsequent to transmitting the raw data to the external computing device.

The example render 1300 can include a user interface for configuring display settings of the render 1300. The settings can include a compensated wall thickness ("CWT") to provide an indication of the remaining wall thickness. The measurement can be represented by a percentage, comparing the measured plate thickness to the nominal plate thickness. For example, when losing wall thickness, such as due to corrosion or other damages, the measured wall thickness (e.g., wall thickness percentage) can be below 100%. In another example, when wall thickness is gained, such as at a welded portion of the tank, the wall thickness percentage can be above 100%.

The example render 1300 can include a rendered plate with multiple corroded regions. These regions may be labeled as shown in the render 1300, such as region 1310 (COR: 35.0% (2.2 mm)), 1320 (COR: 30.2% (1.9 mm)), 1330 (COR: 37.3% (2.4 mm)), 1340 (COR: 55.9% (3.5 mm)), 1350 (COR: 36.2% (2.3 mm)), 1360 (COR: 36.4% (2.3 mm)), and 1370. Each region may be labeled with, for example, the percentage displayed in the render 1300 that(?) may not represent corrosion level. Instead, the percentage can represent a remaining thickness of the plate from the original plate thickness. For example, the percentage indicated by each region can indicate the remaining material or thickness of the plate, such as 35%, 30.2%, 37.3%, or 55.9% of the original plate thickness. The corresponding plate thickness value can accompany the percentage, such as 2.2 mm for the 35%, 1.9 mm for the 30.2%, 2.4 mm for the 37.3%, and 8.5 mm for the 55.9%. The original thickness for each region of the plate may not be the same. The original thickness for each region may be similar or approximate to other regions. The original thickness may indicate an average thickness throughout the region of interest (e.g., the regions indicated by the aforementioned labels). For example, the original thickness of region 1310 can be 6.29 mm, whereas the original thickness of region 1360 can be 6.32 mm. The original thickness throughout the plate can be the same. The term "original thickness" may refer to a thickness measurement of the whole plate or a portion of the plate, for example, before the plate departs from the production facility, exposes to unsupervised or harsh environmental condition (e.g., flammable fluid), uses for constructing the tank, or filling the tank with flammable fluid. In some cases, the percentage or value indicated for each region may not be an average of the whole region. Instead, the percentage or value can indicate the remaining plate thickness of a portion of the region, e.g., the thinnest or the most corroded portion of each region. For example, referring to region 1310, the 35% thickness may represent a thickness at the center of the region. Further from the center of region 1310, the percentage may increase above 35%, thereby labeling the thinnest portion of the plate region. By detecting the thickness or corrosion level at each portion of the plate, the undersizing measurement can be avoided. Undersizing can occur when the thickness at a portion of the plate is not accurately depicted due to the defects being smaller than the averaging area (e.g., region).

The scale of the thickness percentage or the corrosion level may be represented by a color spectrum in the render 1300, such as from dark red to dark blue. From dark red, the color can include orange, yellow, green, cyan, and eventually blue to represent the thickness level, for example. The color settings may be configured by the external computing device or an administrator device running the software to obtain the render 1300. In the case of render 1300, dark red represents a thinner portion of the plate and dark blue represents a thicker portion of the plate. Therefore, any portion of the plate represented with a red highlight, such as in the render 1300, may indicate a high risk of leakage. Any portion of the tank indicated by the red highlight may be notified to the external computing device. For example, the control unit 104 can process raw data received from the PECA sensors to determine the thickness percentage or a corrosion level for a portion of the plate. In response to a detection of less than 60% plate thickness, the control unit 104 can transmit an indication or a warning to the external computing device. The notification can indicate a high risk of leakage at the portion of the plate.

The render 1300 can be generated using a machine learning engine. The machine learning engine may be trained with sample raw data and actual measurement data. By comparing, matching, and identifying the differences between the sample raw data and the actual measurement data, the machine learning engine can generate a model optimized for determining plate thickness based on collected raw data from the PECA sensors. The machine learning engine may be embedded in the control unit 104 to collect and render an image of the tank wall. The external computing device can include the machine learning engine to render the image subsequent to receiving the raw data from the control unit 104 of the vehicle 101 (e.g., during operation or after retrieving the vehicle 101 from the tank).

A label can be created for an unidentified region of the plate. For example, an unidentified region can refer to a region of the plate the control unit 104 or the external computing device is not able to accurately determine the risk level, corrosion level, or plate thickness. An example region for the unidentified region can be depicted in region 1370. When presenting region 1370 to an operator via a display device of the external computing device, the external computing device can provide an option for manual input of corrosion information and risk level. The corrosion information manually inputted by the operator can be used to train the machine learning engine for optimizing other labeling schemes or risk level determination. The control unit 104 can determine to reinspect a portion of the plate in response to an unidentified region. The unidentified portion region can indicate a borderline case of leakage risk, such as a 60% or 3.76 mm plate thickness.

The percentage or value of the render 1300 can represent a corrosion level. For example, a high percentage can represent a high corrosion level (e.g., the measured portion of the plate is more corroded) or a reduction in thickness at a portion of the plate. Therefore, the percentage can represent a percentage of thickness loss or corroded at a portion or region of the plate. In some cases, the unit measurement can be represented via a value. The value can indicate the thickness of material loss, such as when calculated against the nominal wall thickness (e.g., original wall thickness). For example, an original plate thickness may be approximately 6.3 mm. By processing the raw data received from the PECA sensors, the control unit 104 can identify a corrosion level of 30%. The control unit 104 can display plate thickness lost corresponding to the corrosion level at a portion of the plate. In this case, the plate thickness lost can amount to 1.89 mm, 30% of the original plate thickness. Therefore, the thickness of this portion of the plate can be 4.41 mm.

Figure 14:
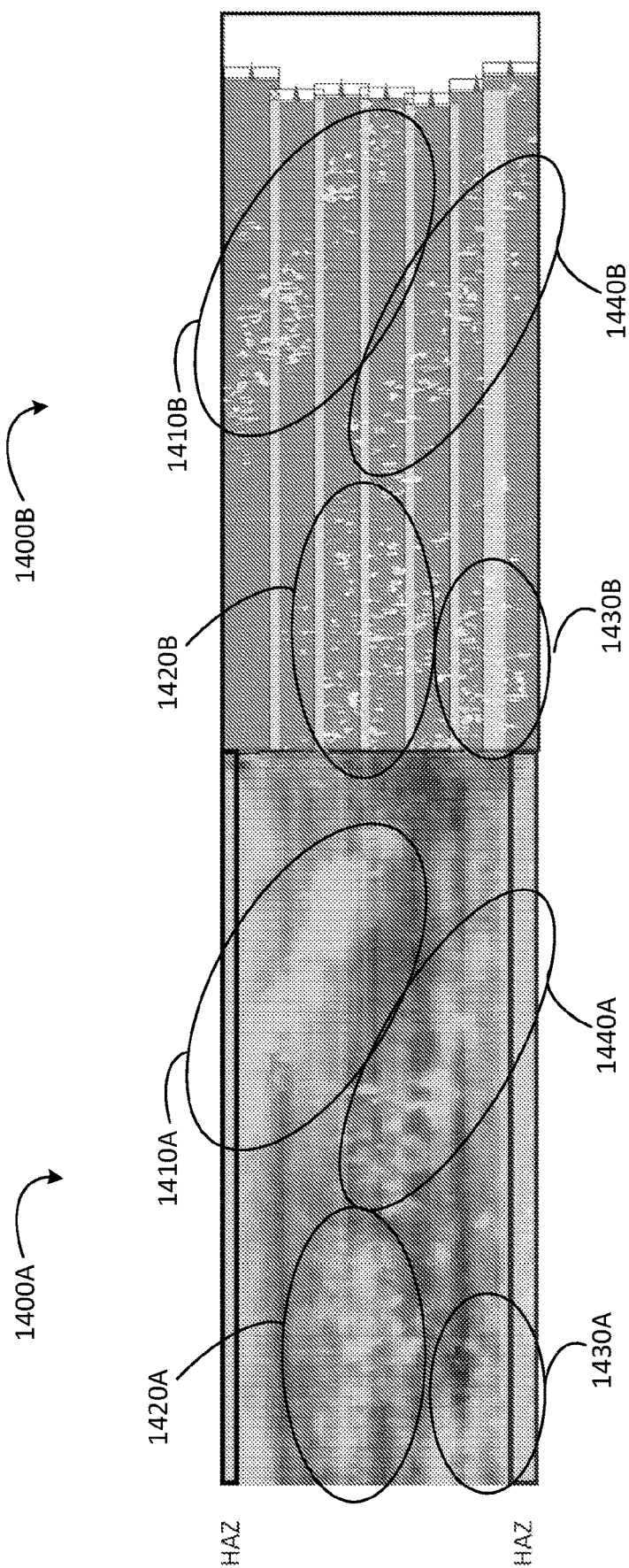
FIG. 14 depicts example illustrations of output from one or more PECA sensors compared to the output of one or more magnetic flux leakage ("MFL") sensors.

Referring now to FIG. 14, depicted are example data output renderings from one or more PECA devices (e.g., graph 1400A) and one or more magnetic flux leakage (MFL) devices (e.g., graph 1400B). The data rendered in FIG. 14, for example, the graph 1400A or the graph 1400B, can be collected from a plate removed from a tank during a floor repair. The rendered data can be from rendering sensor data collected from a plate within a tank containing flammable fluid, such as during an in-service inspection. The plate can be scanned with one or more PECA sensors or one or more MFL sensors to collect the data represented by the graph 1400A and the graph 1400B. The graph 1400A can be created using at least one of the PECA devices described herein, for example the PECA device 1000, or the mounted PECA device 1100.

As depicted in FIG. 14, soil-side effects can be detected by both technologies. The representation of the data can be different between data collected via the PECA device or data collected via the MFL device. The graph 1400B for the MFL device can be filtered to identify at least 15% of measured wall loss. Therefore, the graph 1400B may not present other minor defects of the tank, in this case. The defect threshold can be set for graph 1400B, such that other percentage of measured wall loss can be shown in graph 1400B (e.g., 10%, 7%, or 5%). The graph 1400A can be generated from raw data collected from PECA sensors. The graph 1400A can illustrate averaged wall thickness measurements with a resolution of 1 inch by 0.5 inches, for example. The size of the resolution can be relative to a portion of the plate (e.g., 1 inch by 0.5 inches of the plate). The resolution size can be predetermined and configured by an operator. The resolution size for each portion of the plate can be different. For example, the resolution for a first portion can be 1 inch by 0.5 inches, while a second portion can be 0.5 inches by 0.5 inches within the same graph. Different resolution can be used to avoid undersizing the defects of the plate.

The resolution size can increase, based on an accurate representation of an averaged area of the plate. For example, if a first portion and a second portion of the plate both indicate 90% thickness, the two portions can be combined to a resolution of 1.5 inches by 0.5 inches or 0.5 inches by 1.5 inches. The resolution size can be referred to as pixel size for rendering the graphs. By increasing the resolution size, resource consumption by the control unit 104 or the external computing device can be reduced. The resolution size can be determined automatically. For example, using the raw data collected from the PECA sensors, one or more processors (e.g., of the control unit 104 or the external computing device) can initially render a high-resolution graph. A high-resolution graph can indicate a greater number of pixels, or in the above case, less resolution size. The high-resolution render can include a resolution size of 0.25 inches by 0.25 inches, for example. From detecting the corrosion level around each pixel or portion of each graph rendered at the resolution size, the one or more processors can average its surrounding pixels with the same corrosion level. Therefore, each portion of each graph can include different resolution sizes, thereby increasing accuracy of defects depiction and reducing resources when rendering each graph on multiple devices.

Referring to graphs 1400A and 1400B depicted in FIG. 14, multiple soil side defect colonies can be identified. These soil side defect colonies can be labeled as, for example, regions 1410A, 1420A, 1430A, and 1440A for graph 1400A and 1410B, 1420B, 1430B, and 1440B for graph 1400B. From a visual comparison between the two graphs, each colony or region from one graph can be matched with the respective region of the other graph. For example, region 1410A includes similar patterns as 1410B, 1420A includes similar patterns as 1420B, 1430A includes similar patterns as 1430B, and 1440A includes similar patterns as 1440B. Thus, the generated graph 1400A from raw data collected by the PECA sensors can provide a high-accuracy soil-side defects detection. The graph 1400A can be presented with multiple heat affected zones ("HAZ") as labeled above and below the graph 1400A. The HAZ can be composed of metal plates that has been exposed to high temperature. The HAZ can be a part of the tank wall or floor that results from welding or high-heat cutting, such as seams within the tank.

Figure 15:
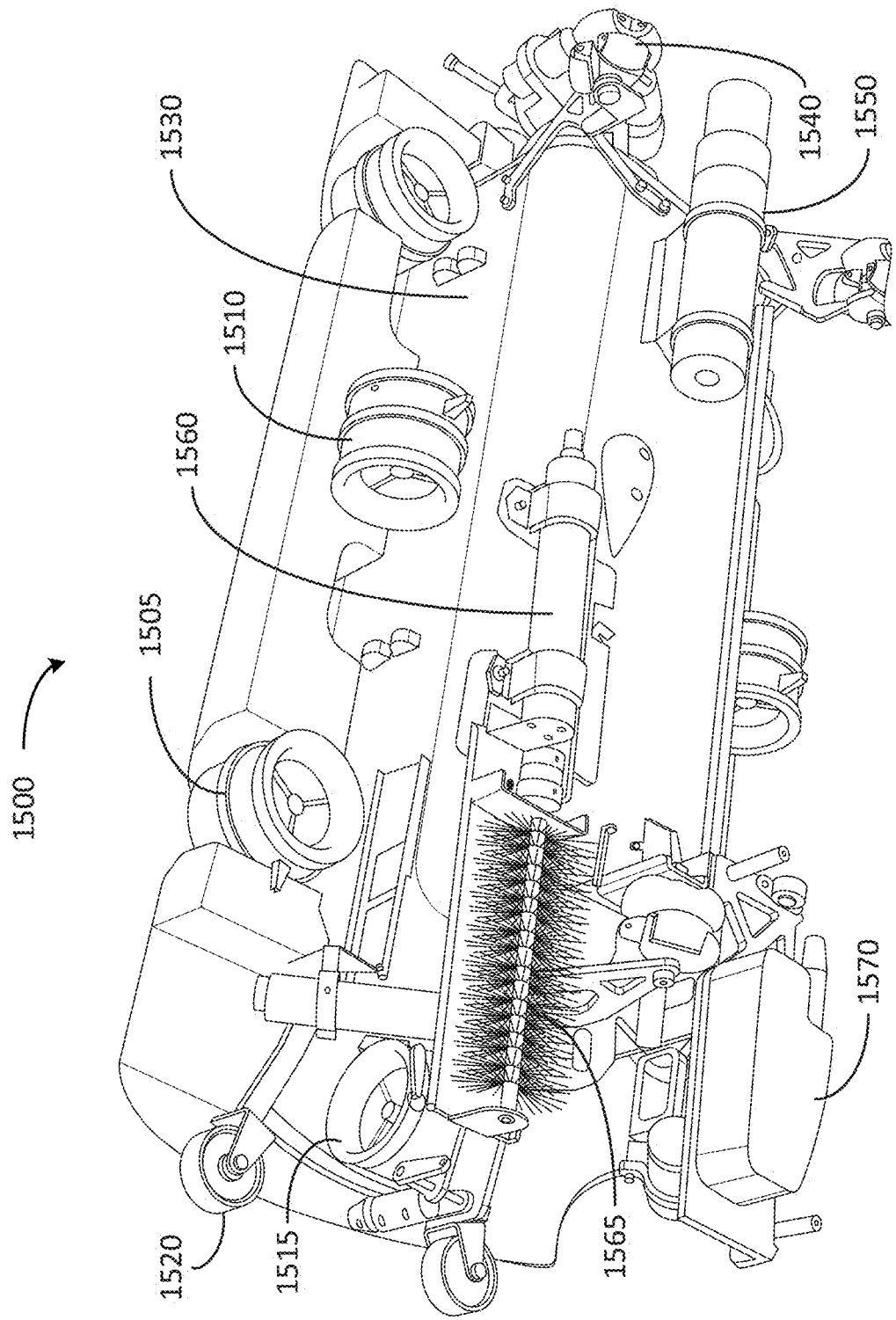
FIG. 15 depicts an example rendering of a technical implementation of an autonomous tank inspection device.

Referring now to FIG. 15, depicted is an example rendering of a robot 1500 for autonomous tank inspection. The robot 1500 can include one or more components or functionalities of vehicle 101 or ATIS 102 depicted in FIG. 1. The robot 1500 can be certified class 1 division 2 by a hazardous location certification body. The robot 1500 can operate in high flash point products, for example, diesel and/or jet fuel. The robot 1500 can include onboard battery power, one or more fiber optic data tethers, and one or more self-contained navigation systems. The robot 1500 can hover in the product (e.g., diesel, jet fuel, etc.) for mapping of floor obstacles. The robot 1500 can roll on the bottom of a tank or surface and critical zones for non-destructive testing data acquisition. The robot 1500 can perform automated surveys, for example, by implementing one or more of the methods described herein. The robot 1500 can include a PECA device 1570, for example, the mounted PECA device 1100 mounted at the back of the robot 1500, which can provide access to the floor and critical zones. The PECA device 1570 may be installed in other portions or location of the robot 1500 for access to the tank wall. The robot 1500 can provide a 0.5" liftoff using a rigid mounting bracket, and 3 or more contact points with the floor. The mount of the PECA device 1570 can be rotatable at any angle or extendable to reach the tank wall. For example, the robot can roll along the tank floor, and rotate the PECA device 1570 to measure the vertical wall of the tank. The robot 1500 can include a brush 1565 for brushing the surface of the tank, such as ahead of the PECA to improve sensor readings, which is an improvement over other implementations. The brush 1565 can remove oil, stain, or other substances from the tank wall. The robot 1500 can include one or more wet cable penetrators to connect the PECA to the electronics in the robot 1500, such as at connector 1550. The electronics in the robot 1500 can be powered by one or more onboard batteries. The electronics can refer to one or more hardware components of the robot 1500. The electronics can be connected to other computing devices via a network using one or more network protocols/interfaces (e.g., Ethernet, etc.).

The robot 1500 can include a system, such as ATIS 102, to plan one or more dive plans and/or scanning patterns. For example, the robot 1500 can use the network interface to communicate with an external computing device running controller software. The controller software can run on a top-side (e.g., outside the tank, or external to the tank) computer. The controller software can run on the robot 1500. The controller software can configure the sensors and data acquisition of the robot 1500, for example, the component configurations and/or the scan zones of the robot 1500. The controller software can communicate with the robot 1500 via a fiber-optic tether. The controller software can display PEC data in real-time (e.g., simultaneous to scanning, within 0.1 seconds, within 1 second, etc.). The controller software can log the PEC data (e.g., the data retrieved by the one or more sensors of the robot 1500) in the memory of one or more computing devices. The controller software can also control one or more instrument states of the robot 1500, for example monitoring states, triggering on states, triggering on NAV data (e.g., encoder override), start/stop logging conditions, etc. The instrument states can include an idle state, an acquisition state, and an unconnected state, among others. The controller software can trigger logging on NAV data and may use the NAV data to position PEC measurements.

The robot 1500 can include propellers, such as propellers 1505, 1510, and 1515. These propellers can be located at various sides of the robot 1500 for movement within the flammable fluid. For example, propeller 1505 can move the robot vertically, propeller 1510 can move the robot longitudinally, and propeller 1515 can move the robot laterally. The propeller 1515 can rotate the robot 1500 in the vertical axis, such that the robot 1500 can move in a different longitudinal direction. The propellers can include multiple angular blades constructed using a spark-proof material. The propellers can increase or decrease the velocity of the robot 1500 based on the rotation speed and direction. For example, rotating the propeller clockwise at an increasing speed can increase the velocity of the robot 1500 going forward, and rotating the propeller counterclockwise can increase the velocity of the robot 1500 going backward. The propellers of the robot 1500 can be in electrical communication with the control unit 104 to receive electrical signals for initiating movements.

The robot 1500 can include multiple wheels, such as wheel 1520. The wheels can be located at any portion of the robot 1500, such as the sides, the top, or the bottom of the robot 1500. In some cases, component 1540 can be a wheel. The wheels can be used to move the robot on the surfaces of the tank. The wheels can act as bumpers to avoid potential impact between the robot 1500 and the tank wall. The wheel can include a suspension system. The suspension system can elevate the robot 1500 from the ground and absorb the impact experienced by the body of the robot 1500 when falling to the tank floor, for example. The wheels of the robot 1500 can be in electrical communication with the control unit 104 or receive electrical signals for initiating movements.

The robot 1500 can include a casing 1530. The casing 1530 can house the electronics of the robot 1500 including the battery, the control unit 104, the memory, or other components of the ATIS 102. The casing 1530 can be constructed with impact-resistant material, spark-resistant material, temperature control coating (e.g., to maintain a consistent temperature of the robot 1500), corrosion-resistant coating, fire-retardant coating, or other materials similar to the vehicle 101. The casing 1530 may be referred to as the body of the robot 1500. Electrical connections may be linked back to one or more components within the casing 1530. The casing 1530 can include screw holes, sockets, or inserts to couple components to the exterior of the casing 1530, such as the brush 1565, the brush extender 1560, and the mapping sonar 1550. The casing 1530 may be symmetrical. The casing 1530 may be asymmetrical to fit additional components on a side of the casing 1530.

The robot 1500 can include at least one mapping sonar 1550. The mapping sonar 1550 can generate the tank map by projecting sounds and recording the reflected sounds. For example, upon entering the tank, the robot can initiate the mapping sonar 1550 to generate a map of the tank. The generated map can be compared to a map provided by the external computing device prior to deployment into the tank. The pre-stored map (e.g., in the vehicle resource repository 126) can be configured based on the generated map. For example, the map provided by the external computing device can be a barebone map with dimensions of the tank. Using the mapping sonar 1550, the robot 1500 can detect pipes, middle column, and other objects or obstructions within the tank. Hence, the robot 1500 can configure the pre-stored map with data from the generated map, for example, to include exclusion zones.

The robot 1500 can include at least one connector compatible with one or more wet cable penetrators. The connector can be waterproof and operatable under hazardous environments. The connector can be a bulkhead connector configured to be coupled with web cable penetrators. The wet cable penetrators can be a cable optimized for connection in fluids. The connector can include a rubber gasket and rubber rings to push liquids away from the pins of the wet cable penetrators during an engagement. The connector can include a cap to prevent liquid from entering. The connector can connect with the wet cable penetrators outside the tank or before submerging in the flammable fluid. The connection can be performed post-submersion. The connection between these components can be maintained throughout the tank inspection. The connection can be maintained only outside the tank in some cases, such that the connection is disconnected before the robot 1500 submerges in the flammable fluid. The control unit 104 can communicate with the external computing device via the connection between the connector and the cable. The control unit 104 can transmit data packages to the external computing device via the connection, and vice versa.

The robot 1500 can include at least one brush 1565 for clearing debris from the tank surface. The debris may be in a solid-state or a jello form. For example, the flammable fluid can attach and harden on the tank wall. The brush 1565 can be attached to a brush extender 1560. The extender 1560 can act as a piston to extend the brush 1565 to a certain reach, as capable by the extender 1560. The extender 1560 can include a motor or gear for rotating the brush 1565. By providing the rotation to the brush 1565, the speed to clear the debris can be enhanced. The extender 1560 can be in electrical communication with the control unit 104 to activate, deactivate, or otherwise control the brush 1565. The extender 1560 can be attached to any location of the robot 1500. The location of the extender 1560 can correspond to the location of the brush 1565. As an example, and depicted in FIG. 15, the brush 1565 and the extender 1560 are located at the bottom of the robot 1500. The extender 1560 and the brush 1565 can be installed at any location adjacent to the PECA device 1570, such as to clean the surface of the plate for data collection by the PECA sensors. The brush 1565 can be composed of anti-static materials.

The brush 1565 can include or be replaced with a suction mechanism or device. For example, the suction device can be connected to the extender 1560. In this case, the extender 1560 can include a pump to both extend the suction device and pull in the debris from the tank wall. The pump can lead the removed debris from the suction device to a waste bin located in the casing 1530, for example. In some cases, the suction device may dispose of the removed debris into the flammable fluid of the tank. The debris can refer to hardened flammable fluid stuck on the tank wall. The robot 1500 can include a grinding device interconnected with the pump. The grinding device can grind the debris to smaller particles for disposition. The grinding device can be included in the extender 1560, for example. The debris can be grounded back to a liquid state, such that the robot 1500 can dispose of the grounded debris in the flammable fluid.

Referring now to FIGS. 16A-B, depicted are mounting mechanism 1600A and mounting mechanism 1600B for one or more autonomous robots for tank inspection (e.g., the robot 1630 or the vehicle 101). The robot 1630 can include a coupling mechanism for attaching a cable to lower the robot 1630 from the tank roof. For example, the component 1640 can include a coupling mechanism, such as a lock, a hook, or an anchor for attachment with the cable. The coupling mechanism can be in electrical communication with the control unit 104. The coupling mechanism can release a lock attaching the cable to the robot 1630. The lock can be released upon the robot 1630 contact with the flammable fluid within the tank. In another example, upon executing an exit procedure, the robot 1630 can identify the location of a cable reeling down from the tank roof. The robot 1630 can align the coupling mechanism to the cable and perform a connection between the coupling mechanism and the cable. Thereafter, the robot 1630 can be reeled up to the tank roof, completing the in-service inspection process.

The in-service inspection process can include the following, among others. The robot 1630 can be reeled down from the top of the tank via a cable coupled to a coupling mechanism. Upon entering the flammable fluid, the control unit 104 can transmit an electrical signal to the coupling mechanism to release the cable from the robot 1630 or the coupling mechanism can be mechanically decoupled. The robot may not be attached to any cable or wires. An operator can remove the cable from the tank and close the tank lid. The robot 1630 can detect that the lid has been closed, and initiate the installed inspection process. The inspection process can include a predetermined route (e.g., stored in the vehicle resource repository 126) for inspection portions of the tank, such as the floor or the wall. The robot 1630 can follow the route to inspect the predetermined portions of the tank using the propellers. In each area, depending on the debris or substances coated on the tank plate, the robot 1630 can use the brush 1565, extendable by the extender 1560, to clean the plate. The robot 1630 can use the PECA device 1640 to inspect each portion of the plate. The PECA device 1640 can inspect the plate during a pause. The PECA device 1640 can inspect the plate while in motion. Upon inspecting all the portions of the tank, the robot 1630 can execute an exit procedure by coupling with a cable reeled down from the tank roof. When executing the exit procedure, the control unit 104 can transmit a signal to the external computing device, notifying an operator to reel down a cable.

The robot 1630 can be set to inspect all portions of the tank. For example, in addition to the predetermined route, the robot 1630 may detect that at least one portion of the tank was not inspected. The control unit 104 can compare locations of the inspected tank portions to a map stored in the memory. Upon identifying an uninspected portion of the tank, the robot 1630 can travel to the uninspected location and perform an inspection using the PECA device 1570. The robot 1630 can identify one or more uninspected portions via a visual sensor identifying inspectable portions within the tank. The predetermined route can indicate one or more portions of the tank not to inspect. The portions to not inspect may be referred to as exclusion zones. The exclusion zones may be applied to columns and pipes within the tank. The map of the tank can be predetermined and stored in the memory of the robot 1630 for the control unit 104 to follow. The robot 1630 can generate a map using various sensors indicated in the ATIS 102.

The mounting mechanism 1600A can be used to ship the one or more autonomous tank inspection systems including the PECA devices described herein and the robot 1500. The mounting mechanism 1600A can include a shipping case 1610 for transporting the robot 1630 and the support equipment 1620. The shipping case 1610 may be referred to as a casing for storing the support equipment 1620 and the robot 1630. The robot 1630 can include the PECA device 1640. The PECA device 1640 can include the same features and functionalities as the PECA devices in at least FIGS. 10-12 and 15. The support equipment can reduce or absorb impact during transportation. The support equipment 1620 can be installed on a side of the robot 1630. By installing the support equipment 1620 to the robot 1630, the robot 1630 can be fixed to the support equipment 1620. The support equipment 1620 may be referred to as a housing or a bracket of the mounting mechanism 1600A. The robot 1630 may include similar features and functionalities as the robot 1500 or the vehicle 101, for example. The mounting mechanism 1600A can include additional support equipment, which can be different from the support equipment 1620. The mounting mechanism 1600A can be shipped in trailer pulled by a trailer truck or may use different shipping methods.

The support equipment 1620 and the casing 1610 can be constructed using one or more materials similar to the robot 1630, such as aluminum, plastic, rubber, or carbon fiber. The support equipment 1620 and the casing 1610 can be coated or layered with, for example, rubber, polyester, or foam to reduce the vibration and impact during transportation. The casing 1610 can fit both the support equipment 1620 and the robot 1630. The casing 1610 can include a housing mechanism for coupling with the support equipment 1620. The casing 1610 can include a lid to enclose the robot 1630 from the external environment. For example, an operator can hook the robot 1630 with the support equipment 1620. Once installed, such as with a screw or a lock, the robot 1630 on the support equipment 1620 can be inserted in the casing 1610. The casing 1610 can include foams, insulation, or other paddings to minimize vibration on objects inside the casing 1610. The casing 1610 can include a locking mechanism or a coupling mechanism configured to lock or bolt down the support equipment 1620 inside the casing 1610. The casing 1610 can include belts to fix the robot 1630 at a position. Once the support equipment 1620 and the robot 1630 are secured within the casing 1610, a lid can be coupled onto the casing 1610. Thereinafter, the mounting mechanism 1600A can be transported using a truck and stored in an air-conditioned room, for example.

The support equipment 1620 can act as a cushion or shell to protect at least the robot 1630 and the PECA device 1640. The robot 1630 may not be bolted nor locked onto the support equipment 1620. Instead, the robot 1630 can be friction fitted with the inner compartment of the support equipment 1620 or magnetically coupled to the support equipment 1620, for example. In this case, the robot 1630 can be stable within the support equipment 1620 and the casing 1610 during transportation. Once transported, the robot 1630 can be removed from the casing 1610 and the support equipment 1620 with ease.

The mounting mechanism 1600B can be used to lift the PECA devices and/or the autonomous tank inspection devices using one or more cranes. For example, depicted in FIG. 16B can include a crane 1650, a cable 1660, and the robot 1630. The mounting mechanism 1600B may be referred to as components to lift the robot 1630 into the tank to perform in-service tank inspection. The crane 1650 can include the cable 1660 with a hook to couple with the robot 1630. For example, the robot 1630 can arrive at the inspection site with the crane 1650. An operator can hook the cable 1660 of the crane 1650 to the robot 1630. Once coupled, the crane 1650 can lift or reel in the cable 1660 to elevate the robot 1630 to the roof of the tank. When the vehicle 101 is lifted to the roof of the tank, the vehicle 101 can be hooked to another crane or davit for guiding the vehicle 101 to the tank lid and lowering the vehicle 101 into the tank. The other crane or davit can be part of the crane 1650. For example, the crane 1650 can navigate the robot to the lid 1670 of the tank. The crane 1650 can lower cable 1660 thereby lowering the robot 1630 pass the tank lid 1670. Once inside the tank (e.g., submerge in the flammable fluid), the robot 1630 can disengage with the cable 1660. The cable 1660 can be integrated with electronic circuitry to disengage with the robot 1630 upon submersion in the flammable fluid. Subsequently, the crane 1650 can reel in the cable 1660 and the lid 1670 can be closed to begin the in-service tank inspection. The lid 1670 can be opened and the crane 1650 can lower the cable 1660 again as part of the exit procedure.

Figures 17A, 17B, 17C:
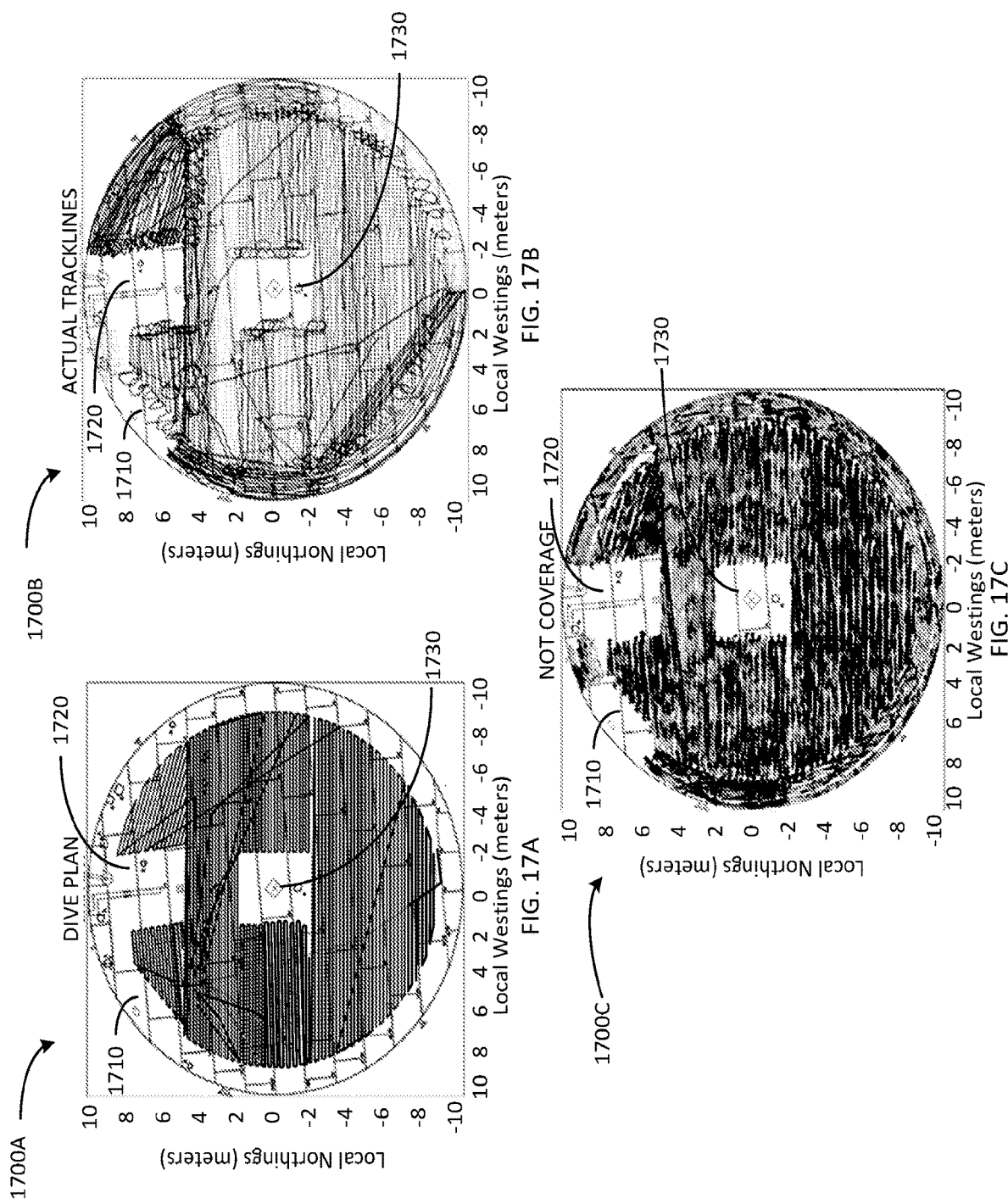
FIGS. 17A-C depict example output from a rendering of a dive plan, and resulting sensor output obtained from the dive plan.

Referring now to FIGS. 17A-C, depicted are renderings of a dive plan 1700A, scanned track lines (e.g., actual track lines 1700B), and the non-destructive testing ("NDT") coverage 1700C by the scanning system. The graphs 1700A, 1700B, and 1700C are representations of the plan, track lines, and scans in a 70-foot diameter water tank. For example, the controller software can determine a dive plan based on scanning the tank using the one or more scanners on the robot 1500. The robot 1500 can scan the tank to determine the dive plan. The controller software can log the dive plan and create a rendering of the dive plan 1700A. The map of the tank can be predetermined or recorded in a central data repository. The tank map can be retrieved via the external computing device for generating a dive plan for the tank inspection. The operator can create the dive plan 1700A, as depicted in FIG. 17A. The tank map can include one or more preinstalled dive plans. In this case, after retrieving or opening the tank map on the external computing device, the operator can select one of the default dive plans. An option can be presented to the operator to configure the dive plan.

The dive plan 1700A can include multiple exclusion zones, such as exclusion zone 1710, 1720, and 1730. The exclusion zones can refer to areas of the tank where the robot 1500 may not perform tank inspection or may avoid when moving within the tank. When accounting for the exclusion areas, the robot 1500 can conserve 5 feet around the exclusion zone to prevent damaging objects in the exclusion areas. For example, the exclusion zones can include a center column 1730, pipes 1720, or other obstructions within the tank. These obstructions may prevent the robot 1500 from traveling moving through or inspecting the area. The exclusion zones can indicate areas where the robot 1500 may not pass through, however, the robot 1500 can inspect the exclusion zones using the PECA device 1570. For example, the robot 1500 can stop near the exclusion zone. Once in position, the robot 1500 can extend the reach of the PECA device 1570 to inspect portions of the exclusion zones. The PECA device 1570 can maintain a predetermined liftoff distance from the tank floor.

The tank map can be represented in a 3D model. In similar regards, the dive plan 1700A, actual track lines 1700B, and the NDT coverage 1700C can be represented via the 3D tank model. The dive plan 1700A can be configured to determine the robot 1500 vertical movement in the flammable fluid. The tank map can include additional objects, such as pipes and a center column of the tank to accurately depict the interior of the tank. The PECA device 1570 can be configured to inspect various objects within the tank in addition to the tank wall, such as the center column and the pipes inside the tank. In this case, the robot 1500 can refer to the dive plan 1700A to move near the objects. The robot 1500 can initiate the inspection using the PECA device 1570 on the objects, e.g., by reaching the PECA device 1570 to the objects.

The dive plan 1700A can indicate the traveling path for the robot 1500. The control unit 104 can follow the path to complete the inspection. The robot 1500 can detect one or more areas that are not in the dive plan 1700A. The robot 1500 can be configured to only travel and inspect areas indicated by the dive plan 1700A. Accordingly, the robot 1500 can ignore the uninspected area, not within the dive plan 1700A. In some other implementations, the robot 1500 can be configured to inspect all uninspected areas or at least areas reachable by the PECA device 1570. In this case, the robot 1500 can travel or inspect outside the dive plan 1700A. Thus, any indication of uninspected areas can be inspected by the robot 1500.

Figure 20:
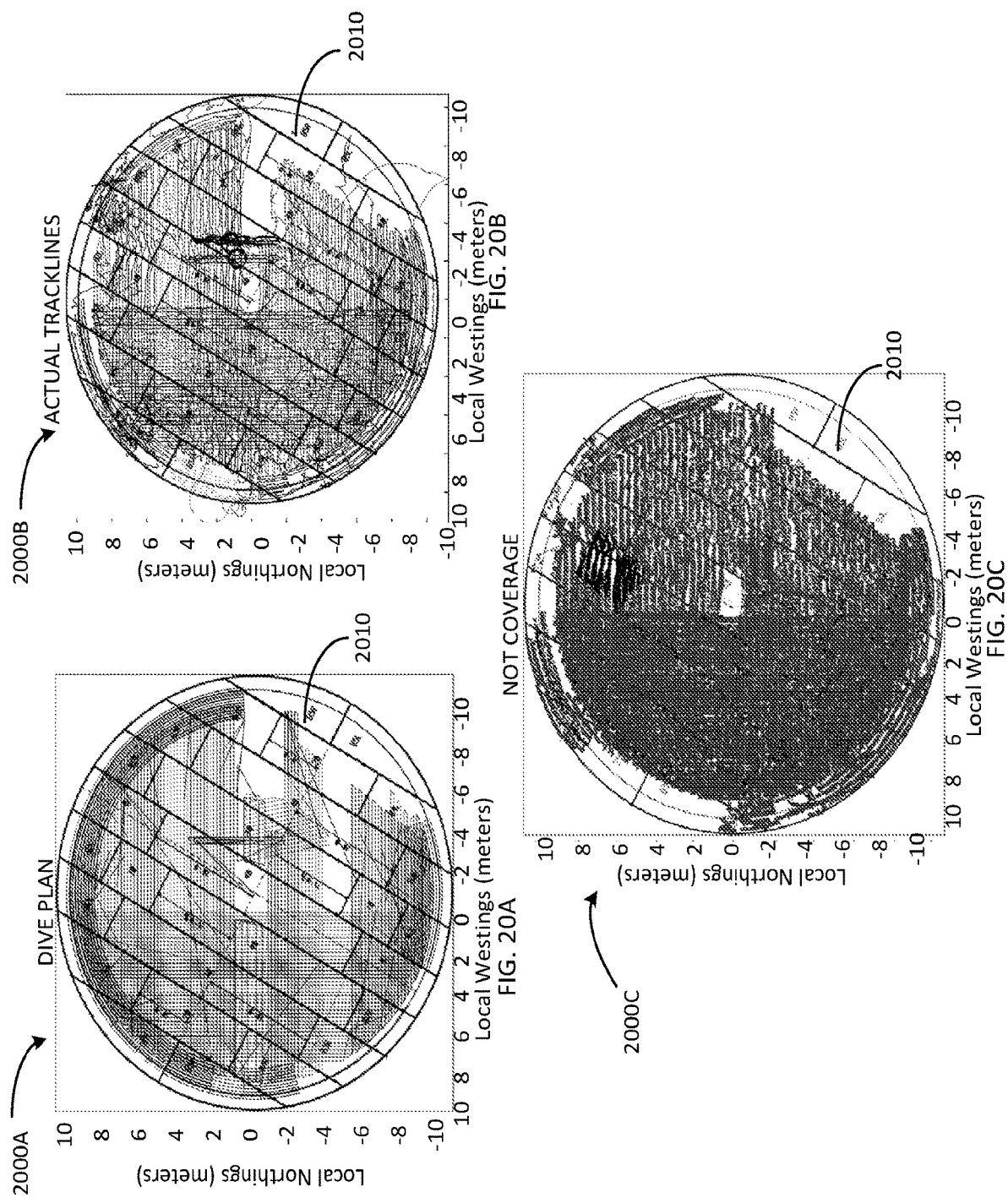
FIGS. 20A-C depict example renderings of a dive plan and the corresponding signal patterns which resulted from the dive plan.

After measuring the tank using the dive plan, the controller software can retrieve the measurements from the one or more sensors (e.g., the PECA devices described herein) and create a track line rendering 1700B of where the robot has scanned. As seen in the example track lines 1700B, the portions inspected by the robot 1500 extends beyond the dive plan 1700A. In other words, as an example, the dive plan 1700A can be a movement guide for the robot 1500, instead of an inspection location. Therefore, the robot 1500 can move along the dive plan 1700A and measure the areas around the robot 1500 while moving in accordance with the dive plan 1700A. For example, referring to FIG. 17A, in addition to the exclusion zones 1710, 1720, and 1730, the dive plan 1700A may conserve 3 feet of space between the robot 1500 and the tank wall, such as due to parallel arcs within the 3 feet from the tank wall. Hence, referring to FIG. 17B, the actual track lines 1700B may indicate one or more portions of the tank inspected by the robot 1500, which may not be directly correlated to the dive plan 1700A (e.g., the robot 1500 is not directly at the inspected portion). For planned tracks near the tank shell, FIGS. 20A-C can illustrate the dive plan, the actual track lines, and the NDT coverage near the tank shell.

Using the actual sensor data, the controller software can render the NDT coverage 1700C of the tank using the track lines and the sensor information about tank thickness. As depicted in FIG. 13, different plate thickness can be highlighted via various color schemes, such as in a spectrum from dark red to dark blue. Each inspected portion of the tank may be labeled with a corrosion level or tank thickness percentage upon rendering the NDT coverage 1700C. In some cases, the NDT coverage 1700C may not indicate dire defects within the tank plate (e.g., all portion of the tank plate include a thickness of 80% or more remaining). After generating the NDT coverage 1700C, an additional dive plan can be created to remedy the defects within the tank wall or floor (e.g., at least one portion of the tank plate includes a thickness of less than 50%). For example, subsequent to completing the tank inspection, the robot 1500 can be retrieved from the tank. Sensor data collected via the PECA device 1570 can be retrieved to generate the NDT coverage 1700C of the tank. The robot 1500 can transmit new sensor data in response to a collection by the PECA device 1570. Once the NDT coverage 1700C is generated, defects of the tank plate including the tank wall and floor can be identified. The defects can be notified to the operator via a notification to the external computing device based on a defect threshold. For example, the operator can configure or provide a predetermined defect threshold. The predetermined defect threshold can include a range of tank thickness or corrosion levels, such as a thickness of less than 60%, corrosion level of greater than 40%, or a decay rate of less than 25 ms for a magnetic field strength powered at 7 voltage. Other thresholds can be viable depending on what is considered a high-risk level. For example, a 50% wall thickness for a 1-foot plate may be of less risk than a 70% wall thickness for a 1-inch plate. Therefore, in response to the defect threshold, the robot 1500 can provide an indication of a risk level at each portion of the tank to the operator via the external computing device. Furthermore, the risk level can depend on the substances contained by the plate, such as flammable fluid, non-flammable fluid, or toxic compounds.

Referring back to FIG. 17A, the dive plan 1700A can indicate different regions for utilizing different inspection procedures. Each region of the tank may require different settings and configurations for the PECA device 1570, or other inspection devices thereof. For example, each region of the tank may be constructed using different plate thicknesses (e.g., thicker plate at the lower portion of the tank and thinner plate at the higher portion of the tank wall). The different regions may be labeled by the operator for the robot 1500 to adjust the inspection setting to meet the region requirement. The setting can include liftoff distance, magnetic field intensity, or traveling velocity of the vehicle. The control unit can appropriately adjust each setting to meet the requirement of each portion to inspect. For example, different regions can be illustrated in the dive plan 1700A by way of changing the track lines color upon entering a new region. The robot 1500 can move differently upon entering a new region.

Figure 18B:
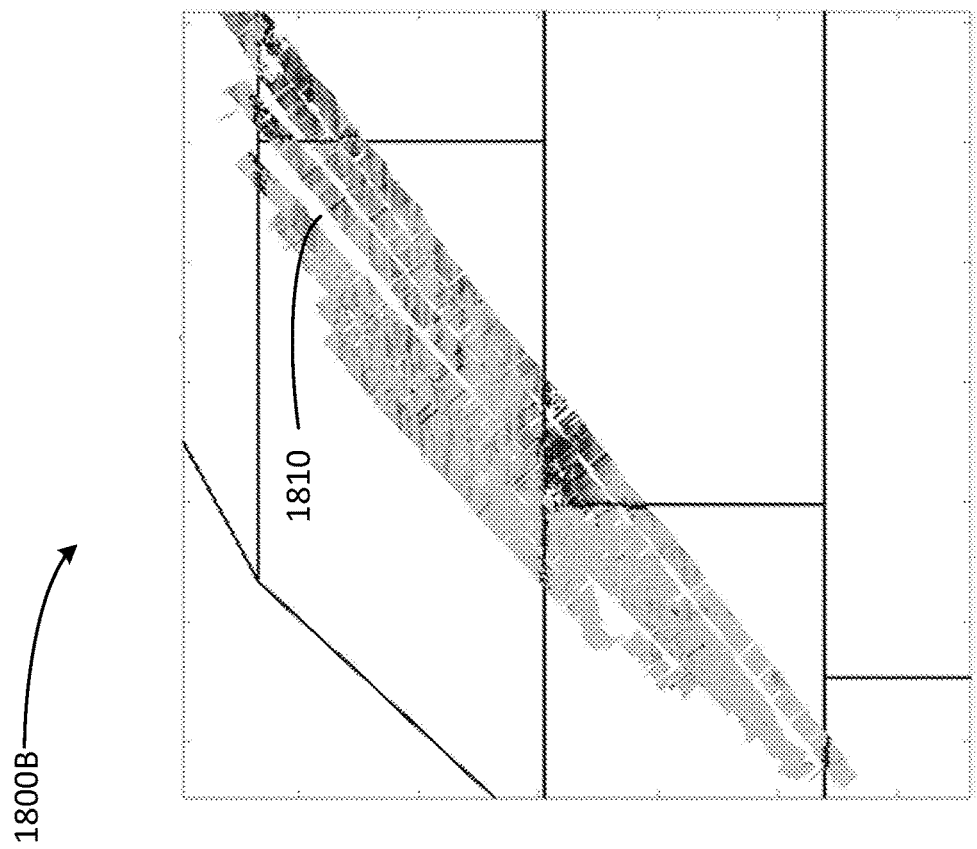
FIGS. 18A-B depict example output from before and after automatic adjustment of pulse eddy current ("PEC") based on post-processing.
Figure 18A:
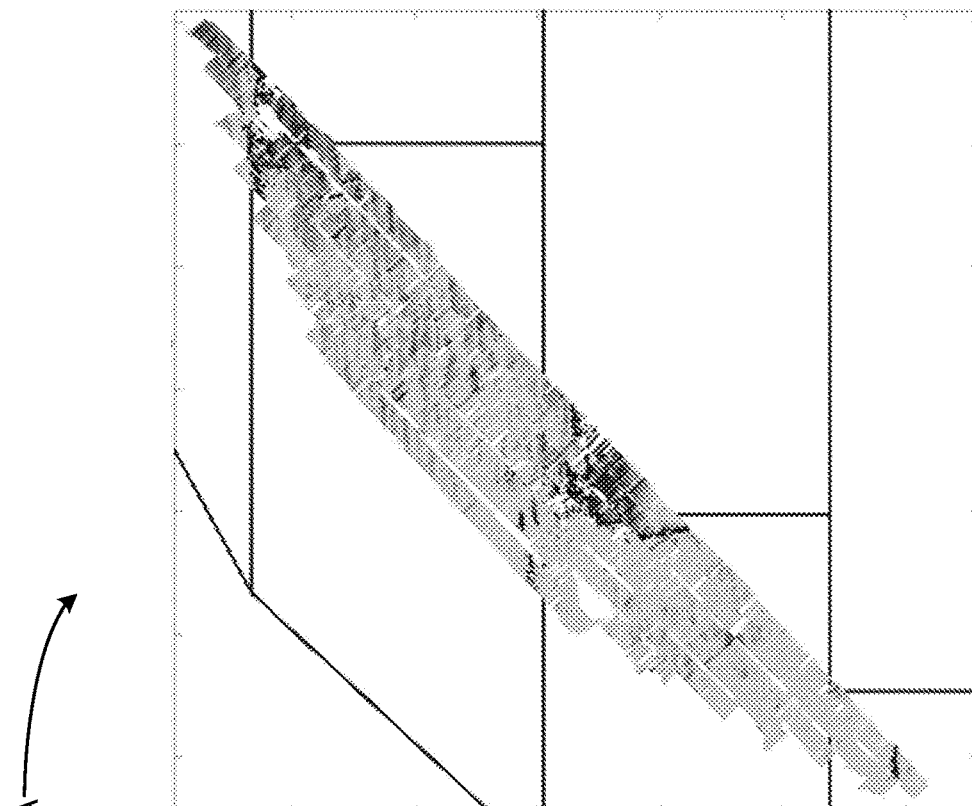

Referring now to FIGS. 18A-B, depicted are the effects of post-processing on the PEC data. An example illustration of raw PEC data render 1800A is shown in FIG. 18A. An example illustration of aligned PEC data render 1800B is shown in FIG. 18B. Note that in the raw PEC data 1800A does not line up with the aligned PEC data render 1800A. For example, the raw PEC data 1800A can be adjusted to align with weld seams 1810 detected in the PEC data with the render 1800A. Prior to the adjustment, the raw PEC data render 1800A can be skewed from the weld seams 1810 in the tank, such that the weld seams 1810 is not reflected in the render 1800A. In contrast, the aligned PEC data uses one or more post-processing algorithms to align the PEC data to the weld seams 1810 in the tank, which is an improvement over other implementations.

For example, the raw PEC data can be collected using one or more PECA devices, as depicted in at least FIGS. 10-12, and 15. The robot 1500 can use the PECA device 1570 to collect the raw PEC data. The raw PEC data can be provided as input to a post-processing software to align weld seams 1810 detected in PEC data with the render 1700A. Real-time positioning of the robot 1500 during the inspection of each portion of the tank can be provided to the software for processing the PEC data. For example, the software can apply a translation or a rotation to each band of the raw PEC data to line-up with the rendered image 1800A. After processing the PEC data, the software can output the rendered aligned PEC data 1800B with an aligned weld seams 1810.

Figure 19:
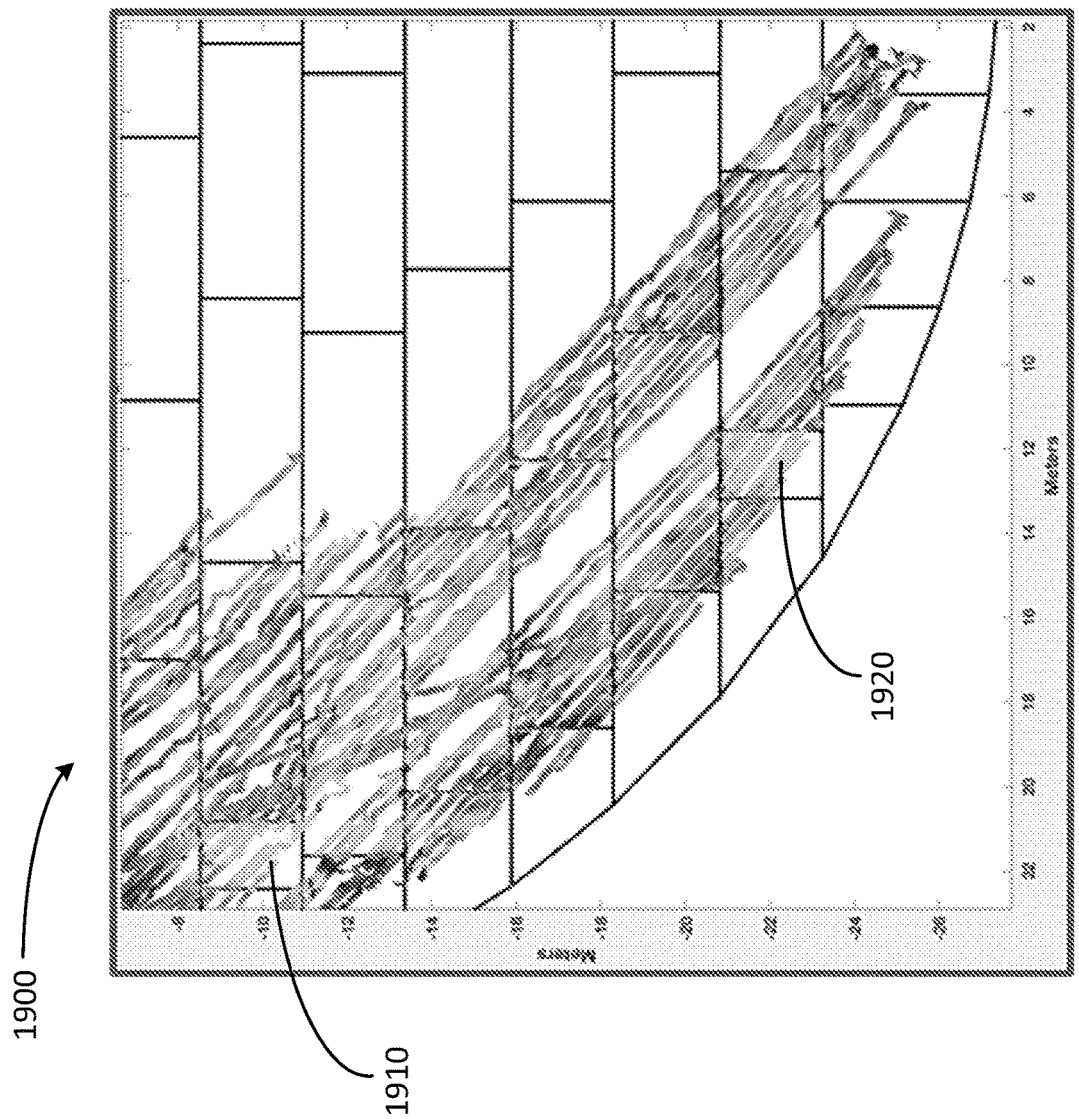
FIG. 19 depicts an example rendering of the output of one or more sensors used to scan a 180 foot diesel tank.

Referring now to FIG. 19, depicted is PEC data of a section of a 180-foot diameter tank scanned using one of the systems described herein. The PEC data can be represented in render 1900. The PEC data can be collected using one or more PECA devices, such as the PECA device 1570. Sedimentation can occur at the bottom of the tank. During deployment of the robot 1500, a brush 1565 can be used to scrap or clean the sedimentation on the surface of the tank plate (e.g., on the tank floor or tank wall). From the rendered PEC data 1900, regions 1910 and 1920 can indicate a thickness of approximately 85% remaining. Other regions in this section of the plate can include a thickness of greater than 85% remaining. In this case, the operator may not initiate a second dive plan, due to the low-risk level based on the thickness percentage at the section. Multiple risk-levels and their corresponding threshold can be predetermined and configured. For example, 80% or greater thickness can indicate low-risk, 65% to 80% can indicate a medium-risk level, and less than 65% thickness can indicate a high-risk level. The risk level may indicate a likelihood of leakage occurring, for example, within a predetermined timeframe (e.g., a month, a year, or a decade). For each risk level, a corresponding procedure can be performed. For example, with the low-risk level, this can indicate that the tank is fully operational and a second tank inspection can be scheduled for a future date, such as in a year. With the medium-risk level, additional precautions may be taken, such as scheduling an earlier inspection date (e.g., within half a year).

In the implementations above, the risk levels are determined based on at least a portion of the plate bearing a thickness level indicative of a high likelihood of leakage. For example, a 1-inch by 1-inch portion of the tank can be less than 40% thickness. Even if the tank is a 70-foot diameter tank, the operator can determine that there is a high likelihood of leakage for the tank. The risk levels can be determined based on an average of all inspected portions of the tank. In this case, and referring to the previous example, the operator can determine that there is not a high enough likelihood of leakage (e.g., from the averaged of all inspected portion) label the tank as high-risk.

Referring now to FIGS. 20A-C, depicted is an example PEC inspection report. For example, as described above, a dive plan 2000A can be similar to the dive plan 1700A as described above in conjunction with FIG. 17A. The actual track lines 2000B can be similar to the track lines 1700B as described above in conjunction with FIG. 17B. Likewise, NDT coverage 2000C can be similar to the NDT coverage 1700C as described above in conjunction with FIG. 17C. The PEC inspection report can provide the NDT coverage maps 1700C, and plate by plate analysis after alignment with weld seams (e.g., alignment post-processing of PEC data), among others. Similar to FIGS. 17A-C, the dive plan 2000A can be executed by at least the vehicle 101 or the robot 1500. Furthermore, the NDT coverage 2000C can be rendered using PEC data collected from one or more PECA devices, such as shown in at least FIGS. 10-12 and 15.

The dive plan 2000A, the actual track lines 2000B, and the NDT coverage 2000C can include exclusion zone 2010, similar to exclusion zones 1710, 1720, or 1730. The exclusion zone 2010 can prevent the robot 1500 from moving beyond 5 feet from the zone 2010. As seen in FIGS. 20A-C, the renders 2000A-C includes exclusion zone 2010 to account for pipes and objects within the tank. Additionally, the center of the tank can include an exclusion zone for the center column. In the case of the rendered NDT coverage 2000C, the inspected portions of the tank can include thickness measurement of at least 0.3 mm or greater, for example. In this case, the original thickness of the tank can be 0.45 mm. Therefore, the thinnest portion of the plate is approximately 66.67% of the original thickness. In view of the above example, presented in FIG. 19, this may categorize some portions of the tank as a medium-risk level. Therefore, a corresponding precaution measure for a medium-risk level can be executed by the operator and the robot 1500.

Figure 21:
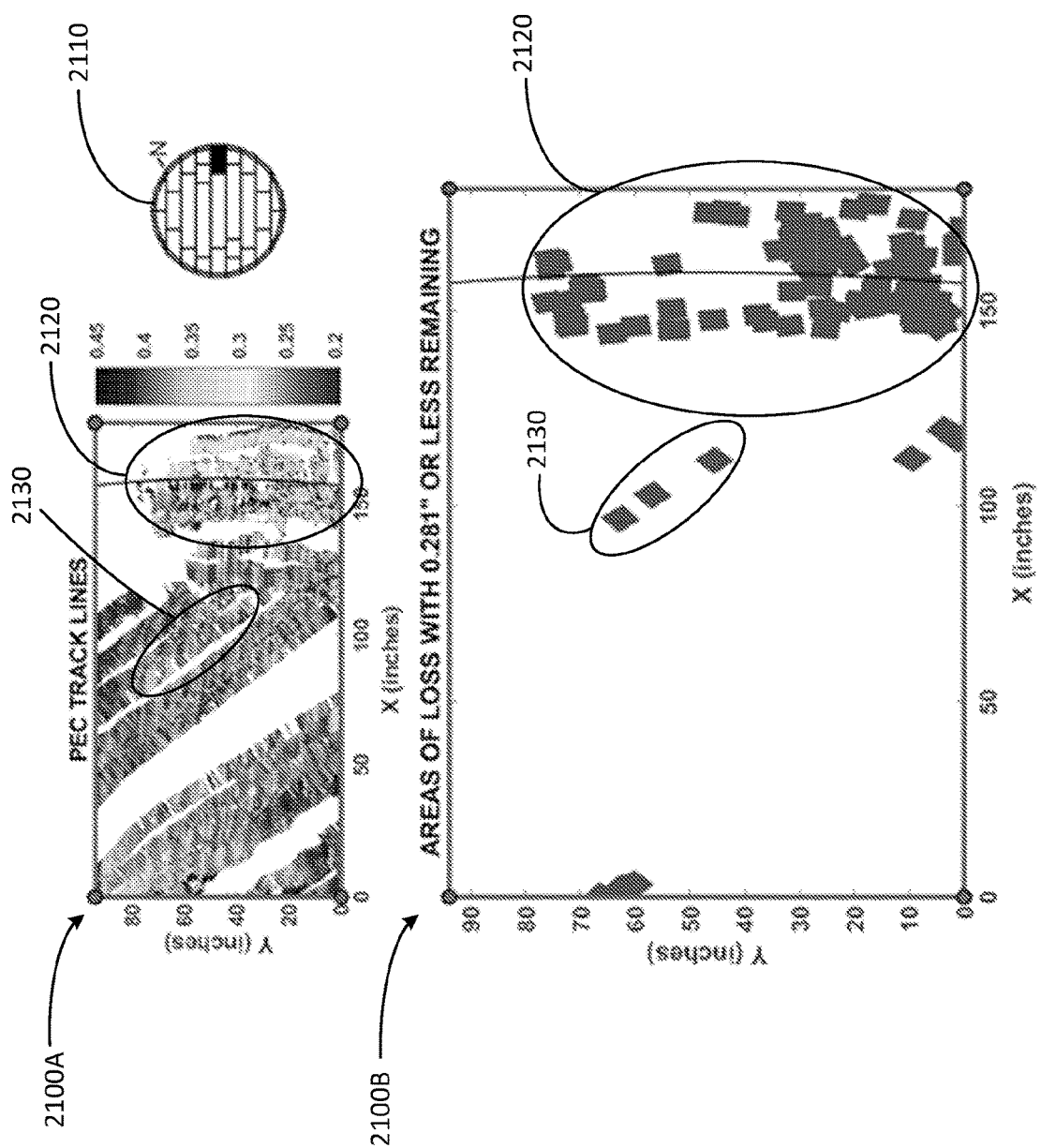
FIG. 21 depicts graphs describing PEC track lines and corresponding areas off loss within a scanned area.

Referring now to FIG. 21, depicted are examples of additional data included in the PEC inspection report. The additional data can include graph 2100A. The graph 2100A can display high-resolution X and Y coordinates PEC thickness data in a selected plate of the floor of a scanned tank. The units of the X and Y coordinates can be presented as inches. The units can be configured by the operator, for example, using the external computing device or software rendering the graph 2100A processing the PEC data. In some cases, the area of the high-risk defect may not be clearly represented in the graph 2100A. Therefore, the inspection report can also include a graph 2100B (e.g., numeric tables) indicating portions of the tank with a remaining wall thickness below a threshold (e.g., wall thickness threshold). The inspection report can also include relevant videos and snapshots from one or more cameras on the robot 1500, or other autonomous tank inspection system.

For example, any portions of the wall measured to be below the thickness threshold may indicate a high-risk level or high likelihood of leakage. In this case, the threshold may be predetermined at 0.281 inches or less. By visually observing graph 2100A, an operator may not accurately identify every portion of the tank plate having a thickness of less than the threshold. Therefore, graph 2100B can illustrate the portions of the plate that satisfy the threshold. For example, referring to regions 2120 and 2130, graph 2100B depicts a clear representation of portions of the plate satisfying the threshold thickness. Therefore, both graphs 2100A and 2100B may be shown in the PEC inspection report to identify and fix any defects of the tank wall.

The PEC inspection report can include a minimap 2110 of the tank floor. The minimap 2110 can include a highlighted region of the tank floor. The highlight region can indicate which region (or plate) of the tank floor is being analyzed in graphs 2100A and 2100B. Each highlighted region can be presented on a different page of the PEC inspection report, for example.

Figure 22:
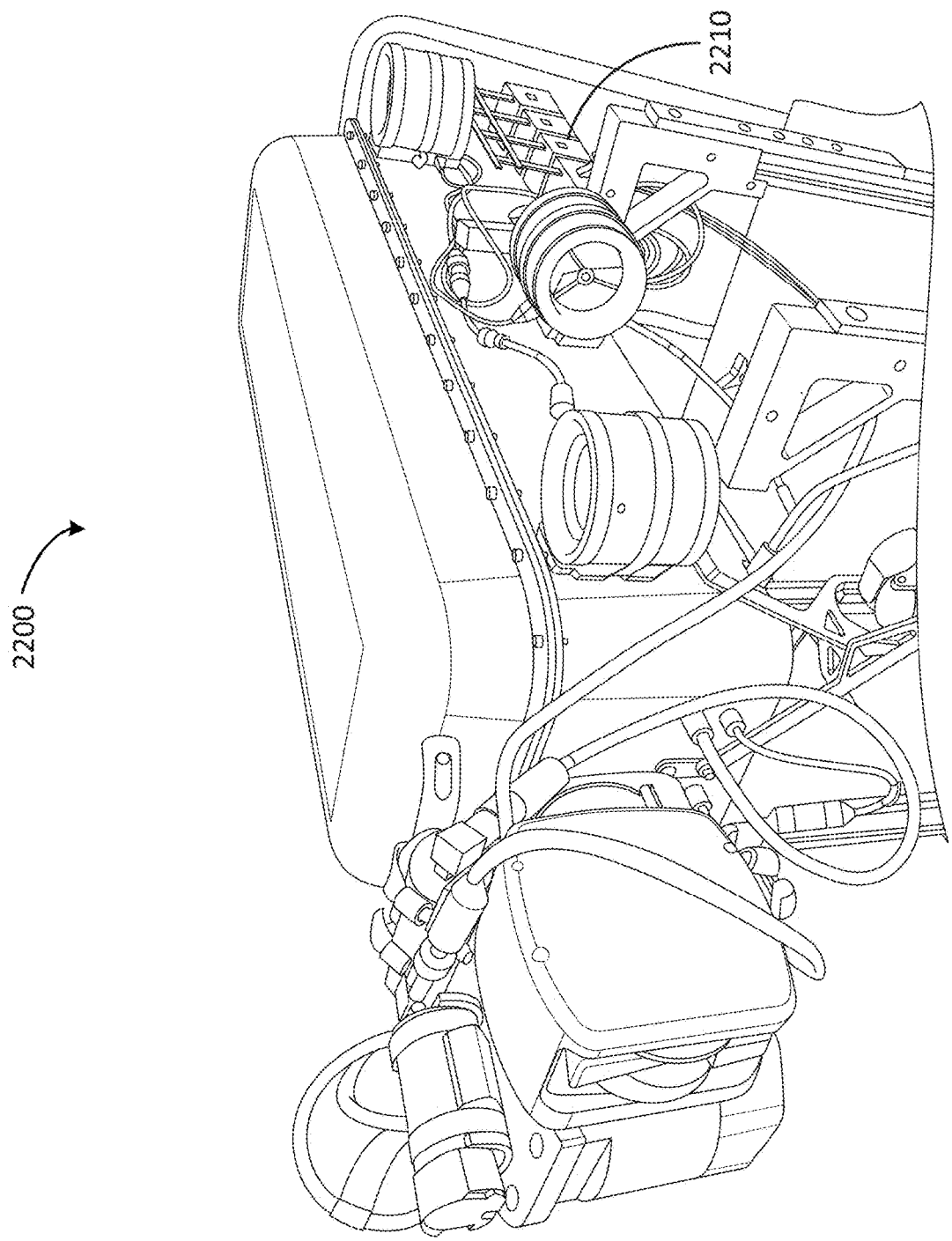
FIG. 22 depicts an example implementation of an autonomous system for tank inspection with one or more phased arrays.

Referring now to FIG. 22, depicted is a phased array UT ("PA") robot 2200 for autonomous tank inspections. The PA robot 2200 can include hardware, software, or one or more components similar to the robot 1500 or the vehicle 101. The PA robot 2200 can include an advanced phased array ultrasonic testing ("PAUT") system 2210, including (2×) 32/128 electronic boards and (8×) 32-element probes (256 elements total). The PAUT system 2210 may be attached to any portion or side of the PA robot 2200. The PA robot 2200 can include a 1 foot total sensing length (e.g., capable of detecting a plate of at least 1 foot in length). The PA robot 2200 can have improved navigation accuracy over other implementations, for example, using a higher performance inertial navigation system and/or additional acoustic ranging sensors. The navigation system and the acoustic ranging sensors can be installed on the PA robot 2200, or other robots optimized for in-service tank inspection. The PA robot 2200 can have improved mapping capability over other implementations. The PA robot 2200 can be certified class 1 division 2 by FM approvals.

The PAUT system 2210 can include multiple ultrasonic transducers. Each transducer can be pulsed independently, such as at varied timing or instances. By varying the timing of the pulses, at least one pattern of constructive interference can be set up. This constructive interference can radiate the ultrasonic beam at a predetermined angle based on the timing of each ultrasonic transducer (e.g., based on the progressive time delay). Changing the progressing time delay can change the direction or angle of the beams. The progressing time delay can be configured, for example, by the one or more processors of the PAUT system 2210, such as to measure the plate thickness at different locations within the tank. The progressing time delay can be configured, for example, manually by an operator via the external computing device. By sweeping the beams in multiple directions at the plate, the data from the multiple beams can be aggregated to generate visual illustrations or images of the tank wall. In this case, the images can show multiple layers of the tank plate, thereby depicting the thickness of the tank plate. The PAUT system 2210 can be used together with one or more PECA devices. Components between the vehicle 101, the robot 1500, and the PA robot 2200 may be used within a single robot to be optimized for and to perform in-service tank inspection.

Either the robot 1500 or the PA robot 2200 can have class 1, division 2 certification, and may be used in low flash point products such as gasoline as long as it is used with the proper launching vapor containment system. The robot 1500 or the PA robot 2200 can operate untethered to any other computing device using on-board batteries. The robot 1500 or the PA robot 2200 can operate using low bandwidth communications with one or more operators during tank bottom surveys. For example, signals may be transmitted between the robot 1500/2200 and the external computing device used by the operator. The robot 1500 or the PA robot 2200 can include materials compatible with prolonged immersion in gasoline. The PA robot 2200 can be constructed with similar materials and include one or more components similar to the robot 1500. The robot 1500 or the PA robot 2200 can have 100% control of vapors during launch and recovery using a vapor containment system, which is an improvement over other implementations. The robot 1500 or the PA robot 2200 can use automatic homing and latching on one or more recovery cables. The robot 1500 or the PA robot 2200 can use a PEC or PAUT NDT payload, among others. The PA robot 2200 can be transported to an operation site similar to the robot 1500 or the vehicle 101, such as by using the casing 1610 and the support equipment 1620 depicted in FIG. 16A. The PA robot 2200 can be elevated to the roof of the tank and lowered into the tank using a crane 1650 and at least one cable 1660, similar to the robot 1500. The PA robot 2200 can collect plate thickness information and presented to the operator similarly to the PEC inspection report, as shown in at least FIGS. 20 and 21.

Figure 23:
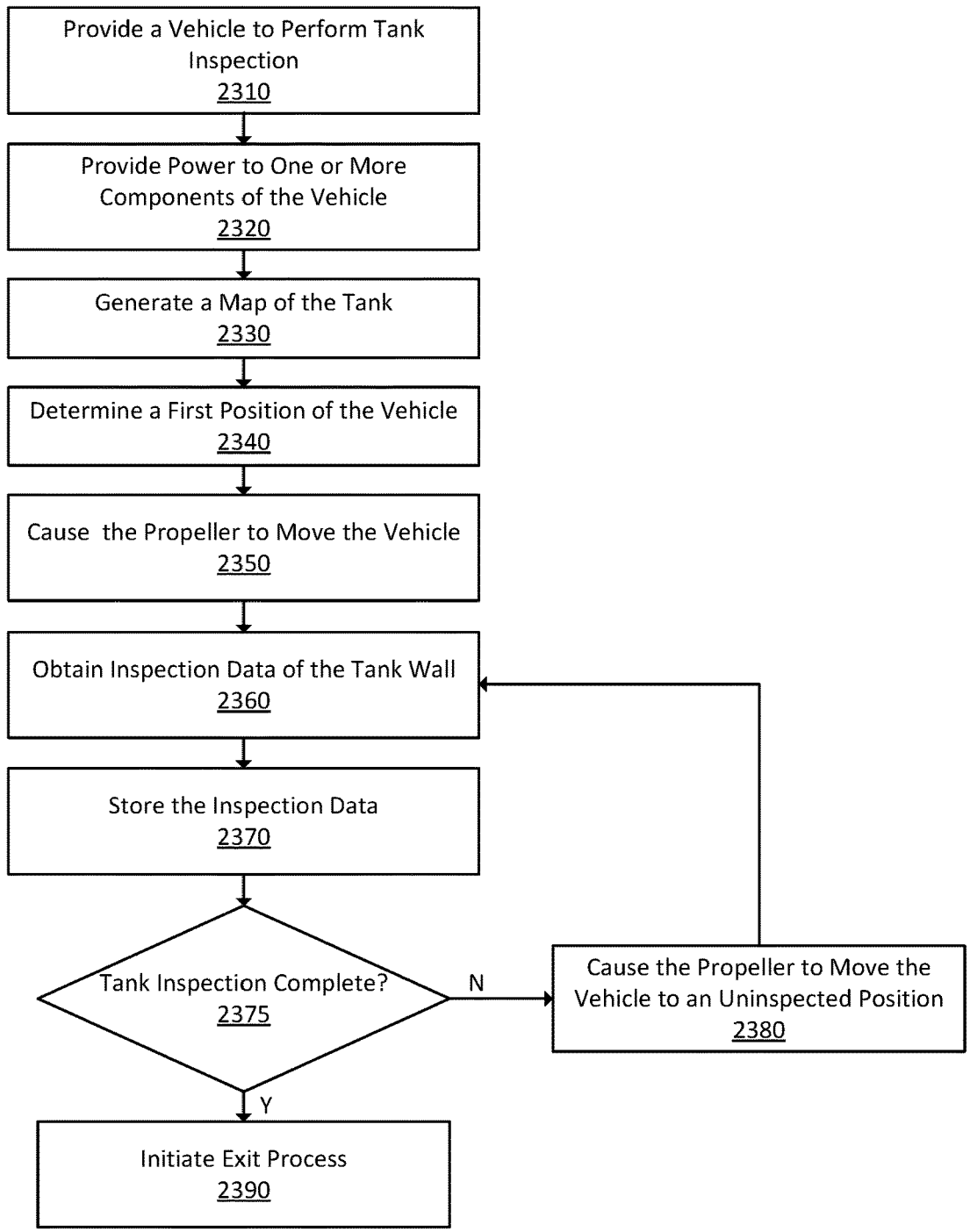
FIG. 23 is a flow diagram of an example method of inspecting a tank containing a flammable fluid.

Referring generally to FIG. 23, is a flow diagram of an example method of inspecting a tank containing a flammable fluid. The method 2300 can be performed by system 100, system 400, the PECA device 1000, the robot 1500, the PA robot 2200, or one or more component thereof. In brief overview, at step 2310, a vehicle can be provided to perform a tank inspection (e.g., in-service tank inspection or autonomous tank inspection). At step 2320, the battery of the vehicle can provide power to one or more components of the vehicle. At step 2330, the control unit can generate a map of the tank. At step 2340, the control unit can determine a first position of the vehicle. At step 2350, the control unit can cause the propeller to move the vehicle. At step 2360, the inspection device can obtain inspection data of the tank wall. At step 2370, the control unit can store the inspection data. At step 2375, the control unit can determine whether the tank inspection is completed. At step 2380, the control unit can cause the propeller to move the vehicle to an uninspected position. At step 2390, the control unit can initiate an exit process.

Still referring to FIG. 23, and in further detail, the vehicle provided for tank inspection can include a propeller, a battery, a control unit, an inspection device, and a ranging device at step 2310. The vehicle can refer to a robot for tank inspection using one or more PECA devices or a PA robot using one or more PAUT devices. The vehicle can perform one or more features and functionalities of the vehicle described in at least FIG. 1, the robot described in at least FIG. 15, and the PA robot described in FIG. 22. The vehicle can be equipped with other components in addition to the above list of components. For example, the vehicle can include an accelerometer, a velocity sensor, a positioning sensor to detect the vehicle location, a thermometer to measure the temperature of the vehicle or the tank, or other sensors thereof. The vehicle can be equipped with a brush. The brush can be used to clean debris off the interior surface of the tank. The brush can also clean sedimentation deposited on the tank floor. The control unit of the vehicle can extend the reach of the brush by using an extender. For example, in response the control unit receiving sensor data (e.g., from one or more cameras) indicating debris or other substances on the interior tank surface, the control unit can initiate a cleaning process using the brush. The brush may be rotated, such as to assist with removing the debris from the surface. Based on the sensor data, the control unit can activate the extender to reach the interior surface of the tank designated for cleaning.

The control unit can include one or more processors and at least one memory. The control unit can be in electrical communication with other components of the vehicle, such as the inspection device, the ranging device, and the battery. The control unit can regulate instructions transmitted to each component of the vehicle to perform a tank inspection. The control unit can be preconfigured by an operator using an external computing device or an administrator device. The control unit can perform a lookup to identify instructions stored in a vehicle resource repository to determine the sequences of instructions to perform for tank inspection. The control unit can be supplied with power from the battery to transmit signals to other components. The control unit can regulate the power supplied to each component.

The vehicle can include a vacuum device coupled to a pump. The vacuum device can be in addition to the brush. In some cases, the vacuum can replace the brush. For example, the control unit can receive sensor data detecting debris on the surface of the tank. Depending on the among of debris, the control unit can initiate the pump. The pump can be a part of the vacuum device. The vacuum device can be connected to an extender similar to the brush. The pump can pull the debris into the vacuum device. The vehicle can include a waste bin to store the debris removed from the tank surface. In some other implementations, the vacuum device can remove the debris from the tank surface for disposition in the tank. In some cases, the tank can include a pipe for disposing the debris, compounds, or substances removed from the tank surface. The vehicle can include a grinder. For example, the vacuum device can be connected to or installed with the grinder. After removing the debris from the tank surface, the debris can be passed to the grinder. The grinder can mince the debris that is in a solid or jello state. In some cases, the grinder can turn solid debris into its liquid state. The grinding process may be done prior to storing the removed debris or depositing back the removed debris into the tank.

The vehicle can be preconfigured to follow instructions to perform tank inspection. The preconfigured settings can include speed, liftoff distance, voltage supply to the inspection device, duration of the inspection, dive plan (e.g., regions of the tank to inspect, movement guide, and zones to avoid in the tank), or other settings optimized for in-service tank inspection. The control unit can send signals to one or more components of the vehicle to execute the instructions. The instruction can include an inspection process, exit procedure, decision block, or other commands to navigate the vehicle to complete the tank inspection. The decision block can refer to instructions that should be executed given a certain case. For example, upon completing the tank inspection by following the dive plan, the control unit can determine one or more uninspected regions or portions within the tank. In some cases, the control unit can determine to inspect the uninspected regions, for example, if the instruction is to perform a full inspection of the tank. In some cases, the control unit can determine not to inspect the uninspected regions, for example, if the area is within an exclusion zone or if the instruction is to inspect within the indicated area.

The vehicle can be transported to an inspection site by using support equipment and a casing to prevent damages to the vehicle. The support equipment can be a cushion, bracket, or paddings to support the vehicle from moving during transportation. The support equipment can be shock-absorbent or impact resistant to prevent damages during transportation. The support equipment can be placed in a casing. The casing can provide insulation to the external environment. Similarly to the support equipment, the casing can be shock-absorbent or impact resistant. The casing may be referred to as a housing or an enclosure to maintain the position of the vehicle during transportation. The casing, the support equipment, and the vehicle can be transported via a trailer, for example. An operator can confirm that the temperature of the vehicle is below a threshold prior to deployment. For example, to avoid an increase in temperature of the flammable fluid, the vehicle can be below 50 degrees Fahrenheit when inserted into the tank.

When arrived at the tank, a crane can lift the vehicle to the roof of the tank via a cable or a rope. The support equipment can be used to assist the vehicle onto the roof of the tank. For example, the cable of the crane can be hooked to the support equipment situating the vehicle. Once lifted to the roof, the vehicle can be lowered into the tank via the lid. The vehicle can initiate a disengagement sequence with the cable of the crane or the support equipment, if used to lower the vehicle into the tank. The vehicle can be partially submerged into the flammable fluid to disengage with the cable. The vehicle as a whole can be engulfed in the flammable fluid prior to the disengagement.

Once inside the tank, the vehicle can utilize one or more sensors to map the tank. The control unit can be preprogrammed to inspect all portions of the tank. In this case, the control unit can generate a dive plan for navigating the vehicle throughout all the areas within the tank. During the transitioning from a first position to a second position, the vehicle can measure the quality of the tank wall (e.g., tank plate or tank floor). The control unit may stop the vehicle to inspect each portion of the tank. In some cases, the control unit may maintain a velocity of the vehicle during the inspection of the tank. The velocity can be predetermined based on the magnetic field strength and plate thickness. For example, the original tank wall thickness can be 4.8 mm and the control unit may supply 10V power to the inspection device (e.g., PECA device). Based on the information, for example, the vehicle can travel at 3 inches per second, 5 inches per second, or 10 inches per sec. Using the inspection device, the control unit can receive PEC data or raw sensor data. The control unit can be configured to process the raw data, for example, to generate an NDT map, plate thickness information, or corrosion level information. The control unit can transmit the raw data to the external computing device to perform the post-processing procedures for the raw data. The control unit and the external computing device can execute one or more features or functionalities interchangeably.

The control unit can be preprogrammed to only inspect one or more portions of the tank predetermined by the dive plan. The dive plan may be provided to the vehicle prior to deploying the vehicle into the tank. In this case, the control unit may not inspect portions of the tank outside the dive plan. For example, the control unit can use the dive plan to navigate the vehicle throughout regions and areas within the tank. During the path, the control unit can instruct the inspection device to inspect the surrounding areas at the position of the vehicle. In some cases, the inspection device can inspect only at the area at the position of the vehicle. The tank inspection can be completed when the vehicle completed the dive plan.

The vehicle can include one or more propellers. The propellers can be located at any portion of the vehicle, such as the sides, bottom, rear, front, or top. The propellers can be pointed in any direction. Example locations of the propellers can be illustrated at least in FIGS. 15 and 22. The propeller can spin in any direction to provide a forward or backward push/pull, thereby increasing the velocity of the vehicle. Within the flammable fluid, the propeller can elevate and move the vehicle. The propeller can rotate the vehicle in any axis and move the vehicle in any motion, such as to guide the vehicle from a first position to a second position within the tank. The propeller can be controlled by the control unit, such as the rotation speed and rotation direction.

The battery can be in electrical communication with other components of the vehicle. The battery can be rechargeable outside the tank. The battery can be controlled by the control unit for power distribution to other components. The battery can be housed within the center compartment or the casing of the vehicle in addition to one or more other components of the vehicle. The battery can distribute AC or DC power. The battery can be coupled with a converter to convert the DC power to AC power, vice versa. Based on the liftoff distance and the predetermined plate thickness of the tank, the control unit can determine to provide a predetermined power to the inspection device (e.g., to increase or decrease magnetic field strength and intensity). For example, the battery can provide 6V, 8V, or 10V to the inspection device to inspect the tank plate, based on the liftoff distance and the original plate thickness.

The ranging device can include one or more sensors for depth perception or to collect visual data, such as a proximity sensor, an ultrasonic sensor, light detection and ranging sensor ("LiDAR"), a camera, or a distance sensor. The ranging device, battery, propeller, control unit, or inspection device can perform features and functionalities similar to the corresponding components, for example, in the ATIS of FIG. 1.

The inspection device can be a PECA device. The PECA device can generate a magnetic field for plate thickness measurement and corrosion level detection. The magnetic field generated by the PECA device can penetrate layers and coatings on the interior tank surface. The PECA device can measure the decay rate after applying the magnetic field to the plate. The PECA device can generate the magnetic field after the vehicle stopped moving. Other factors can be taken into consideration before generating the magnetic field, such as meeting the predetermined liftoff distance. For example, the vehicle can travel to a position within the tank (e.g., inspection site). Once arrived and the vehicle stops moving, the control unit can transmit a signal to the inspection device to generate the magnetic field. The magnetic field may be generated for a predetermined duration, such as 1 second, 2 seconds, 3 seconds, or 5 seconds. The inspection device can terminate the magnetic field in response to a timeout using the predetermined duration as a preset. The PECA device can collect the magnetic field decay rate in response to the terminated inspection device. Once the decay rate is determined, the control unit can move the vehicle to a different location, e.g., using the propeller and based on a dive plan. The magnetic field intensity and strength may be set based on the liftoff distance and the original plate thickness associated with the tank (e.g., the thickness of the plates used to construct the tank). The liftoff distance can be established based on the predetermined plate thickness. For example, with a predetermined plate thickness of 0.25 inches, the liftoff distance of the PECA device can be 0.5 inches from the plate. The traveling velocity of the vehicle can be based on the predetermined plate thickness.

The pulse eddy current array of the inspection device can include a 7-element array with 7 inches by 1 inch coverage in length or 178 mm. The 7-element array with 7 inches coverage can refer to a dimension of the plate the inspection device can cover. For example, each inspection by the vehicle can cover 7 inches by 1 inches of the tank. The coverage size may be hardware dependent. The coverage size can be limited or adjusted by software including configuration settings for the inspection device. For example, the coverage size can be changed to other dimensions, such as 5 inches by 1 inches, 8 inches by 1 inches, or 10 inches by 1 inches.

The inspection device can include a phased array ultrasonic testing ("PAUT") device or system. The PAUT device can include two 32/128 OEM electronic boards phase arrays and eight times 32-element probes (e.g., 256-element) to generate ultrasonic waves to collect plate thickness data. The PAUT device can include a sensing length of at least 1 foot. The control unit can operate the PAUT device similar to the PECA device, such as stopping the vehicle at a position within the tank, initiating the inspection device, collect data, and move to a different position.

Referring now to step 2320, the battery of the vehicle can provide power to the propeller, the control unit, the inspection device, and the ranging device. The battery may be supplied to the control unit before other components. For example, the control unit can regulate how much power is being supplied to each component of the vehicle. Changing the amount of power supplied to each component can change its characteristics. For example, increasing power to the propeller can include the rotation speed. In some cases, components of the system can include different power requirements and may include a power limiter, such that the supplied power does not increase beyond the limiter. For example, upon meeting the power requirement for the ranging sensor, additional power will not increase its performance. The battery can be coupled to a surge protector to prevent shock or discharge of electricity.

The battery can increase the intensity of the pulse eddy current of the inspection device based on the amount of power supplied by the battery. For example, based on the original plate thickness and a preset liftoff distance, the control unit can instruct the battery to supply a corresponding amplitude of voltage to the inspection device. The amount of power supplied can be proportional to the magnetic field strength. Based on the amplitude of power supplied to the inspection device, the control unit can configure the liftoff distance based on the original plate thickness. The vehicle can include a table listing associations between the liftoff distance, the magnetic field strength or intensity, and the original plate thickness. For example, with a first liftoff distance and a first plate thickness, the control unit using the table can set the inspection device to a first magnetic field strength by identifying an entry within the table including the first liftoff distance and the first plate thickness.

Referring now to step 2330, the control unit can generate a map of the tank based on data received from the ranging device. For example, responsive to the vehicle disengaging from the cable of the crane, the control unit of the vehicle can initiate one or more sequences to prepare for inspection. Generating a map of the tank may be one of the sequences. For example, the control unit may command the propellers to maintain the altitude of the vehicle within the tank containing flammable fluid. The control unit can instruct the propeller to descend the robot towards the floor. During the descent, the control unit can use one or more ranging devices located any on the vehicle to measure the distance to an object in the tank. Based on the collected data from the ranging device, the control unit can process the data to generate a map of the tank.

The control unit can transmit the collected data to the external computing device to process and generate the tank map. The control unit can provide the collected data from the ranging device as input into a machine learning engine. The machine learning engine can operate on the vehicle via installed software. The machine learning engine may be available on the external computing device. For example, the control unit can transmit the collected data to the external computing device via a network interface. In response to receiving the collected data, the external computing device can provide the collected data as input to the machine learning engine. The machine learning engine can use at least one model to generate a map of the tank. The model can be trained with historical tank data to improve accuracy in mapping the tank. Once the generated map is output, the map can be transmitted to the control unit for storage in a vehicle resource repository. The map may also be installed in memory of the external computing device.

The control unit can develop a dive plan in response to generating the tank map. For example, the control unit can identify portions of the tank to inspect. In some cases, the control unit can identify exclusion zones within the map that includes, for example, pipes, columns, or other objects preventing the vehicle from moving through or performing the inspection. For example, after generating the tank map, the control unit can populate the map with track lines, indicating regions and areas for the vehicle to travel. Upon identifying an exclusion zone, the control unit can redirect the track line to move in a different direction or angle. The control unit can repeat the process until the track lines cover the generated map, aside from in the exclusion zone. The control unit can provide a predetermined tolerance distance from the exclusion zone, such as 1 foot, 3 feet, or 5 feet, such as to not damage one or more objects centered at the exclusion zone.

The map can be predetermined or generated by an external computing device. For example, the external computing device can install the map onto the vehicle to being the operation. The map can include a preconfigured dive plan for the vehicle to follow (e.g., path to take, regions to cover, and zones to avoid). The control unit can configure the map based on additional sensor data from the ranging device. For example, with the pre-generated map and using the ranging device, the control unit can update the map upon detection of an object not indicated within the generated map. In another example, the control unit can update the map upon not detecting an object that should be present based on the map.

Referring now to step 2340, the control unit can determine a first position of the vehicle on the map of the tank. The first position of the vehicle may refer to the current position of the vehicle after deployment into the tank. The vehicle can include a positioning sensor. The control unit can collect position data from the positioning sensor. Based on the position data from the positioning sensor, the control unit can determine the location of the vehicle. In some cases, the control unit can rely on the ranging device and the tank map to determine the current position of the vehicle. For example, based on the arrangement of objects within the tank (e.g., pipes, constructions, tank structure, or weld seams determined by the ranging device), the control unit can compare the arrangement of objects measured from the ranging device to the generated map. The control unit can pinpoint the location of the vehicle based on the compared arrangement, for example. The location of the vehicle can be indicated by latitude and longitude coordinates.

Referring now to step 2350, the control unit can cause the propeller to move the vehicle from the first position to a second position within the tank. For example, the control unit can determine to reposition the vehicle to start the inspection at another position within the tank. If the first position refers to the current position of the vehicle, the second position can refer to the destination of the vehicle. The second position can be located anywhere in the tank. The dive plan can be stored in the vehicle resource repository. The control unit can retrieve the dive plan to identify a starting point to inspect the tank. The control unit can cause the propeller to move the vehicle from the current position to the starting point (e.g., the second position) in response to identifying the starting point. To move the vehicle from the first position to the second position, the control unit can instruct the battery to supply power to one or more propellers of the vehicle. The control unit can manage the speed, travel distance, and direction of the vehicle to arrive at the second position.

The vehicle can start the inspection with the vehicle positioned at the first position. The dive plan can be adjusted or configured based on the first location inspected by the vehicle using the inspection device. For example, the initial dive plan can include inspecting the tank in a clockwise direction starting from the northern region of the tank. If the first position of the vehicle is at the southern side, the control unit can adjust the dive plan to start at the southern side. The adjusted dive plan can be executed to inspect the tank from either a clockwise or counterclockwise direction, for example. In some cases, the dive plan can include inspecting the tank by traveling from left to right and top to bottom. When adjusting the dive plan, the control unit can determine the most efficient path for the vehicle to travel, such as to reduce overlapping paths or unnecessary movement.

Referring now to step 2360, the inspection device can obtain first inspection data indicative of a quality of a tank wall. The indication of the quality can be at the portion of the tank at the second position within the tank (e.g., the location of the vehicle during the inspection). The inspection device can be electrically connected to the battery and including a pulsed eddy current array. The quality of the tank wall can include a thickness measurement of the tank wall. The quality of the tank wall can include a corrosion level of the tank wall. The corrosion level may be correlated or proportional to the wall thickness. For example, if the remaining thickness of a first portion of the tank wall is high, the corrosion level for the first portion of the tank wall may be low. If the remaining thickness of a second portion of the tank wall is low, the corrosion level for the second portion of the tank wall may be high, thereby indicating that the second portion of the tank wall has been corroded more than the first portion, for example. The thickness measurement and the corrosion level can be determined based on the magnetic field decay rate. The decay rate can be measured in response to terminating the generation of the magnetic field from the inspection device.

Similarly for generating the magnetic field to determine the quality of the tank wall, the inspection device can include the PAUT device to generate ultrasonic waves. These ultrasonic waves can be generated from the 32-element probes and may be directed in a predetermined direction based on the delay time set to each probe. For example, if multiple probes are lined up on the interior tank surface, by increasing the delay from the left probe to the right probe, the direction of the ultrasonic wave may be angled to the left. The opposite is true when increasing the delay from the right-most probe to the left-most probe, as an example in this case.

The control unit can utilize the inspection device to obtain inspection data for different portions of the tank. The portions of the tank may refer to different regions within the tank, which may be subdivided by an operator. The division of each portion can be determined, for example, based on the tank specification. For example, the portions of the tank may include different characteristics or qualities as originally constructed. Some portions of the tank wall may be constructed using thicker plates, among other portions. Therefore, when processing the inspection data, the control unit or the external computing device can account for the original plate thickness for each portion of the tank to determine the thickness percentage or the corrosion level.

The control unit can render an image of the plate thickness using raw sensor data from the inspection device. The control unit can transmit the raw sensor data to the external computing device to generate the render. In the render, the control unit can label defects area within each inspected area having the coverage dimension, such as 7 inches by 1 inch, for example. The label can include a color spectrum indicating differences in corrosion level and plate thickness measurement. In this case, the coverage dimension may be referred to as the inspected region of the tank. Therefore, the labeled defects may be referred to as a defect portion within the inspected region. The labeled wall thickness measurement can indicate an averaged wall thickness measurement within the defect portion. In some other implementations, the labeled wall thickness measurement can indicate the thinnest part of the plate within the defect portion.

The exclusion zone within the tank can be considered as a separate region from the rest of the tank, e.g., the exclusion zone may not be considered as a portion of the tank configured for inspection. The exclusion zone can account for columns, pipes, or other objects within the tank. The control unit can conserve a predetermined distance from the exclusion zone to avoid impact with the object, such as 3 feet, 5 feet, or 10 feet from the exclusion zone. The conserved distance can be considered as part of the exclusion zone. The predetermined conserved distance can be predetermined by the operator. The predetermined conserved distance can be determined based on the size of the robot. For example, the dive plan can indicate positions and travel directions for navigating the vehicle. Each position/location/point along the track lines of the dive plan may indicate positions of the front or the back of the vehicle. In some cases, each point can indicate the positions of the center of the vehicle. Therefore, the control unit can include the size of the vehicle as a factor to avoid impact with an object when executing the dive plan. The control unit can avoid impact by using the range sensor to detect nearby objects and instruct the propeller to stop the vehicle when near an object.

The control unit can transmit inspection data including the first inspection data to an external computing device. The control unit can communicate or share other data with the external computing device. For example, other sensor data, activity log, connection data, firmware version, or completion data. The external computing device can be located external to the tank and used by an operator. The external computing device can receive the inspection data transmitted from the control unit of the vehicle. For example, the control unit can transmit the inspection data to the external computing device using a wireless communication technique, such as Bluetooth, Wi-Fi, or other low bandwidth communications. The external computing device can execute functions, features, software, and process data similar to the control unit of the vehicle. In some cases, the control unit can transmit raw data to the external computing device for processing.

The control unit can transmit the inspection data to the external computing device after completing the tank inspection. The vehicle can be connected to the external computing device before deployment into the tank. The vehicle can be removed from the tank using a crane with a rope. The vehicle can be connected to the external computing device after removed from the tank. The vehicle can be communicatively coupled to the external computing device via at least one cable or connector, such as a fiber-optic tether, USB, or Ethernet cable. The control unit can transfer activity log, sensor data, post-processed render, or other information stored in the vehicle resource repository.

The control unit can transmit the raw sensor data collected from the inspection device to the external computing device. The external computing device can process the raw sensor data to determine different quality metrics for each portion of the portions of the tank. The portions of the tank may refer to individual areas where the vehicle stopped to measure the wall thickness. The portions of the tank may refer to different regions of the tank having different original thickness during the construction of the tank. For example, the wall thickness at a first region can be 10 mm and at a second region can be 5 mm. When processing the raw sensor data collected by the inspection device at these two regions, the external computing device can divide the measured thickness by the original thickness to determine a percentage of thickness left in the first region and the second region. For example, if the raw data indicate a 7 mm thickness in the first region and a 4 mm thickness in the second region, the quality of the first region can be 70%, and the second region can be 80%.

The external computing device can determine an isolated defect or flaws at a portion of the tank based on the collected inspection data. The inspection data for each portion may be referred to as second inspection data, which can be different from the first inspection data at the first position within the tank. For each portion of the tank, the control unit can collect first, second, third, or other counts of inspection data, which may be sequential to when the inspection data are collected. For example, if the coverage area of the 7-element array to measure the wall thickness using the inspection device is 7 inches by 1 inch, the isolated defect can be detected at a portion of the aforementioned coverage area (e.g., within the 7 inches by 1 inch array). Therefore, defects with small dimensions can be identified. Based on the raw data collected from the inspection device, the isolated defect can refer to flaws within the 7 inches by 1-inch array. Such flaws can be of a smaller size than the array, such as 0.5 inches by 0.5 inches in dimension. The external computing device can determine a general wall loss of the tank based on the inspection data. In this implementation, and referring to the previous example, the thickness measurement within the coverage area can be averaged. Therefore, the whole 7 inches by 1 inch rendered data can be averaged to a single value or quality metric.

The external computing device can determine a defect diameter at the second position of the tank based on the inspection data (e.g., first inspection data). The second position can refer to the position of the inspection robot within the tank to initiate the inspection or to collect the inspection data. The defect diameter or the size of the defect can be derived from processing the inspection data. The defect diameter may be referred to as the dimension or the size of the defect (e.g., length and width). The defect diameter can provide dimensions in addition to the defect depth. With the defect diameter and the defect depth, a 3D model representation of the defect can be generated. For example, the control unit can generate the model of the tank with the defect in real-time (e.g., 1 ms, 10 ms, or 50 ms after receiving the inspection data). The external computing device can generate the model of the tank including the defect similar to the control unit.

The external computing device can perform a lookup in a defect table customized for the inspection device to identify an amount of wall loss. The defect table may be referred to as a lookup table or a data structure to determine the wall loss (e.g., a quality metric for the wall). The defect table can be constructed to include minimum detectable defects for custom PECA sensors based on various defects configurations. The defect table may be customized or personalized for the tank inspected by the vehicle. To identify the defects for a particular tank, the defect table may include wall loss percentage corresponding to the defect diameter associated with the tank under inspection. For example, the defect table can include wall loss percentage, such as 10%, 20%, 30%, and so forth. Within the same entry (e.g., row or column) as each wall loss percentage, the defect table can include an associated defect diameter and defect depth. The defect diameter can indicate the size of the defects within the tank wall. The defect depth can indicate the amount of the wall has been corroded. For example, a wall loss of 10% can be associated with a 10 mm wall thickness loss and 0.5 inches of defect diameter, and a wall loss of 30% can introduce a 20 mm wall thickness loss and 0.7 inches of defect diameter. The defect table can indicate the remaining wall thickness and diameter for the non-corroded areas. For example, a wall loss of 10% can indicate 50 mm of wall thickness and 2 inches of the non-corroded diameter of the wall, and a wall loss of 30% can indicate 29 mm of wall thickness and 1.1 inches of the non-corroded diameter.

Referring now to step 2370, the control unit can store, in a data structure in memory of the vehicle, the first inspection data corresponding to the second position within the tank. The control unit can store inspection data collected at the first position within the tank. The memory of the vehicle can refer to the vehicle resource repository. The control unit can transmit the collected data or other information thereof from the vehicle resource repository to the external computing device. The external computing device can upload the data received from the vehicle to the cloud or a database external to the vehicle, for example. One the inspection data is stored, the control unit can proceed to inspect other portions of the tank or execute other instructions according to the tank inspection procedures.

Referring now to step 2375, the control unit can determine whether the tank inspection is completed. The control unit can rely on a dive plan to determine the completion of the tank inspection.

For example, the control unit can travel and collect data according to the track lines provided in the dive plan. Once the vehicle completed the travel along the track lines, the tank inspection can be considered to be completed, and step 2390 can be initiated.

The control unit can identify one or more uninspected portions of the tank, not indicated in the dive plan. For example, based on a comparison between the tank map provided by the operator and the tank map generated by the control unit after entering the tank, the control unit can identify portions of the tank (e.g., not including the exclusion zones) that are inspectable or within the reach of the inspection device. These identified portions may not be indicated within the dive plan. Therefore, the control unit may determine whether to inspect or disregard these portions. For example, the control unit can be configured to inspect every portion within the tank within reach of the vehicle or the inspection device. In this case, the control unit can cause the propeller to move the vehicle to or near the uninspected area to perform an additional inspection. In another example, the control unit may be configured to only follow the dive plan. Accordingly, the method can move to step 2390 in response to completing the dive plan.

In view of the example above, and in some cases, the control unit can transmit a signal to the external computing device notifying the operator of the uninspected area. The operator can determine whether to inspect the remaining portions of the tank. The operator can provide an indication to inspect or not inspect the remaining portions. The external computing device can transmit a response to the control unit with the instructions from the operator. For example, the method can perform step 2390 if the operator indicates not to inspect the uninspected portions. In another example, the method can proceed to step 2380 if the operator indicates to inspect the aforementioned portions.

Referring now to step 2380, the control unit can determine that the tank inspection is not complete. In response to determining that the tank inspection is not complete, the control unit can cause the propeller to move the vehicle to an uninspected portion of the tank. The uninspected portion of the tank may be the next location according to the dive plan. The uninspected portion may be an additional portion of the tank outside the dive plan. The uninspected portions may not include portions of the exclusion zones (e.g., including the conserved distance from the zones). Once the vehicle moved to the uninspected portion, the method can execute step 2360, such as to obtain the inspection data of the tank wall at the uninspected portion. Once step 2360 is done, the method can re-execute step 2370 to store the inspection data, and step 2375 to determine whether the tank inspection is completed.

Referring now to step 2390, the control unit can determine that the tank inspection is completed. In response to determining that the tank inspection is completed, the control unit can initiate an exit process. The exit process at this step can be performed similarly to other similar exit processes, such as steps 526, 624, or 822, and may include other procedures to remove the vehicle from the tank, such as in steps 718 or 820. For example, the control unit can transmit a signal to the external computing device to indicate that the inspection is completed. The external computing device can display a notification to the operator indicating a completed inspection. The operator can open the tank lid and a crane can lower a cable or a rope with a hook down into the tank. The control unit can receive an indication of a cable reeled down from the tank roof configured to couple with the vehicle. The control unit can cause the propeller to move the vehicle to the cable, and couple with the cable via a coupling mechanism. In response to coupling with the cable, the control unit can transmit a signal to the external computing device, notifying the operator to pull the vehicle from the tank. The crane can then reel in the cable along with the vehicle to complete the exit process.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to inspect a tank containing a flammable fluid, comprising:
    a vehicle comprising a propeller, a battery, a control unit, an inspection device, and a ranging device;
    the battery of the vehicle providing power to the propeller, the control unit, the inspection device, and the ranging device;
    the control unit generating, based on data received from the ranging device, a map of the tank, and determining a first position of the vehicle on the map of the tank;
    the propeller of the vehicle, electrically connected to the battery, moving the vehicle through the flammable fluid in the tank;
    the inspection device, electrically connected to the battery, for obtaining inspection data indicative of a quality of a tank wall;
    the control unit, electrically connected to the battery, the ranging device, the propeller, and the inspection device, configured to:
        cause the propeller to move the vehicle from the first position to a second position within the tank;
        obtain, via the inspection device, first inspection data indicative of the quality of the tank wall at a portion of the tank at the second position within the tank;
        store, in a data structure in memory of the vehicle, the first inspection data corresponding to the second position within the tank;
    an external computing device located external to the tank and configured to:
        receive the inspection data comprising the first inspection data;
        determine, based on the first inspection data, a defect diameter at the second position; and identify, based on a lookup in a defect table customized for the inspection device, an amount of wall loss.

2. The system of claim 1, wherein the first inspection data indicates the quality of the tank wall comprising a thickness of the tank wall at the second position within the tank.

3. The system of claim 1, wherein:
the external computing device located external to the tank is further configured to receive the inspection data comprising the first inspection data and determine the quality of the tank wall based on the inspection data.

4. The system of claim 3, comprising:
the inspection device to obtain the inspection data for each portion of a plurality of portions of the tank; and
the external computing device to determine a separate quality metric for each portion of the plurality of portions of the tank.

5. The system of claim 4, comprising the external computing device to:
determine, based on the inspection data for each portion of the plurality of portions of the tank, an isolated defect at a portion of the tank; and
determine, based on the inspection data, a general wall loss of the tank.

6. The system of claim 1, comprising:
a fiber optic tether communicatively coupling the vehicle to the external computing device.

7. The system of claim 1, comprising:
the inspection device configured with a liftoff distance established based on a predetermined plate thickness, wherein the inspection device is calibrated based on the liftoff distance and the predetermined plate thickness.

8. The system of claim 7, wherein the liftoff distance is 0.5 inches and the predetermined plate thickness is at least 0.125 inches, and wherein a traveling velocity of the vehicle is based on the predetermined plate thickness.

9. The system of claim 1, wherein the inspection device comprises a pulsed eddy current array.

10. A method of inspecting a tank containing a flammable fluid, comprising:
providing a vehicle comprising a propeller, a battery, a control unit, an inspection device, and a ranging device;
providing, by the battery of the vehicle, power to the propeller, the control unit, the inspection device, and the ranging device;
generating, by the control unit based on data received from the ranging device, a map of the tank;
determining, by the control unit, a first position of the vehicle on the map of the tank; causing, by the control unit, the propeller to move the vehicle from the first position to a second position within the tank;
obtaining, via the inspection device electrically connected to the battery, first inspection data indicative of a quality of a tank wall at a portion of the tank at the second position within the tank;
storing, by the control unit, in a data structure in memory of the vehicle, the first inspection data corresponding to the second position within the tank;
determining, by an external computing device located external to the tank and based on the first inspection data, a defect diameter at the second position; and
identifying, by the external computing device based on a lookup in a defect table customized for the inspection device, an amount of wall loss.

11. The method of claim 10, wherein the first inspection data indicates the quality of the tank wall comprising a thickness of the tank wall at the second position within the tank.

12. The method of claim 10, comprising:
determining, by the external computing device located external to the tank, the quality of the tank wall based on the first inspection data.

13. The method of claim 12, comprising:
obtaining, by the inspection device, second inspection data for each portion of a plurality of portions of the tank; and
determining, by the external computing device, a separate quality metric for each portion of the plurality of portions of the tank.

14. The method of claim 13, comprising:
determining, by the external computing device based on the first inspection data for each portion of the plurality of portions of the tank, an isolated defect at a portion of the tank; and
determining, by the external computing device based on the first inspection data, a general wall loss of the tank.

15. The method of claim 10, comprising:
communicating data between the vehicle and the external computing device via a fiber optic tether communicatively coupled to the vehicle and the external computing device.

16. The method of claim 10, comprising:
generating, by the inspection device, a magnetic field established at an intensity based on a liftoff distance and a predetermined plate thickness, wherein the liftoff distance established based on the predetermined plate thickness.

17. The method of claim 16, wherein the liftoff distance is 0.5 inches and the predetermined plate thickness is at least 0.125 inches, and wherein a traveling velocity of the vehicle is based on the predetermined plate thickness.

18. The method of claim 10, wherein the inspection device comprises a pulsed eddy current array.

\* \* \* \* \*